US008757195B2

(12) United States Patent
Gitlin, Jr. et al.

(10) Patent No.: US 8,757,195 B2
(45) Date of Patent: Jun. 24, 2014

(54) KEG TAPPING SYSTEM

(75) Inventors: David Allen Gitlin, Jr., Centreville, VA (US); Randall Alan Henderson, Centreville, VA (US); John Robert Sims, Fairfax, VA (US)

(73) Assignee: Four Sheets, LLC, Centreville, VA (US)

( * ) Notice: Subject to any disclaimer, the term of this patent is extended or adjusted under 35 U.S.C. 154(b) by 78 days.

(21) Appl. No.: 13/177,425

(22) Filed: Jul. 6, 2011

(65) Prior Publication Data

US 2013/0008527 A1 Jan. 10, 2013

(51) Int. Cl.
*F16K 31/60* (2006.01)
*B65D 83/00* (2006.01)
*B67D 1/08* (2006.01)

(52) U.S. Cl.
CPC .................................... *B67D 1/0831* (2013.01)
USPC ......................... 137/317; 137/798; 222/400.7

(58) Field of Classification Search
USPC ................................ 137/317, 798; 222/400.7
See application file for complete search history.

(56) References Cited

U.S. PATENT DOCUMENTS

| | | | | |
|---|---|---|---|---|
| 3,591,057 | A | | 7/1971 | Johnston |
| 3,637,117 | A | | 1/1972 | Johnston |
| 3,720,355 | A | | 3/1973 | Johnston |
| RE27,627 | E | | 4/1973 | Johnston |
| 3,868,049 | A | | 2/1975 | Johnston |
| 3,880,182 | A | | 4/1975 | Johnston |
| 3,908,871 | A | | 9/1975 | Gottwald |
| 3,933,282 | A | | 1/1976 | Stevens, Jr. |
| 4,089,444 | A | | 5/1978 | Shea |
| 4,350,270 | A | | 9/1982 | Nezworski et al. |
| 4,350,273 | A | | 9/1982 | Nezworski et al. |
| 4,436,228 | A | * | 3/1984 | Frey ........................... 222/400.7 |
| 4,728,010 | A | * | 3/1988 | Johnston ....................... 222/397 |
| 4,736,926 | A | | 4/1988 | Fallon et al. |
| 4,834,266 | A | * | 5/1989 | Brewer et al. ................. 222/147 |
| 5,248,062 | A | | 9/1993 | Hillard |

(Continued)

FOREIGN PATENT DOCUMENTS

| | | | |
|---|---|---|---|
| EP | 2253581 | A1 | 11/2010 |
| GB | 1380856 | A | 1/1975 |
| GB | 183736 | A | 8/1992 |

OTHER PUBLICATIONS

"Keg Couplers", <URL: http://www.perlick.com/pdf-files/kegcouplers-replacementparts.pdf>; 3 pages; printed Jan. 21, 2011.

(Continued)

*Primary Examiner* — Elizabeth Houston
*Assistant Examiner* — Kevin Barss
(74) *Attorney, Agent, or Firm* — Daniel Eisenberg, Esq.

(57) ABSTRACT

A keg tapping system made up of an upper coupler and a lower coupler having, respectively, upper and lower housings and slidable upper and lower coupler conduits therein. The upper and lower coupler conduits each have top and bottom ends. The upper coupler includes a handle moveable between up and down positions. The handle is in operational contact with the upper conduit. The bottom of the upper coupler conduit is in operational contact with the top of the lower coupler conduit. Moving the handle between up and down positions causes up and down movement of the upper coupler conduit and the lower coupler conduit. In one non-limiting embodiment the upper coupler can be releasably attached to a range of lower coupler types.

16 Claims, 68 Drawing Sheets

(56) References Cited

U.S. PATENT DOCUMENTS

| | | | |
|---|---|---|---|
| 6,311,875 B1 * | 11/2001 | Anderson et al. | 222/396 |
| 6,367,667 B1 | 4/2002 | Ipsen | |
| 6,886,803 B2 * | 5/2005 | Mikiya et al. | 251/149.1 |
| 2006/0032870 A1 | 2/2006 | Murray | |
| 2006/0081660 A1 | 4/2006 | Harvey et al. | |
| 2008/0197156 A1 | 8/2008 | Wauters et al. | |
| 2010/0181346 A1 * | 7/2010 | Hanssen | 222/400.7 |

OTHER PUBLICATIONS

"Are Bear Keg Taps Universal", <URL: http://wiki.answers.com/Q/Are_beer_keg_taps_universal> , 1 pages; printed Jan. 21, 2011.

* cited by examiner

FIG. 2
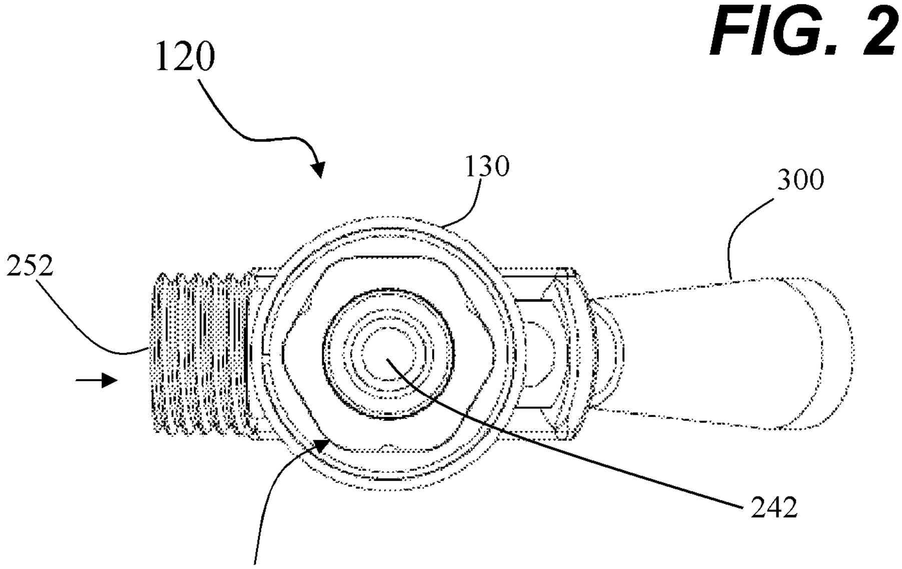
Bottom end 139 of upper coupler housing 130 defines a polygonal shape for receiving top end 145 of lower conduit 144
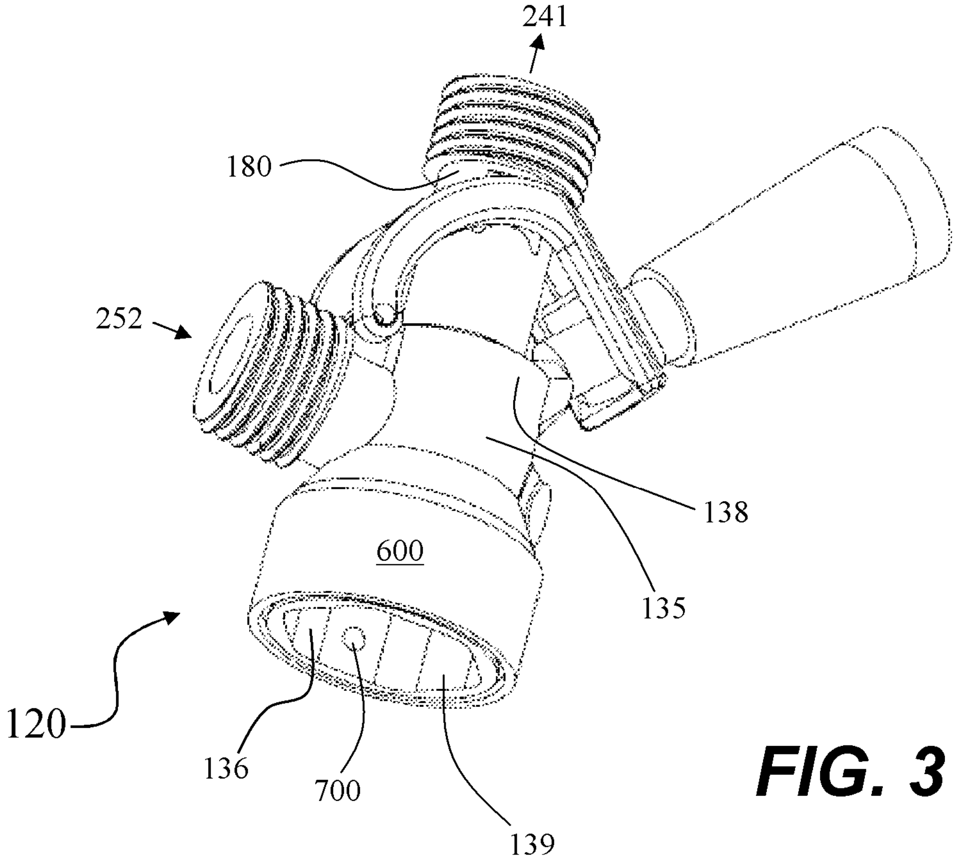
FIG. 3

FIG. 14
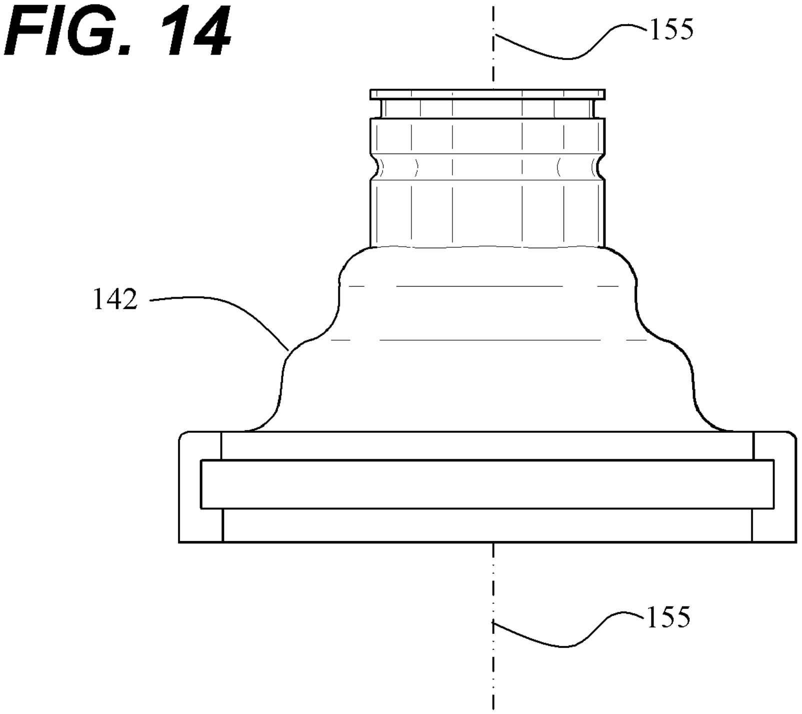
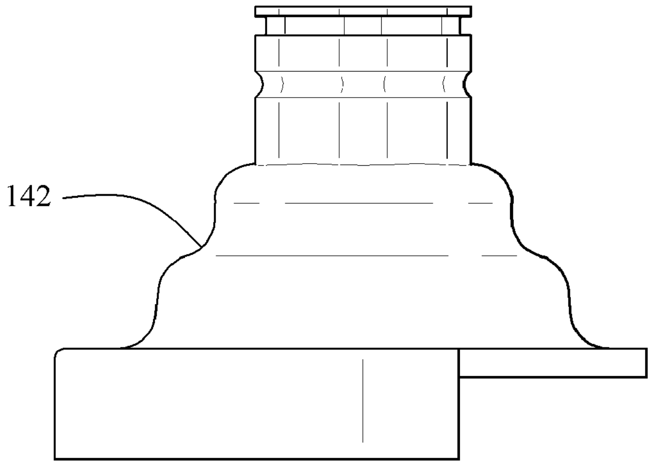
FIG. 15

FIG. 15A
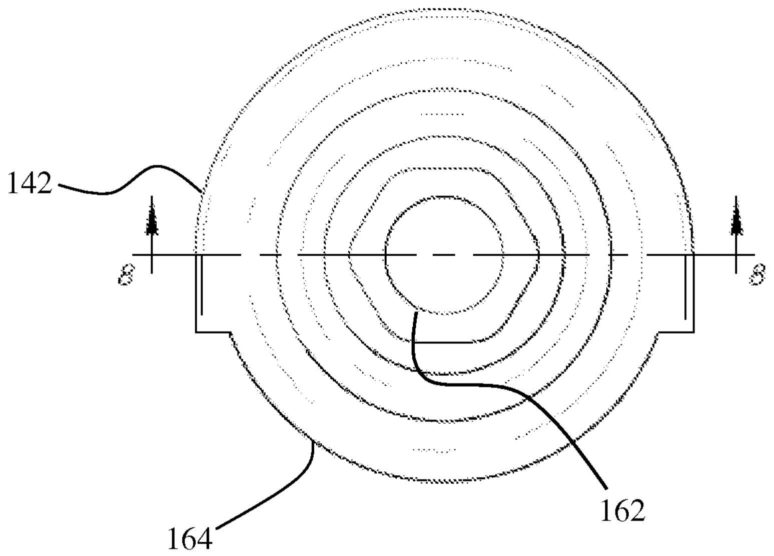
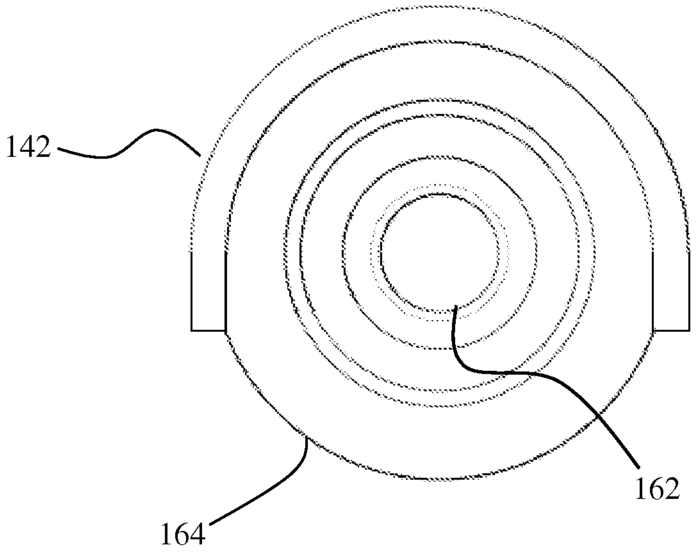
FIG. 15B

FIG. 15C
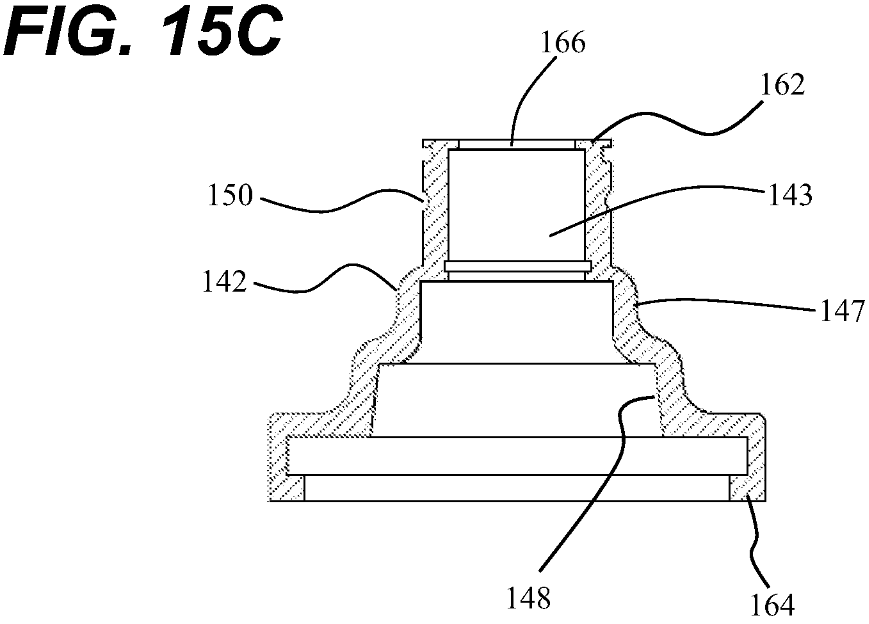
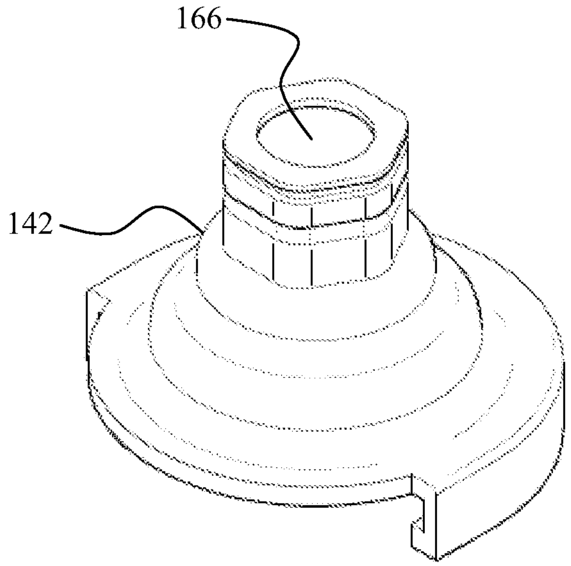
FIG. 15D

| TABLE 1 | |
|---|---|
| Part # | |
| 100 | keg tapping kit |
| 110 | keg |
| 120 | upper coupler |
| 130 | upper coupler housing |
| 132 | longitudinal axis 132 of upper coupler housing 130 |
| 135 | exterior surface 135 of upper coupler housing 130 |
| 136 | interior surface 136 of upper coupler housing 130 |
| 137 | external blind hole |
| 138<br>139 | top 138 and bottom 139 ends of upper coupler housing 130 |
| 140 | lower coupler |
| 142 | lower coupler housing |
| 143 | hollow interior 143 of lower coupler housing 142 |
| 144 | lower coupler conduit |
| 145<br>146 | top 145 and bottom 146 ends of lower coupler conduit 144 |
| 147 | exterior surface 147 of lower coupler housing 142 |
| 148 | interior surface 148 of lower coupler housing 142 |
| 150 | annular groove 150 in the exterior surface 147 of housing 142 |
| 152 | lower conduit spring |
| 153 | annular spring lip edge |
| 155 | longitudinal axis 155 of lower coupler housing 142 |
| 156 | through bore 156 of lower coupler conduit 144 |
| 157 | axes 132 and 155 effectively merge upon releasably attaching the lower coupler 140 to the upper coupler 120 (and vice versa) to define a longitudinal axis 157 of the keg tapping kit 100 as a whole |
| 160 | through bore 160 of upper coupler 120 |

*Fig. 18A*

| TABLE 1 (continued) | |
|---|---|
| Part # | |
| 162<br>164 | top and bottom ends 162 and 164 respectively of lower coupler housing 142 |
| 165 | lower coupler housing O-ring |
| 166 | opening 166 at the top 162 of lower coupler housing 142 |
| 170 | annular flange 170 about lower coupler conduit 144 |
| 172 | through-apertures 172 in annular flange 170 for the passage of gas around the lower coupler conduit 144 |
| 175 | gas pathway |
| 180 | upper conduit 180 which is in slidable engagement inside the first hollow bore 160 |
| 200<br>220 | top and bottom ends 200 and 220 of upper conduit 180 |
| 230 | exterior surface 230 of upper conduit 180 |
| 240 | upper conduit through bore 240 located between upper and lower ends 200 and 220 |
| 241 | beer exit |
| 242 | beer exit orifice |
| 247 | at least one O-ring |
| 250 | external grip surface 250 at top end 200 of upper conduit 180 |
| 251 | beer line |
| 252 | gas inlet port |
| 253 | bore 253 of gas inlet port 252 |
| 254 | gas line |
| 255 | tank |
| 256 | gas line valve |
| 257 | beer line valve |

*Fig. 18B*

| TABLE 1 (continued) | |
|---|---|
| Part # | |
| 260 | optional check valve |
| 265 | downward facing upper shoulder |
| 270a<br>270b | upward facing lower shoulders 270a and 270b |
| 280 | check valve locking pin |
| 290 | O-ring |
| 300 | handle |
| 320 | handle 300 pivotally connected at 320 to the exterior of the coupler housing 130 |
| 330 | two pronged bracket 330 of handle 300 |
| 334 | bottom edge 334 of two pronged bracket 330 |
| 340 | handle 300 comprises a grip portion 340 |
| 360<br>380 | first and second curved prongs 360 and 380 |
| 400 | prong gap |
| 420<br>440 | first and second prong upper surfaces 420 and 440 |
| 460<br>480 | first and second prong lower surfaces 460 and 480 |
| 500 | hollow bore 500 located inside grip portion 340 of handle 300 |
| 520 | tubular probe 520 located inside bore 500 |
| 540 | spring 540 located inside bore 500, spring 540 provides spring bias to the probe 520 |
| 560 | probe fastener or bolt 560 |
| 600 | locking collar |
| 610 | top rim 610 of the locking collar 600 |
| 620 | locking collar spring |

*Fig. 18C*

| TABLE 1 (continued) | |
|---|---|
| Part # | |
| 640 | internal annular flange 640 extends around the bottom of the locking collar 600 to provide support to the locking collar spring 620 |
| | |
| | |
| 700 | at least one spherically shaped cavity 700 located proximate to the bottom 139 of the upper coupler housing 130 |
| 720 | locking member 720 which locks the lower coupler housing 142 to the housing 300 of upper coupler 120 by protruding into groove annular groove 150 |
| 740 | internal surface 740 of locking collar 600 |
| 760 | cambered surface 760 of locking collar 600 |
| 770 | cambered angle 770 |
| 780 | retaining ring 780 |
| 800 | annular groove 800 |

*Fig. 18D*

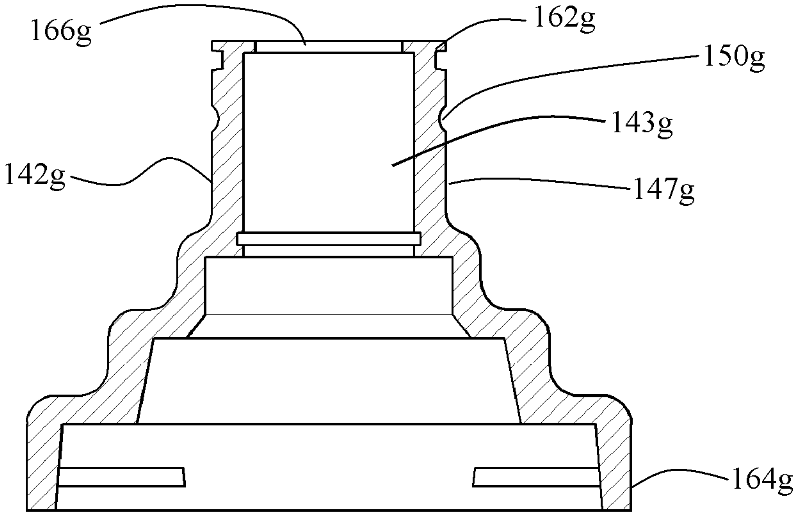
FIG. 36C
FIG. 36D
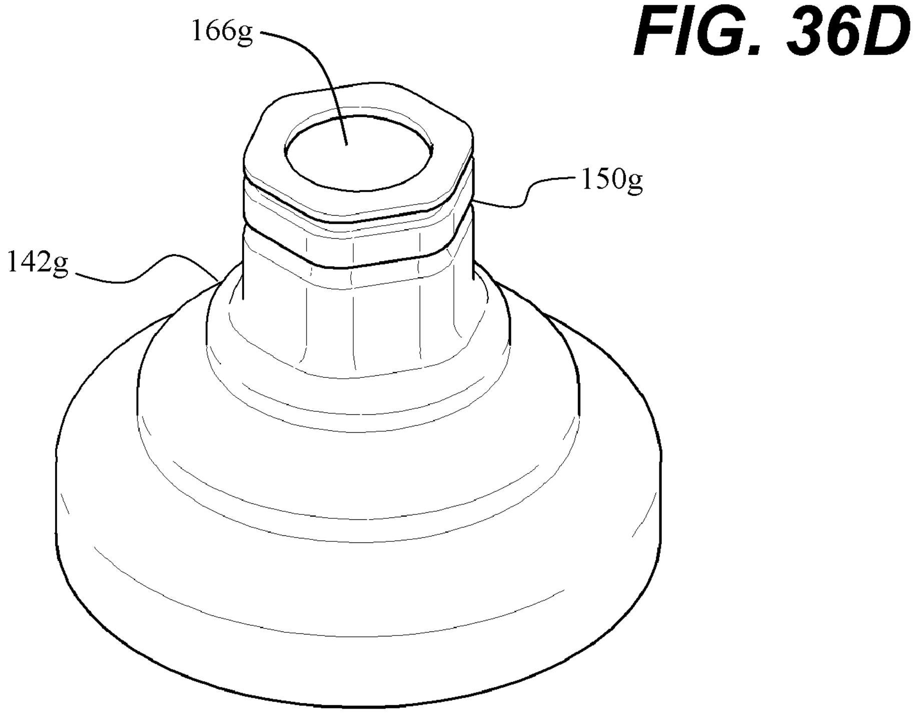

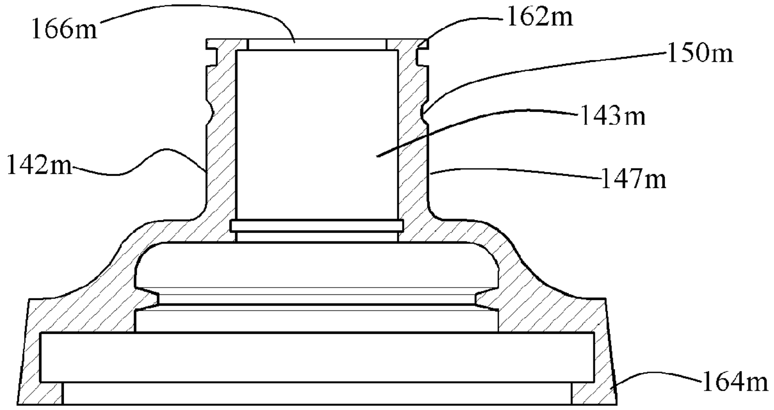
FIG. 44C
FIG. 44D
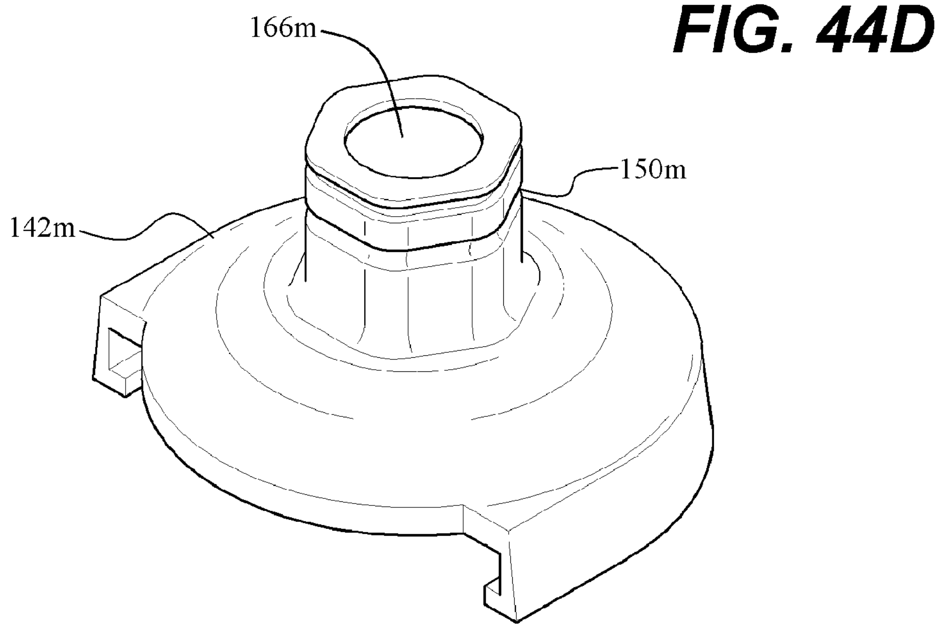

KEG TAPPING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

This invention relates to tapping kegs. More specifically, the invention is a keg tapping kit for tapping a range of kegs without requiring the disconnection of the beer and/or compressed gas line.

BACKGROUND OF THE INVENTION

Tapping kegs such as beer kegs is a cumbersome task given the number of different kinds of couplers required to tap the range of kegs supplied to commercial drinking establishments. There are a range of couplers to fit keg valve types of which there are several. Keg valve systems include: A System, D system, G System, M System, S System, and the U System. Each valve system requires a specific coupler to tap them. Apart from the various couplers used to tap kegs tapping a fresh keg typically involves detaching and reattaching an air or compressed gas line (for example, compressed nitrogen or carbon dioxide) and beer line from the coupler. The arrangement of a prior art coupler, beer line and gas line is shown, for example, in FIG. 1 of U.S. Pat. No. 3,861,569 issued to Johnston on Jan. 21, 1975; U.S. Pat. No. 3,861,569 is incorporated by reference herein in its entirety.

For example, in the prior art commercial pub scene the 748E coupler is a coupler typically used to tap kegs employing the D System, which includes well over 50 different beers from Abita Amber through Zuma Morena Dark Lager. The 7486E coupler is often used to tap kegs employing the S System, from Amstel through Young's Special Ale. The DH1501 coupler is typically used to tap kegs employing the A system, from Ayinger Altbairisch Dunkel through Weihenstephan Original Lager. The GTL425 coupler is typically used to tap kegs employing the G System, from Abbot Ale through Wexford Irish Cream Ale. The G408 coupler is typically used to tap kegs employing the U System, from Abby White through Smithwicks Irish Ale. The M1500 coupler is used to tap kegs employing the M System, from Aventinus Eisbock through Zywiec.

There is a need for an improved tapping system.

SUMMARY

A keg tapping system made up of an upper coupler and a lower coupler having, respectively, upper and lower housings and slidable upper and lower coupler conduits therein. The upper and lower coupler conduits each have top and bottom ends. The upper coupler includes a handle moveable between up and down positions. The handle is in operational contact with the upper conduit. The bottom of the upper coupler conduit is in operational contact with the top of the lower coupler conduit. Moving the handle between up and down positions causes up and down movement of the upper coupler conduit and the lower coupler conduit. In one non-limiting embodiment the upper coupler can be releasably attached to a range of lower coupler types.

BRIEF DESCRIPTION OF THE DRAWINGS

FIG. 2 shows a bottom view of an upper coupler 120.

FIG. 3 shows a perspective view of the upper coupler 120.

FIGS. 14 and 15 show side views of lower coupler housing 142.

FIGS. 15A and 15B show top and bottom elevated views of the lower coupler housing 142.

FIG. 15C shows a section view of housing 142 along lines 8-8 of FIG. 15A.

FIG. 15D shows a perspective view of housing 142.

FIGS. 18A through 18D show a Table (Table 1) which shows a list of labels and reference numerals and the elements to which they refer. To assist the reader the lower coupler 140 is denoted as "140" with respect to the A System. Lower couplers 140 are denoted by 140*d*, 140*g*, 140*m*, 140*s* and 140*u* with respect to the D System, G System, M System, S System, and U System; likewise with respect to corresponding parts.

With respect to FIGS. 19 through 28, numeric labels ending in the letter "d" indicate parts of the lower coupler 140*d* for use in tapping a D system keg. The meaning of the numeric component (e.g., "170" of "170*d*") is found in Table 1 (see FIGS. 18A through 18D).

Figure 19:
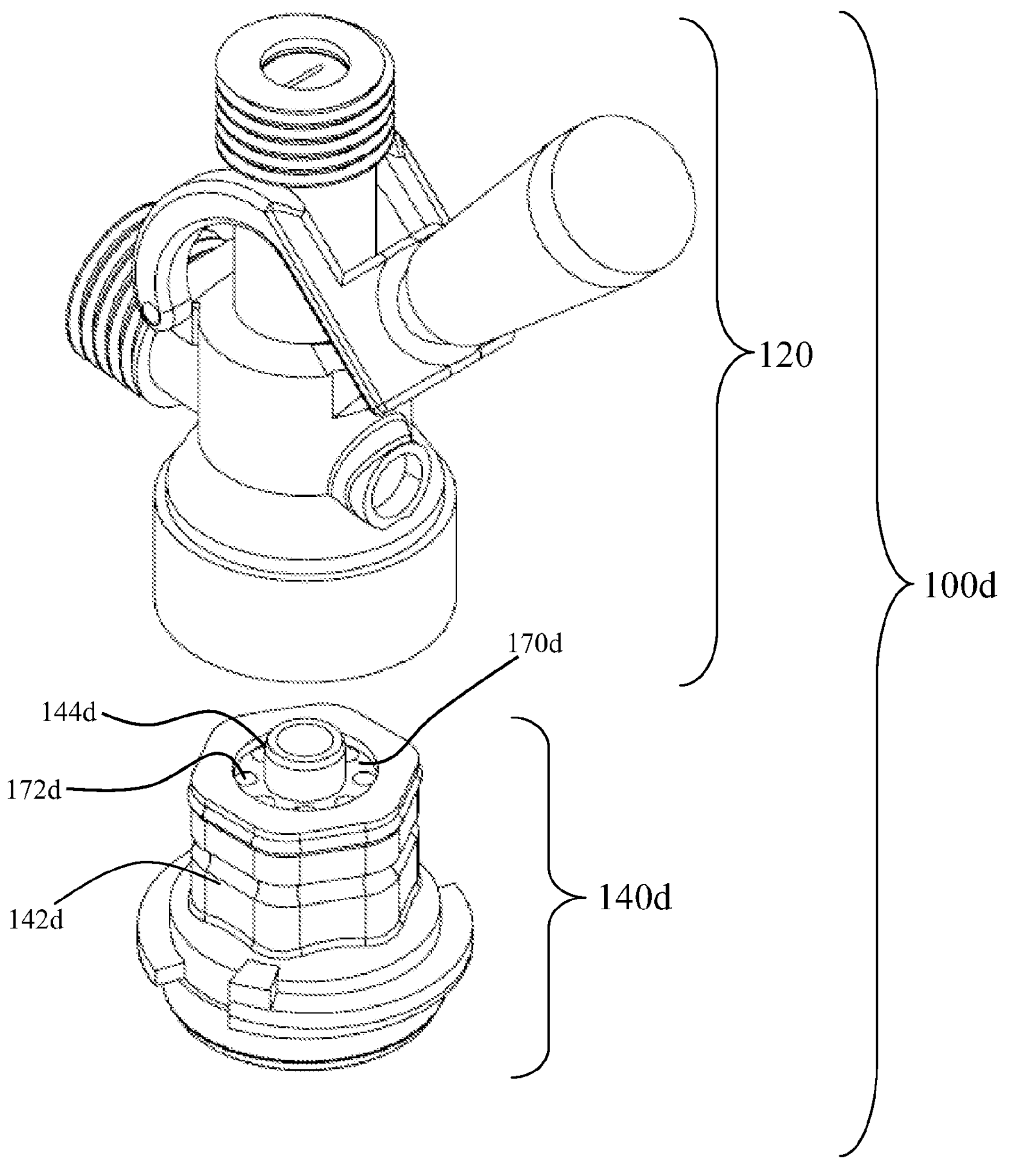

FIG. 19 shows the upper 120 and lower 140*d* couplers of keg tapping kit 100*d*.

Figure 20:
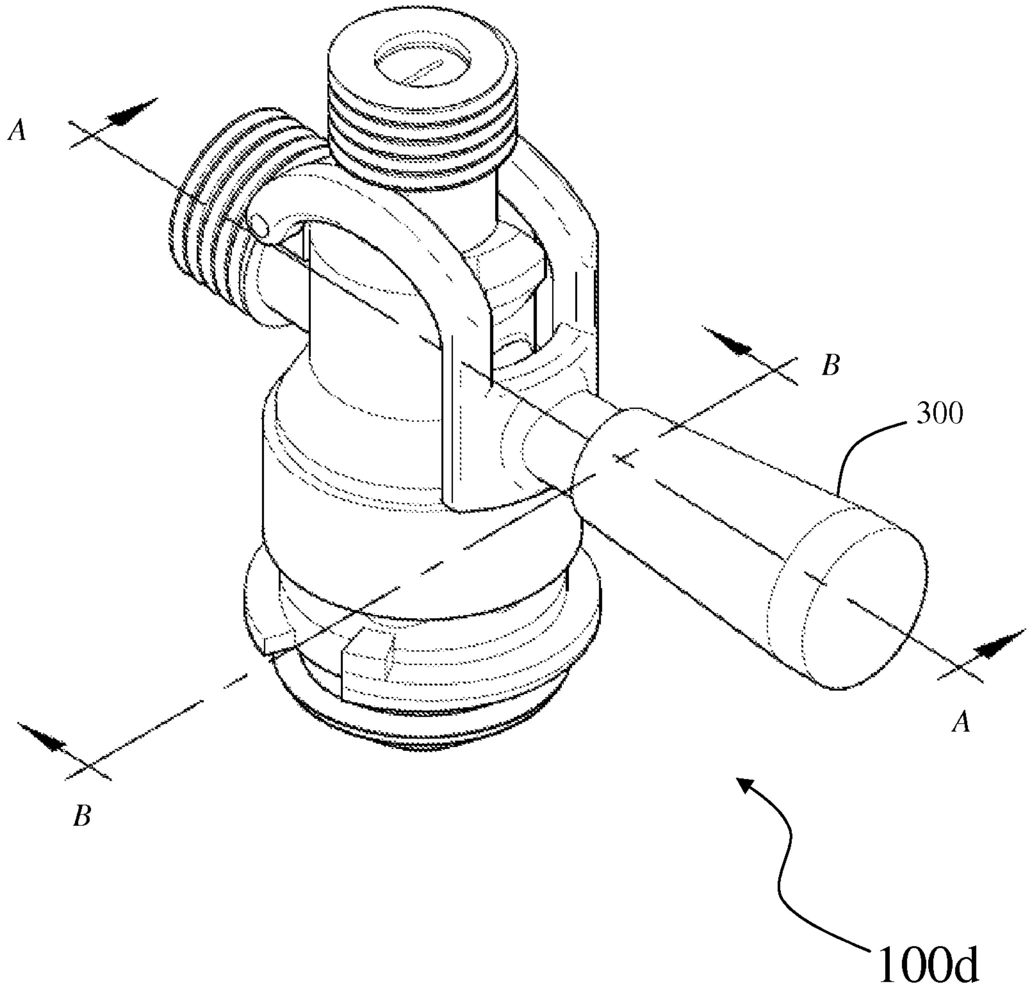

FIG. 20 shows a perspective view of a keg tapping kit 100*d* with the handle 300 in the down position.

Figure 21:
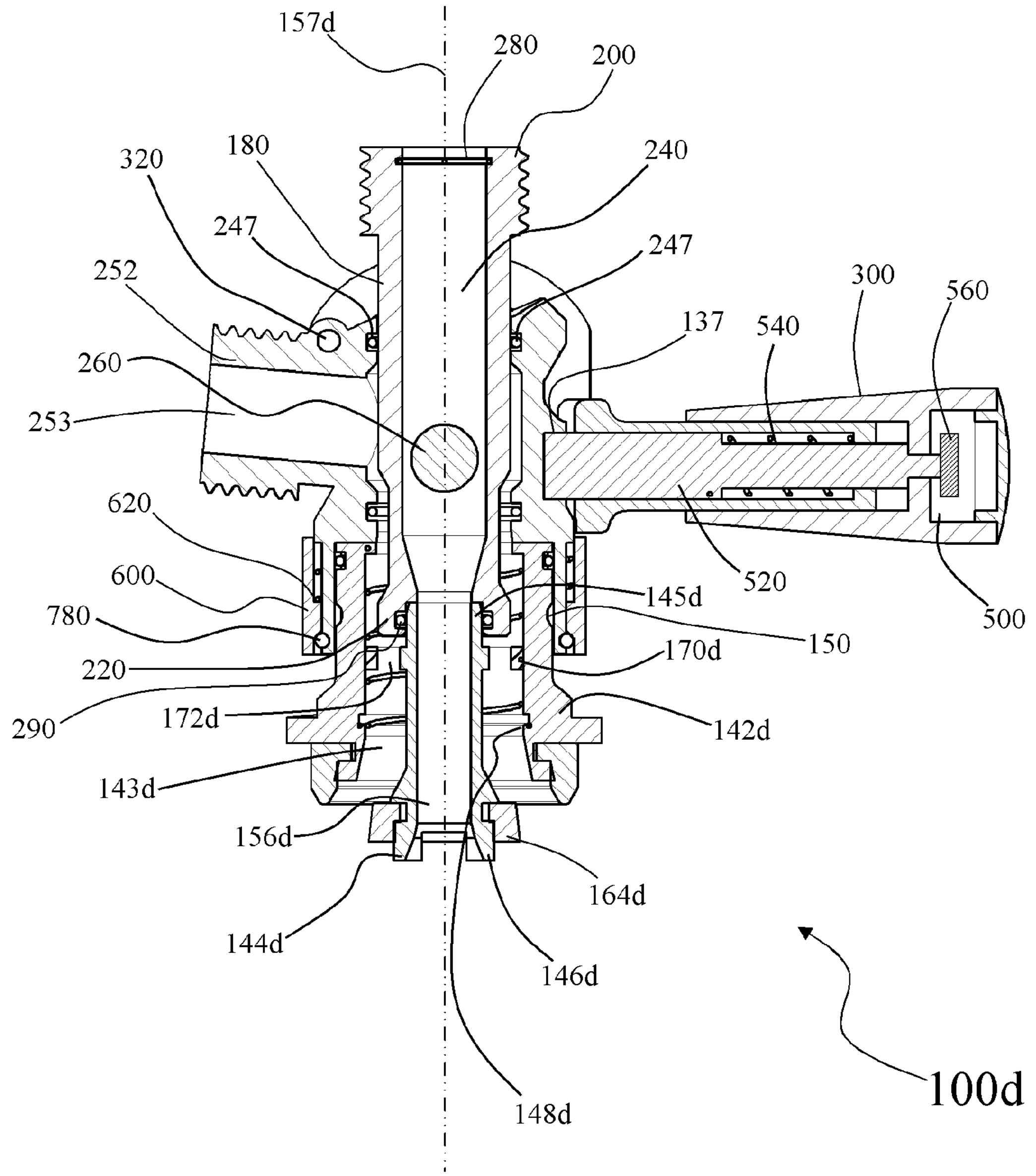

FIG. 21 shows a section view along lines A-A of FIG. 20.

Figure 22:
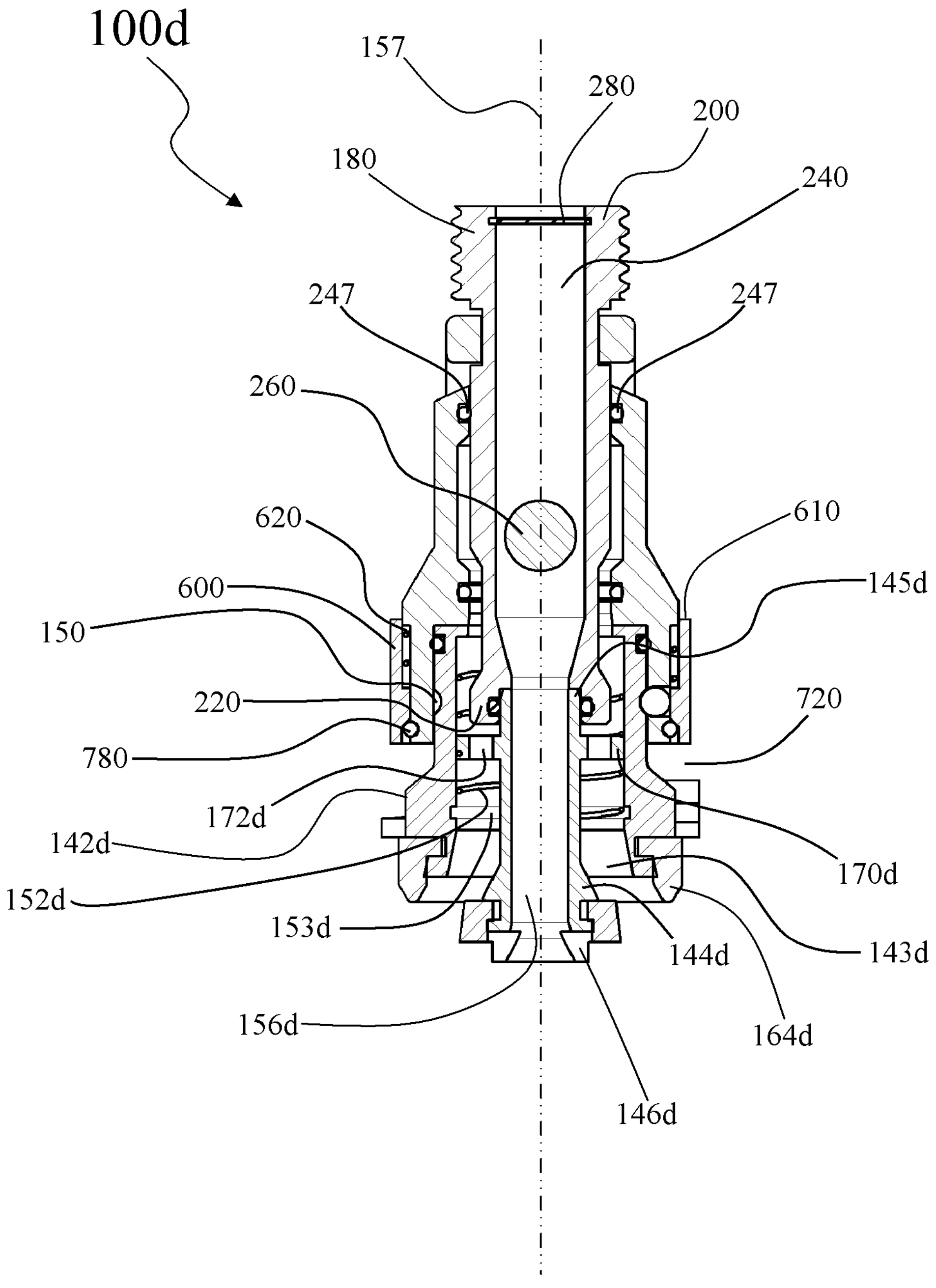

FIG. 22 shows a section view along lines B-B of FIG. 20.

Figure 23:
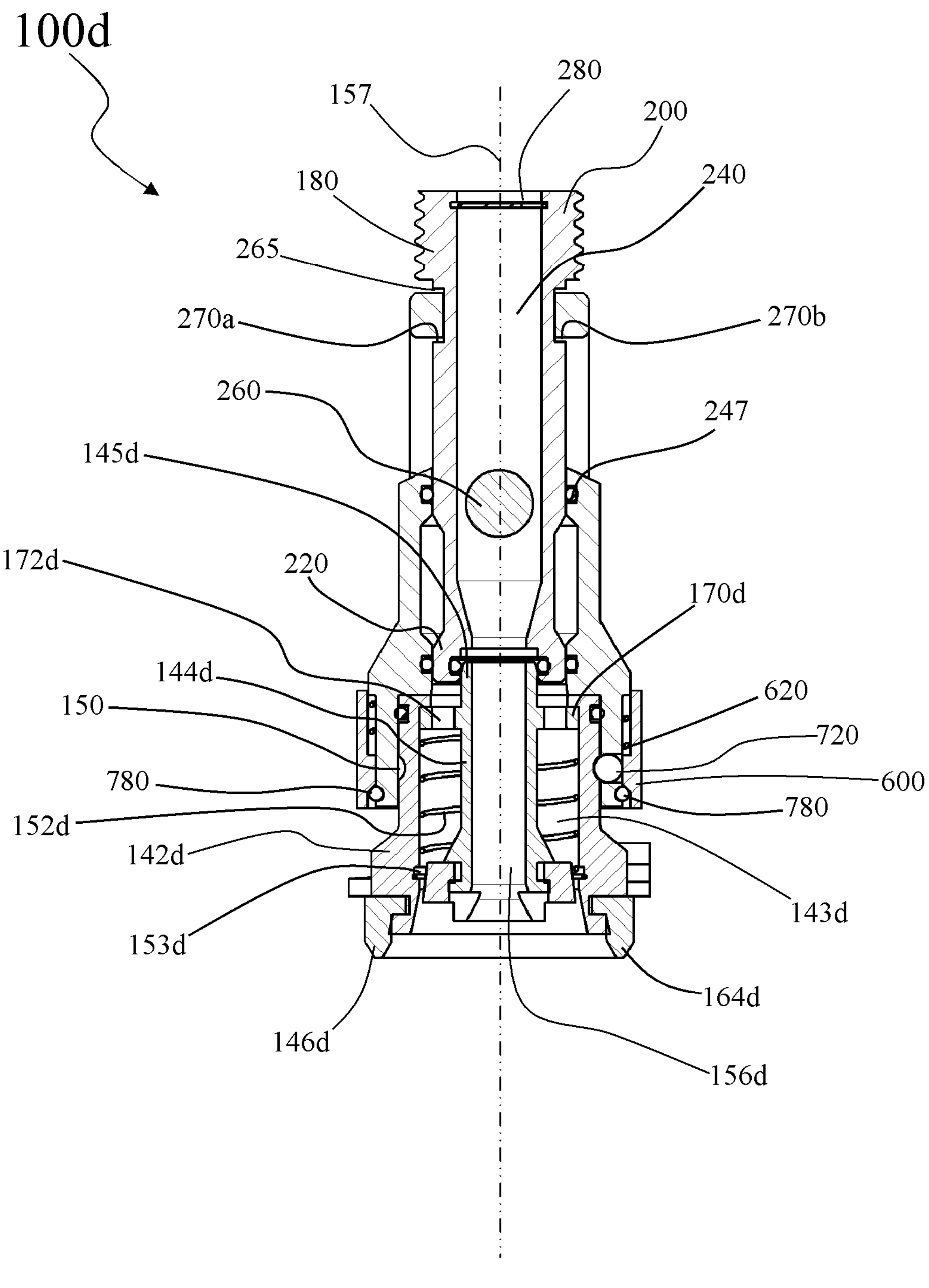

FIG. 23 shows a section view of tapping kit 100*d* with the handle 300 (not visible in FIG. 23) in an up position.

Figure 24:
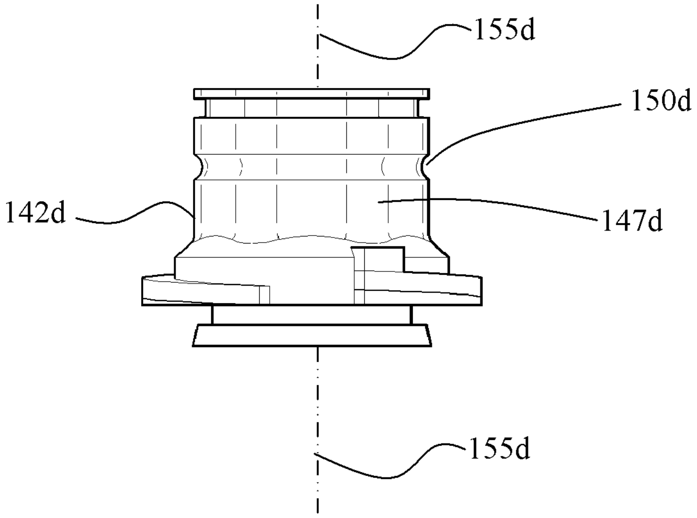
Figure 25:
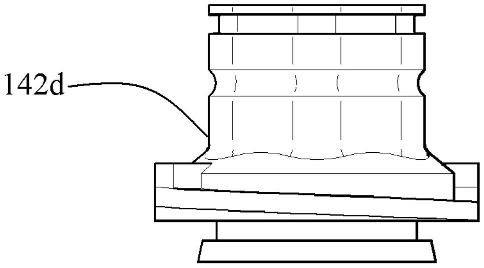

FIGS. 24 and 25 show side views of lower coupler housing 142*d*.

Figure 26:
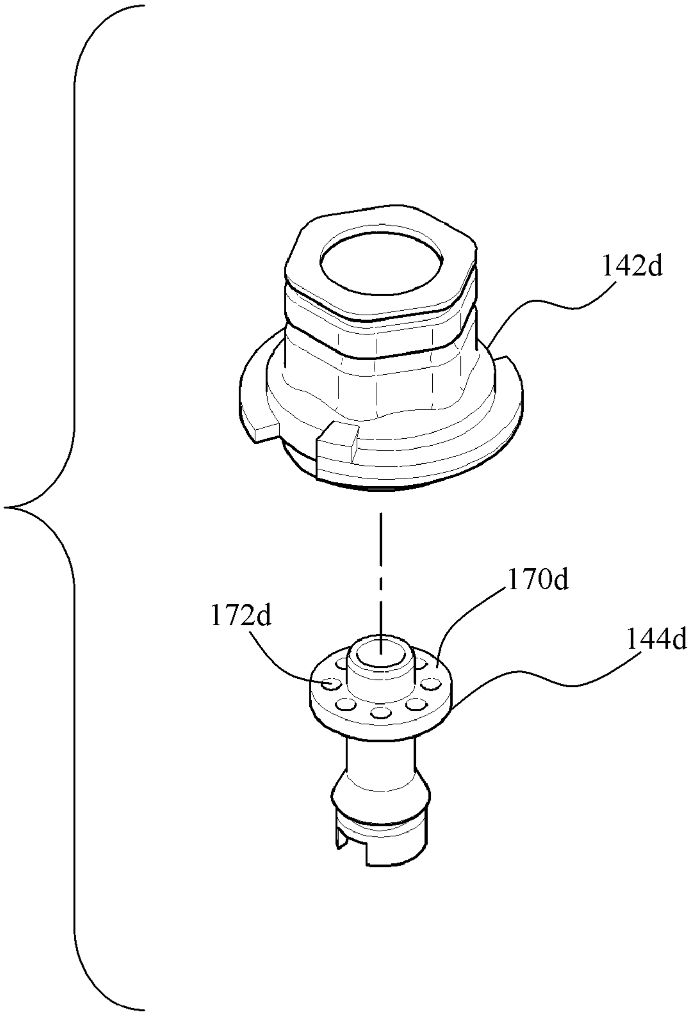

FIG. 26 shows a perspective view of a lower coupler housing 142 and lower coupler conduit 144.

Figure 27A:
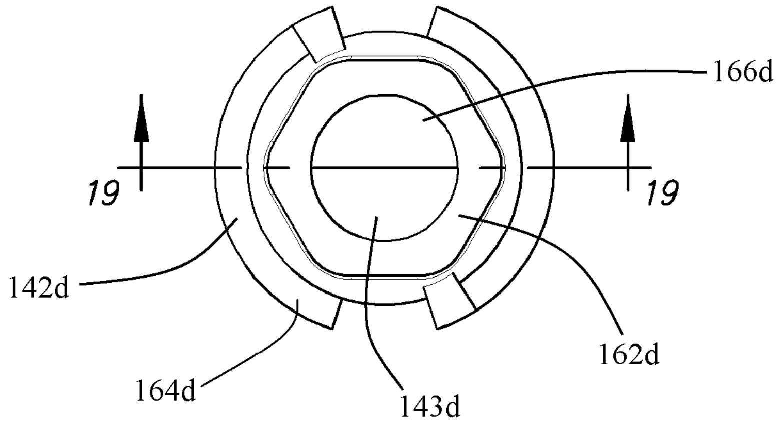
Figure 27B:
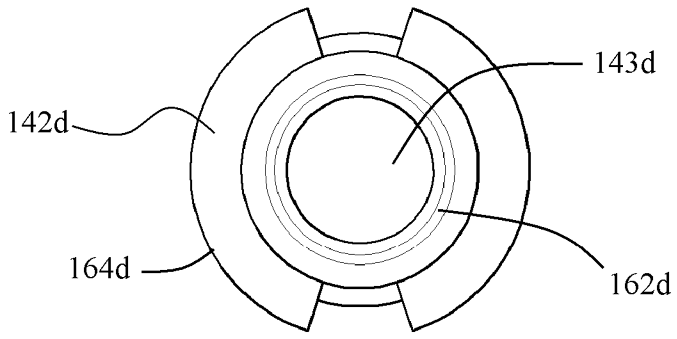

FIGS. 27A and 27B show top and bottom elevated views of the lower coupler housing 142*d*.

Figure 27C:
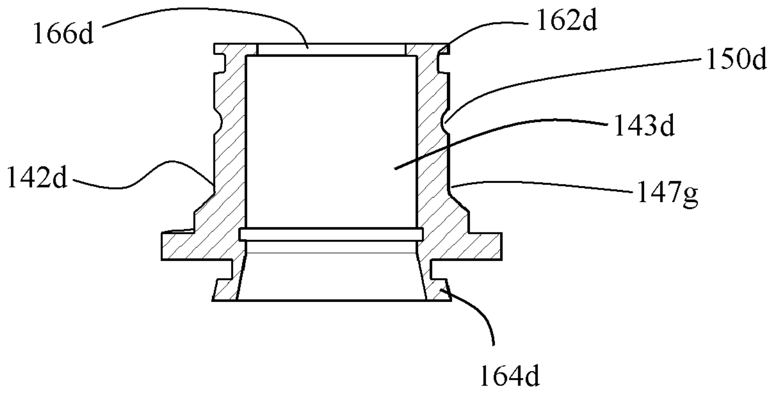

FIG. 27C shows a section view of housing 142*d* along lines 19-19 of FIG. 27A.

Figure 27D:
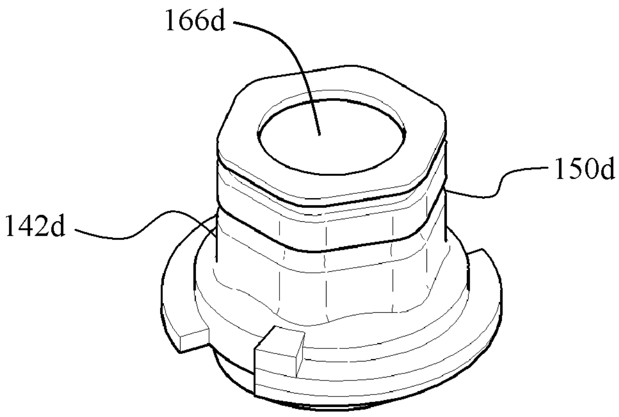

FIG. 27D shows a perspective view of housing 142*d*

Figure 28A:
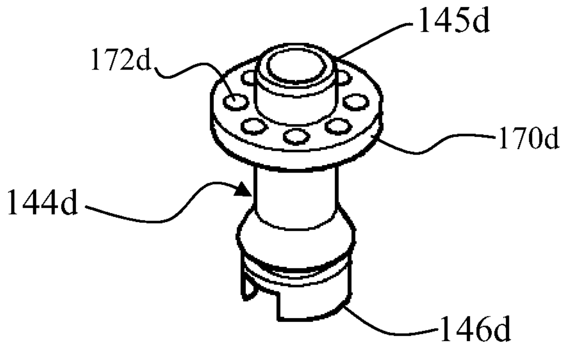
Figure 28B:
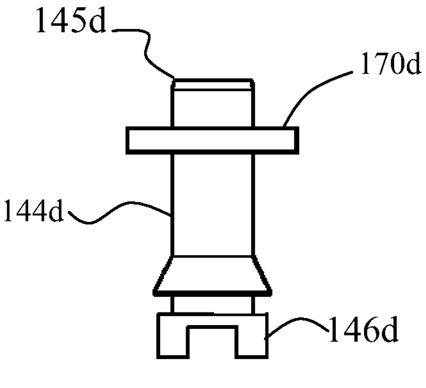
Figure 28C:
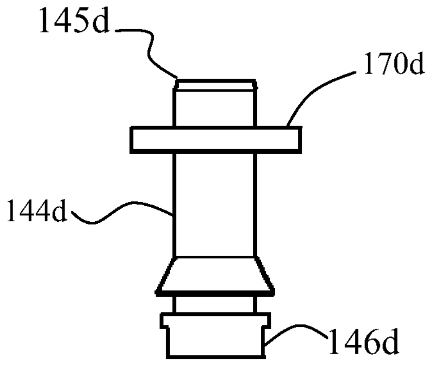

FIGS. 28A through 28C show various views of lower coupler conduit 144*d*.

With respect to FIGS. 29 through 36, numeric labels ending in the letter "g" indicate parts of the lower coupler 140*g* for use in tapping a G system keg. The meaning of the numeric component (e.g., "170" of "170*g*") is found in Table 1 (see FIGS. 18A through 18D).

Figure 29:
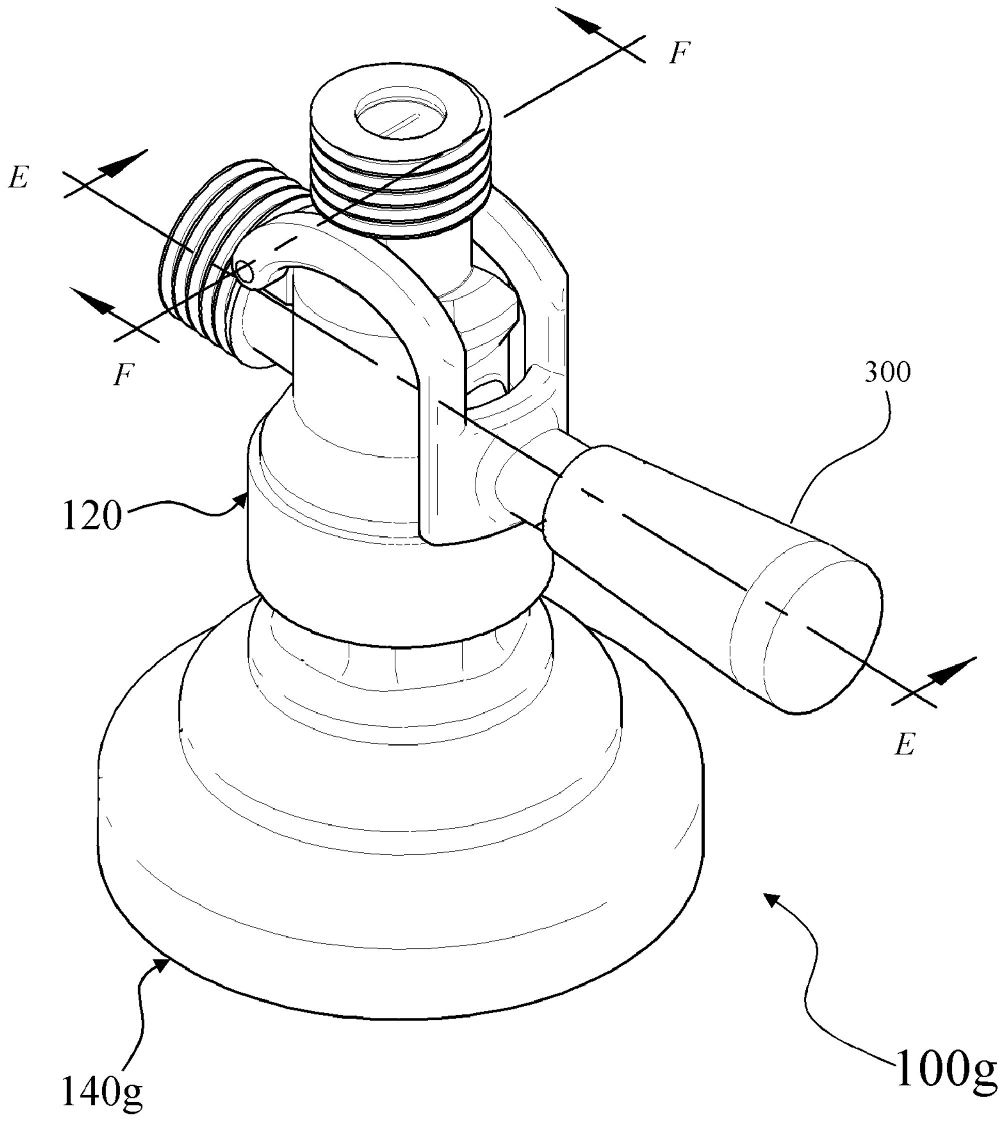

FIG. 29 shows a keg tapping kit 100*g*.

Figure 30:
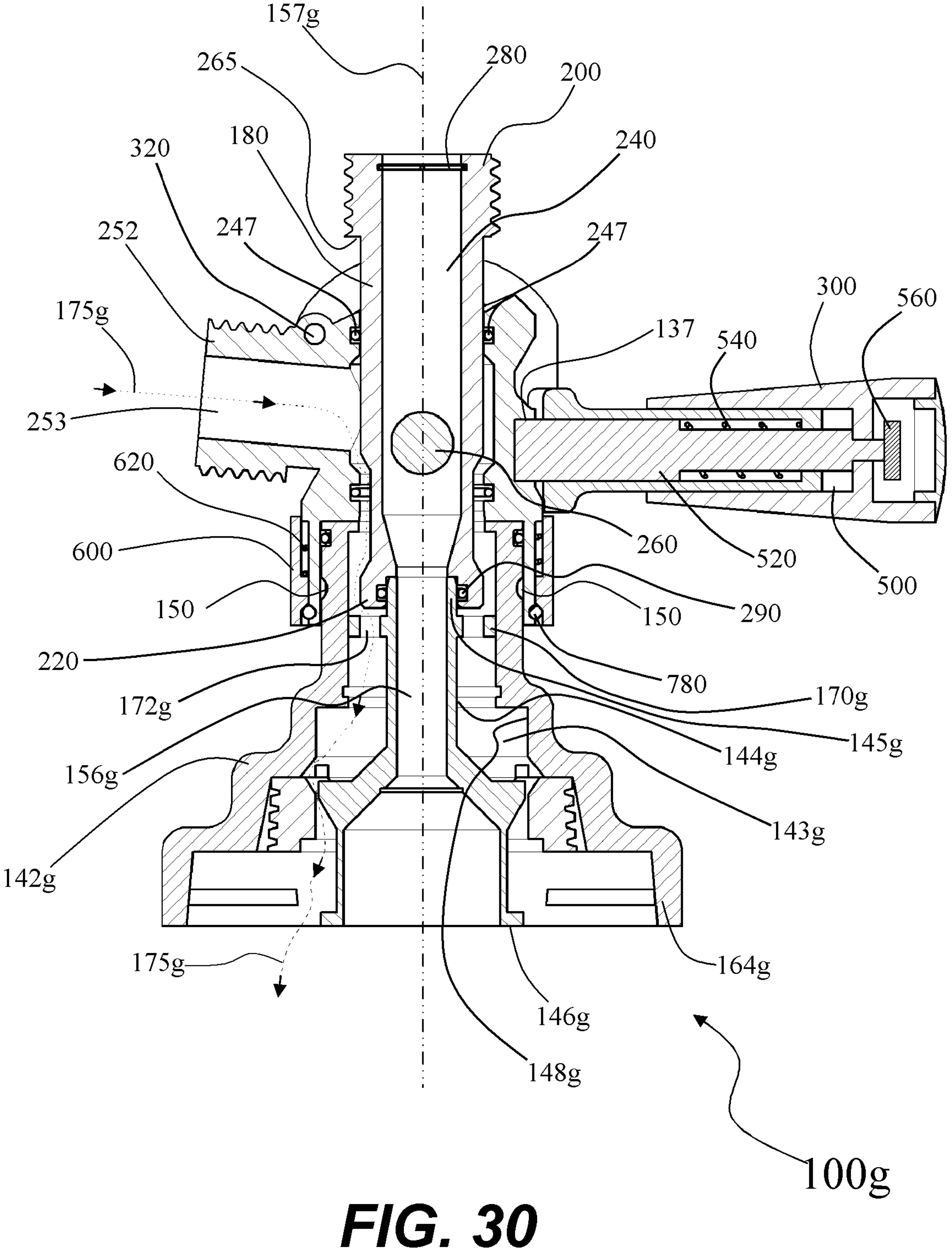

FIG. 30 shows a section view along lines E-E of the keg tapping kit 100*g* shown in FIG. 29 with the position of handle 300 in the down position as shown in FIG. 29.

Figure 31:
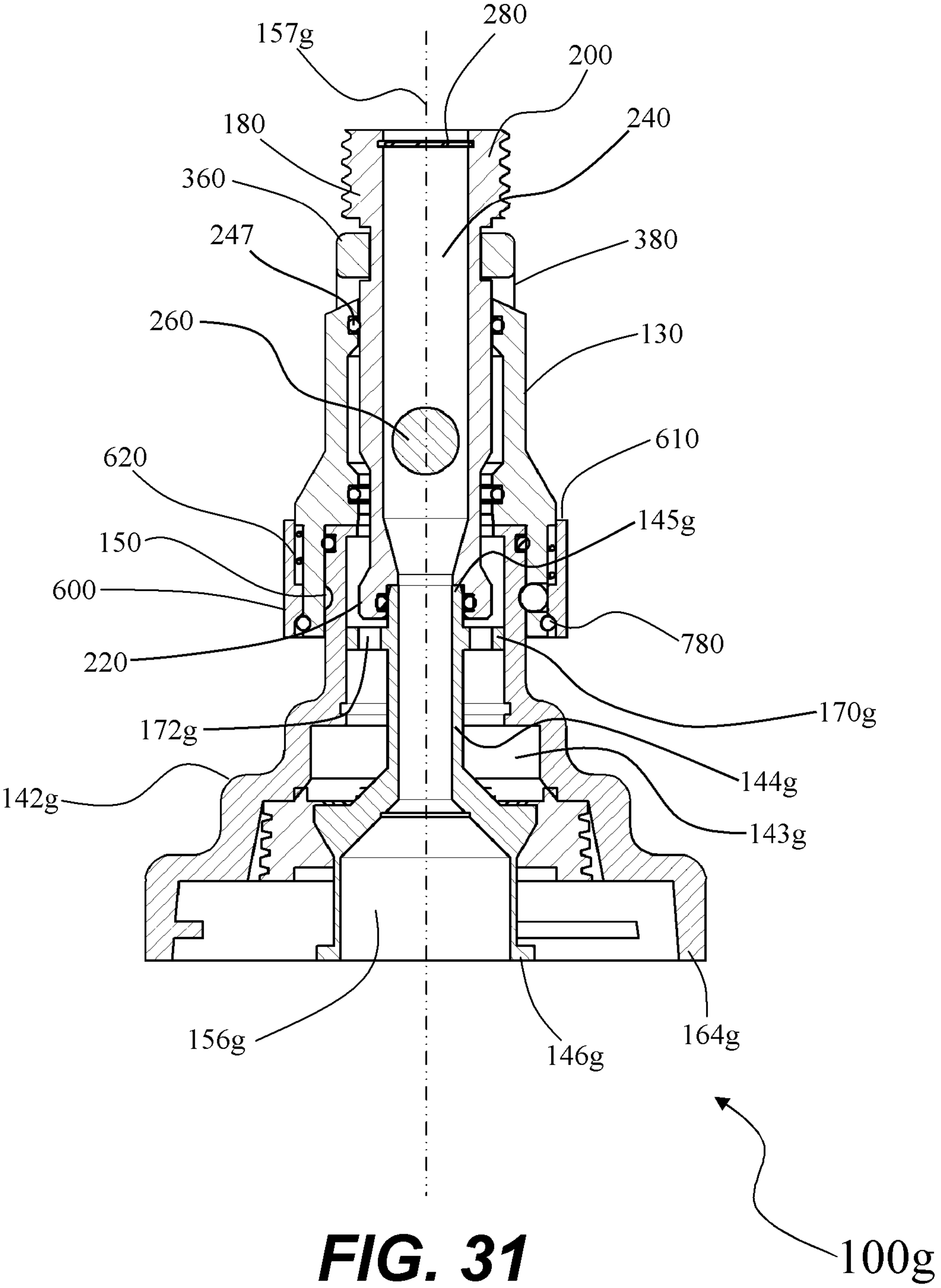

FIG. 31 shows a section view along lines F-F of the keg tapping kit 100*g* shown in FIG. 29 with the position of handle 300 as shown in FIG. 29.

Figure 32:
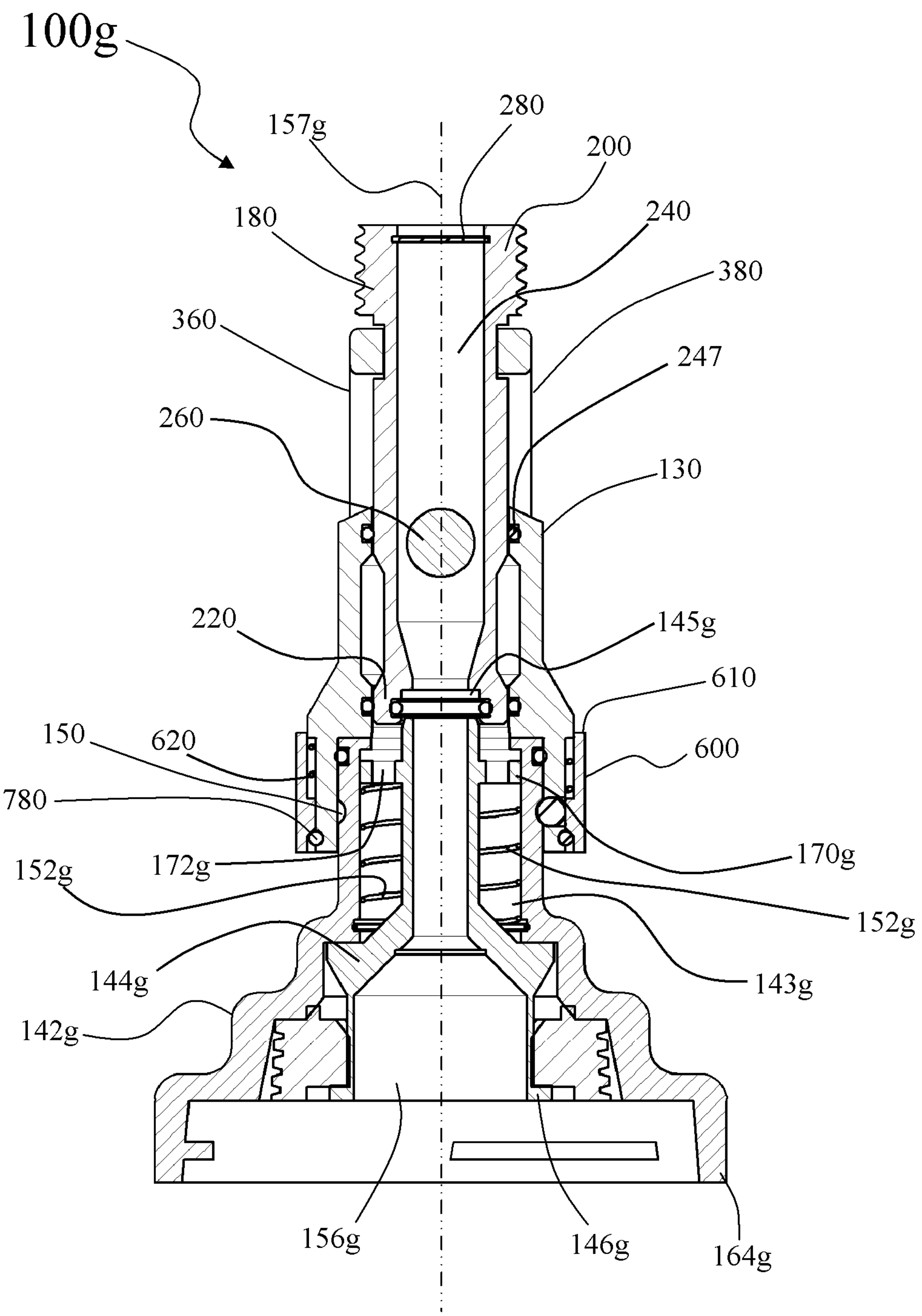

FIG. 32 shows a section view along lines F-F of the keg tapping kit 100*g* shown in FIG. 29 but with the handle 300 in an up position.

Figure 33:
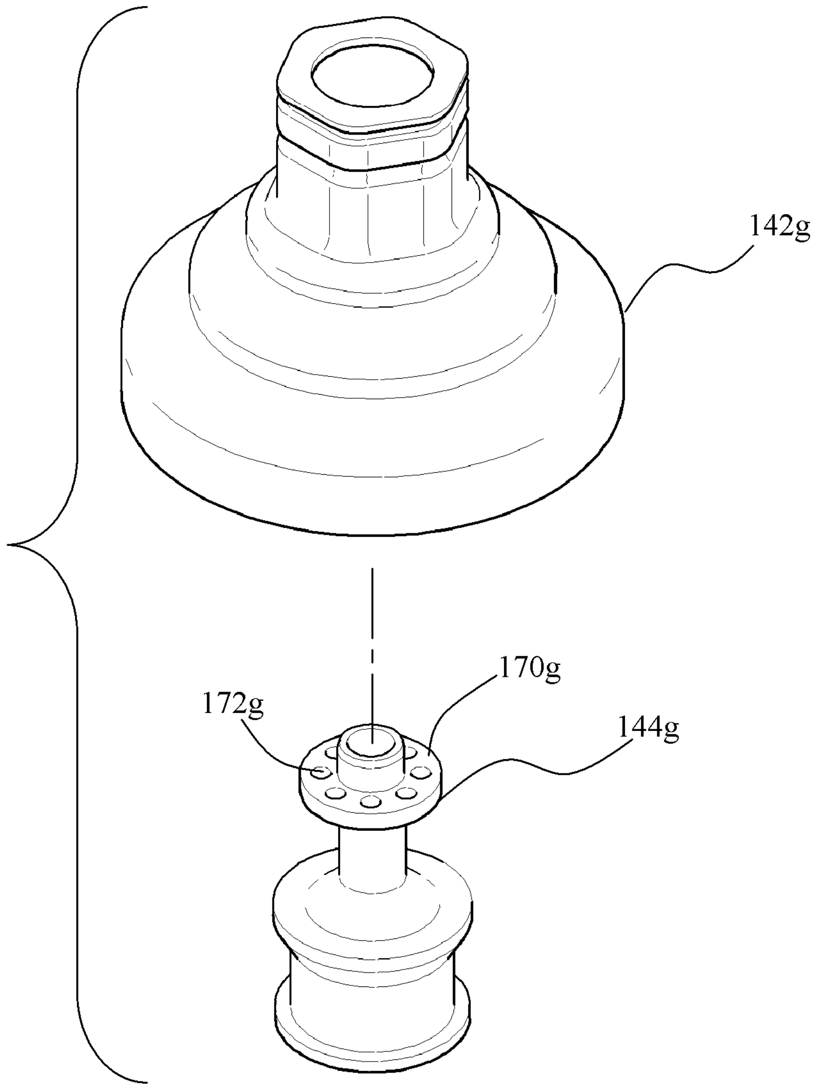

FIG. 33 shows a perspective view of a lower coupler housing 142*g* and lower coupler conduit 144*g*.

Figure 34:
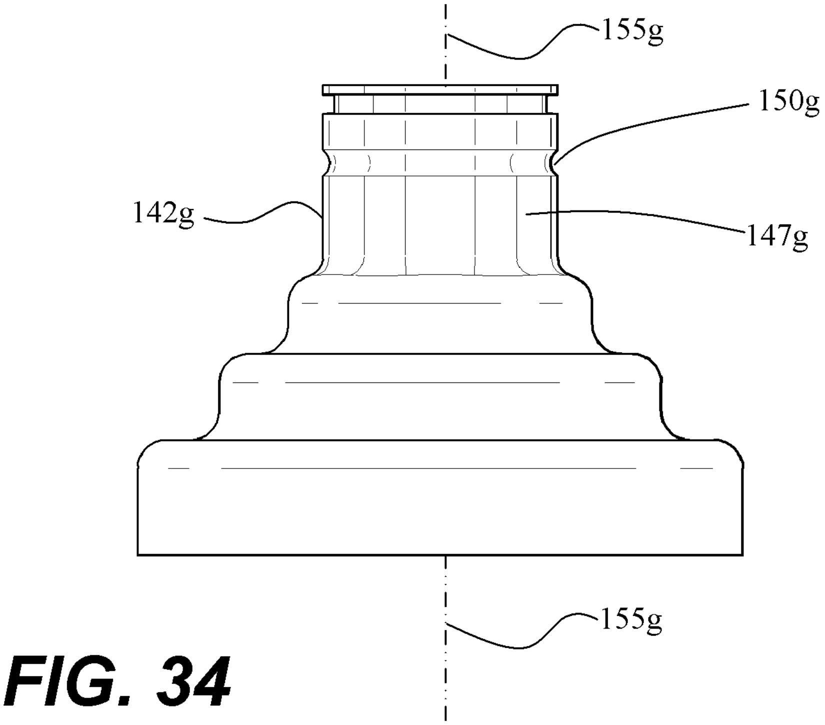
Figure 35:
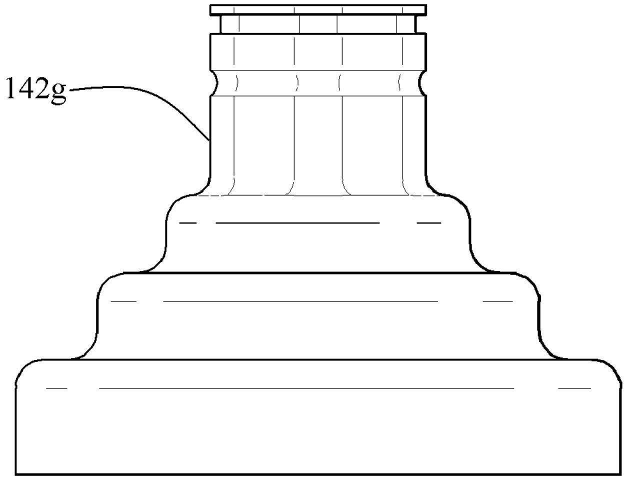

FIGS. 34 and 35 show side views of lower coupler housing 142*g*.

Figure 36A:
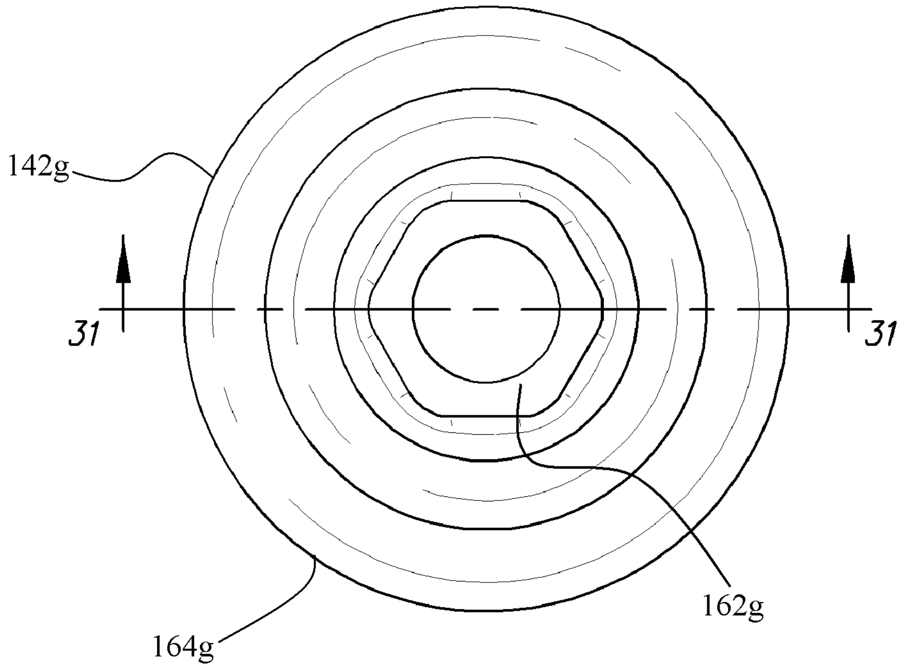
Figure 36B:
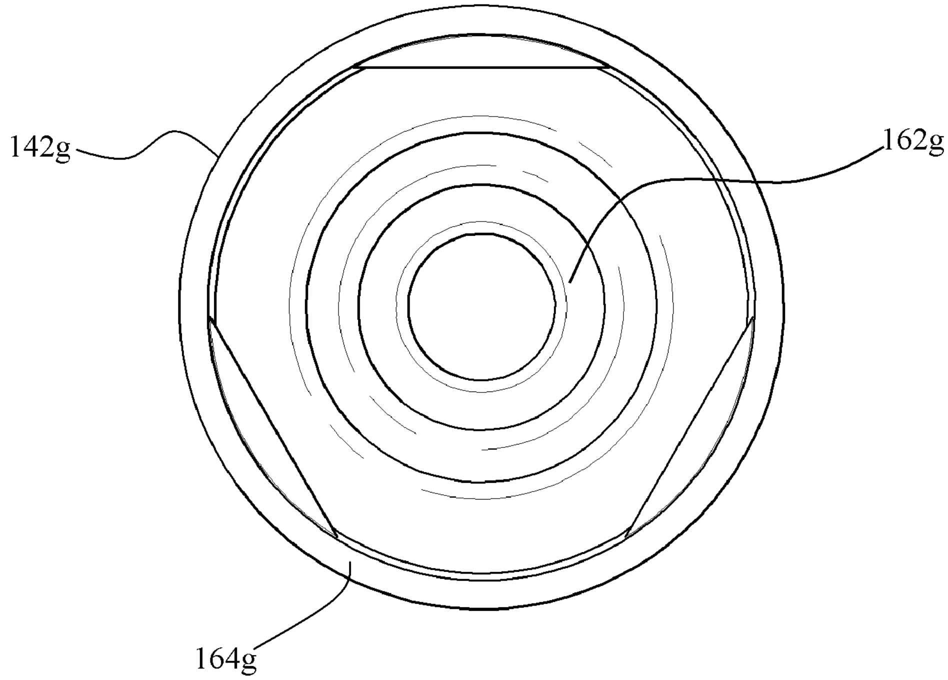

FIGS. 36A and 36B show top and bottom elevated views of the lower coupler housing 142*g*.

FIG. 36C shows a section view of housing 142*g* along lines 31-31 of FIG. 36A.

FIG. 36D shows a perspective view of housing 142*g*

With respect to FIGS. 37 through 46, numeric labels ending in the letter "m" indicate parts of the lower coupler 140*m* for use in tapping an M system keg. The meaning of the numeric component (e.g., "170" of "170*g*") is found in Table 1 (see FIGS. 18A through 18D).

Figure 37:
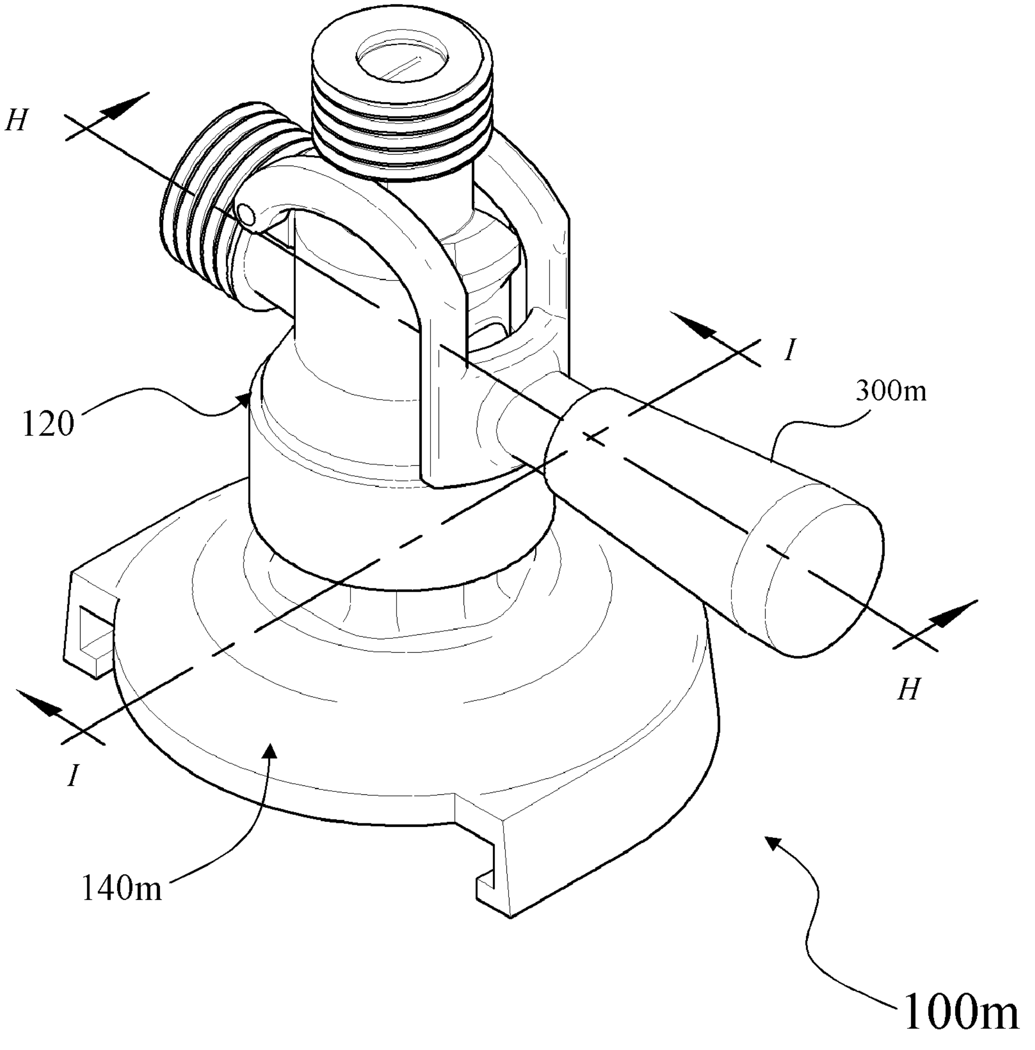

FIG. 37 shows a perspective view of a keg tapping kit 100*m* with the handle 300*m* in the down position.

Figure 38:
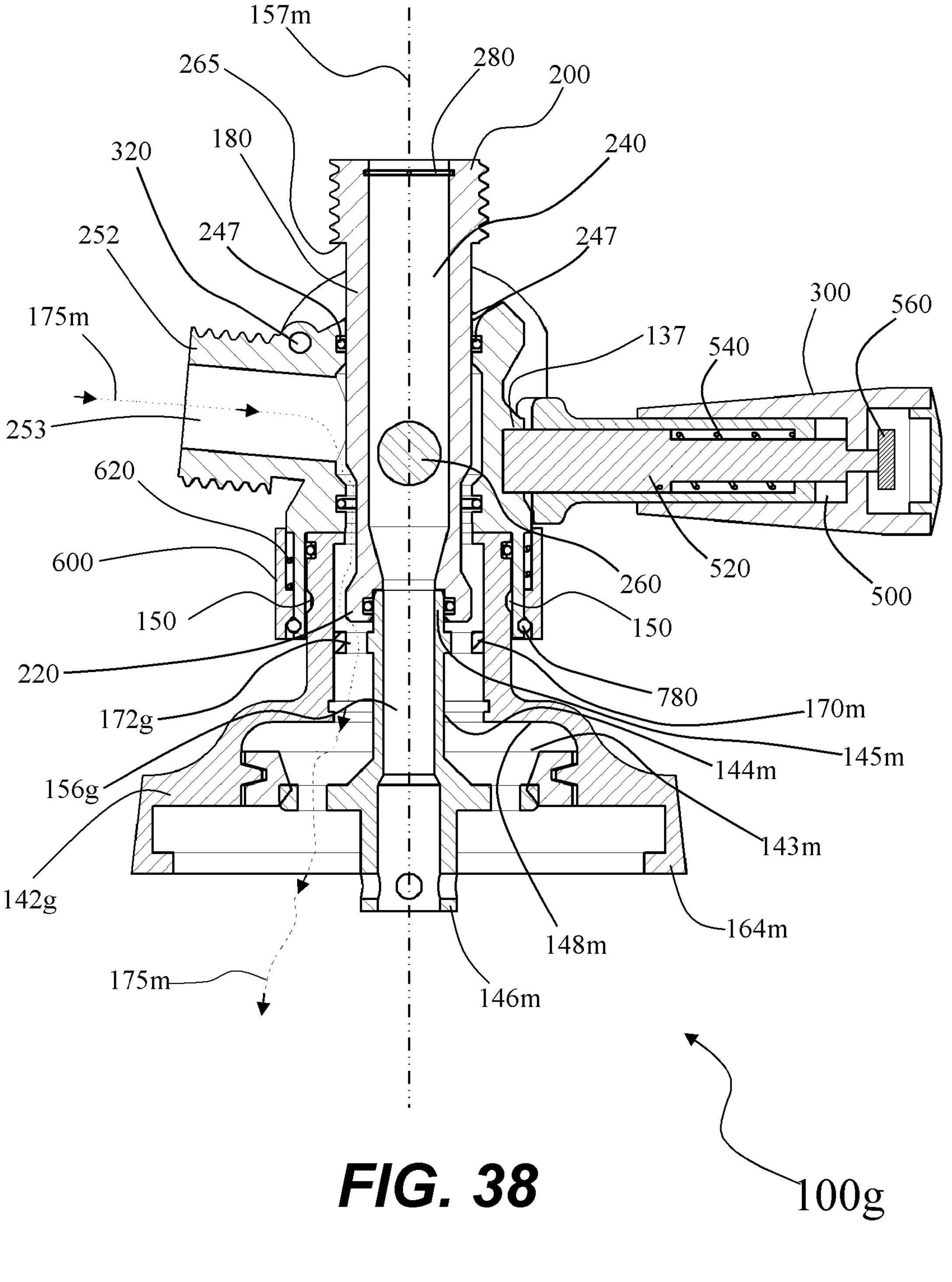

FIG. 38 shows a section view along lines H-H of the keg tapping kit 100*m* shown in FIG. 37 with the handle 300 in the down position as shown in FIG. 30.

Figure 39:
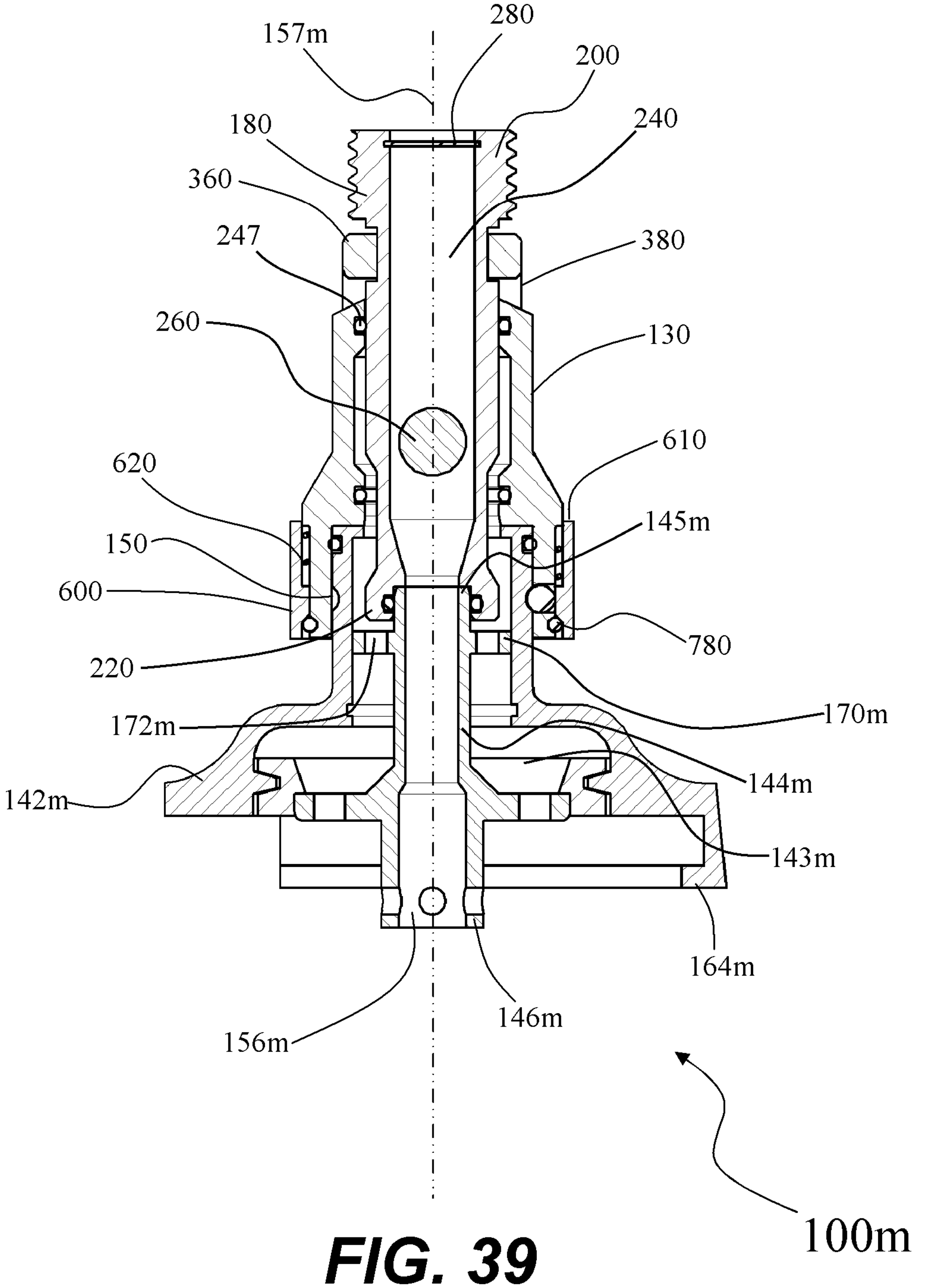

FIG. 39 shows a section view along lines I-I of the keg tapping kit 100*m* shown in FIG. 37 with the position of handle 300 in the down position as shown in FIG. 37.

Figure 40:
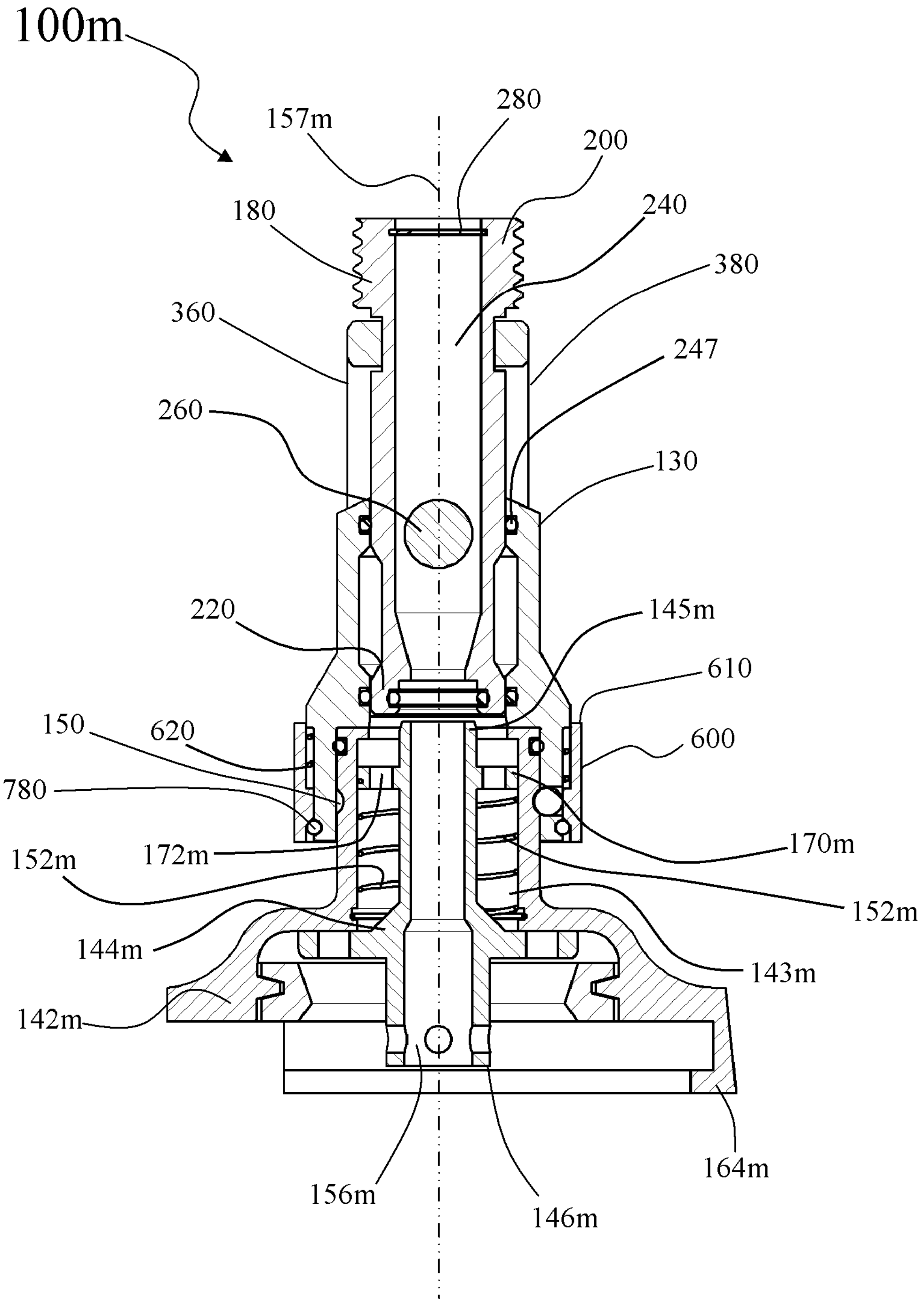

FIG. 40 shows a section view along lines I-I of the keg tapping kit 100*m* shown in FIG. 37 but with the handle 300 in an up position.

Figure 41:
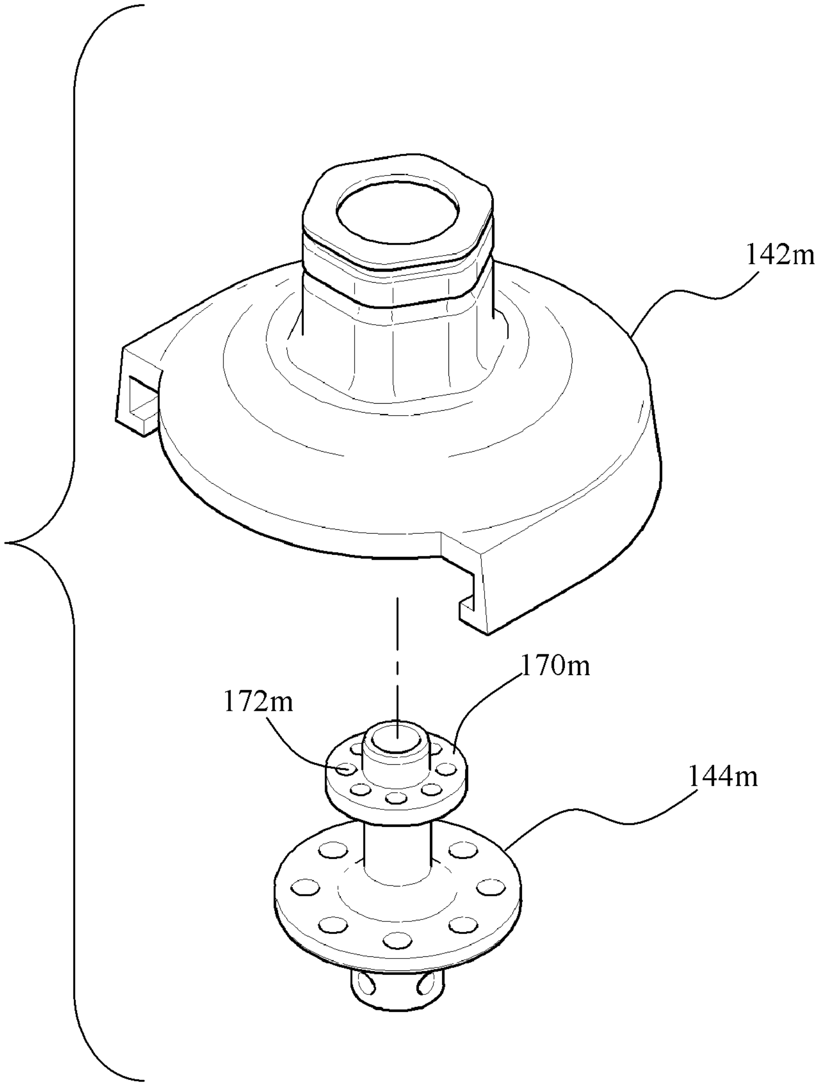

FIG. 41 shows a perspective view of a lower coupler housing 142*m* and lower coupler conduit 144*m*.

Figure 42:
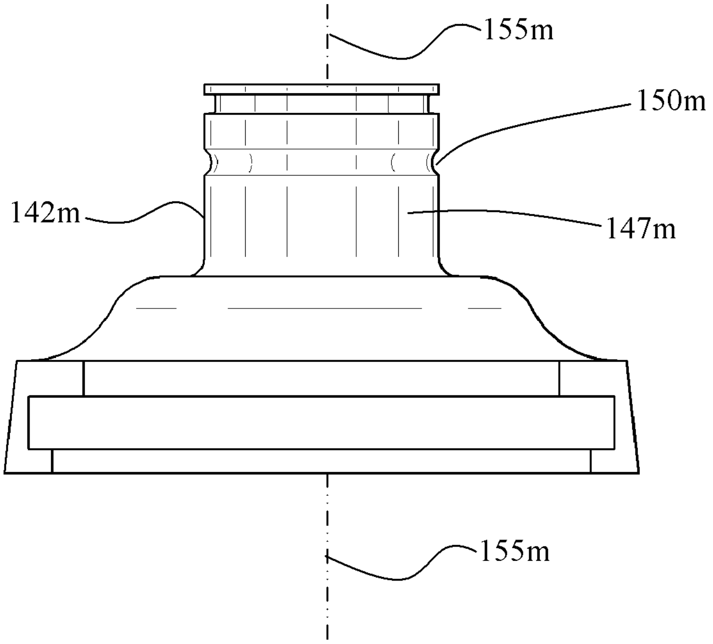
Figure 43:
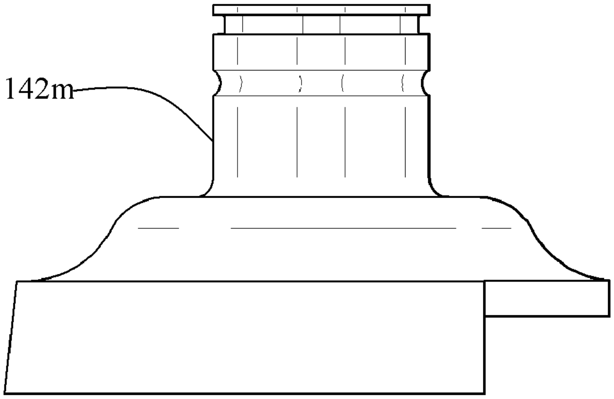

FIGS. 42 and 43 show side views of lower coupler housing 142*m*.

Figure 44A:
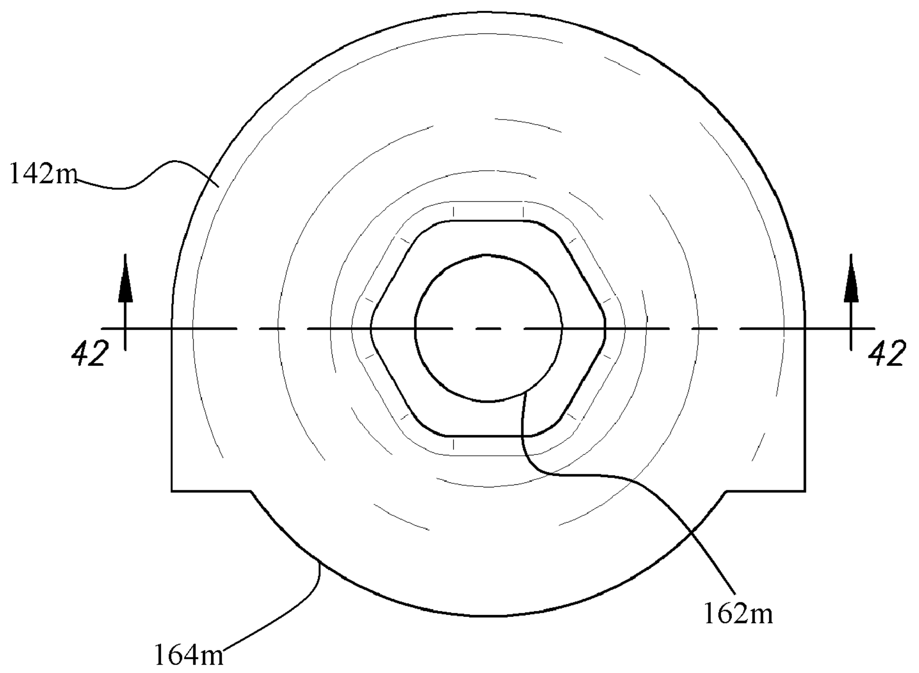
Figure 44B:
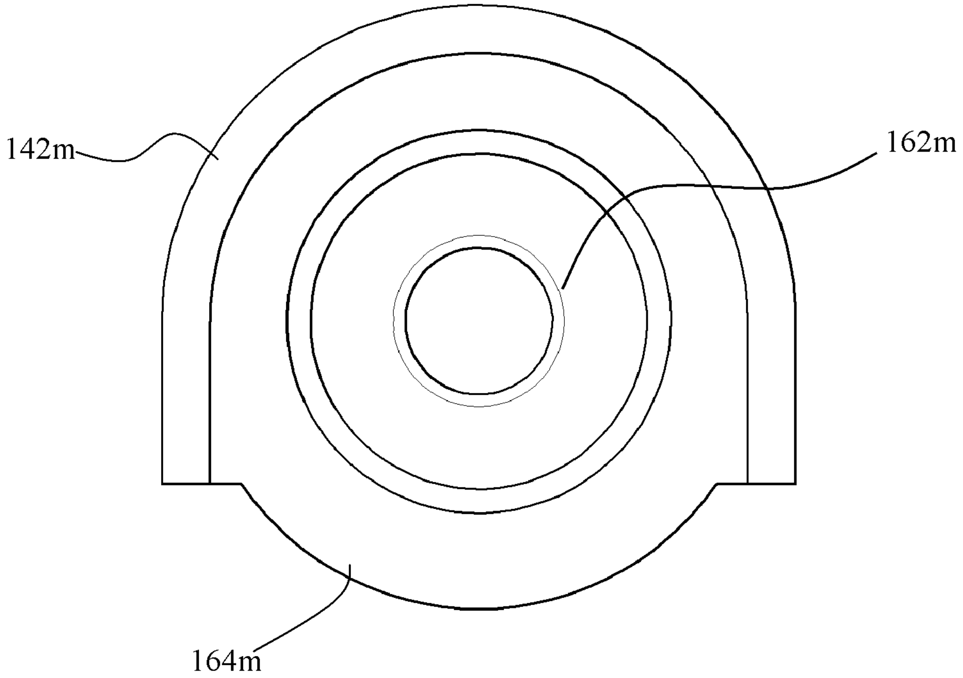

FIGS. 44A and 44B show top and bottom elevated views of the lower coupler housing 142*m*.

FIG. 44C shows a section view of housing 142*m* along lines 42-42 of FIG. 44A.

FIG. 44D shows a perspective view of housing 142*m*.

Figure 45:
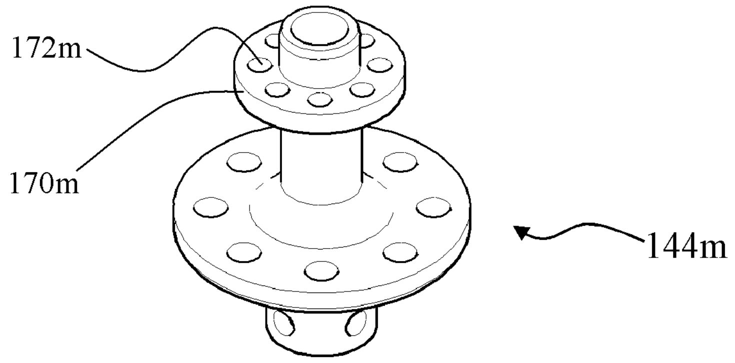

FIG. 45 shows a perspective side view of lower coupler conduit 144*m*.

Figure 46:
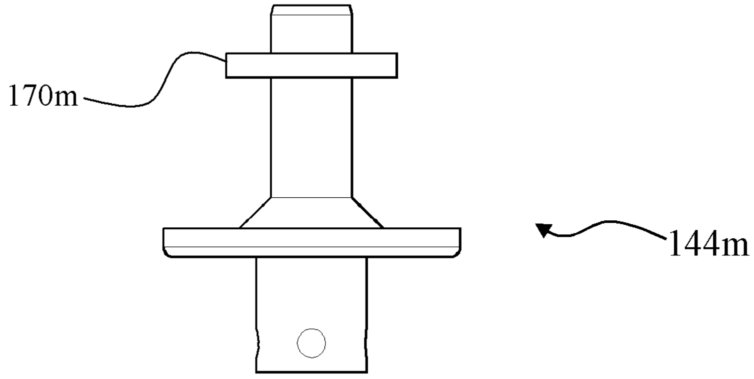

FIG. 46 shows a side view of lower coupler conduit 144*m*.

With respect to FIGS. 47 through 56C, numeric labels ending in the letter "s" indicate parts of the lower coupler 140*s* for use in tapping an S system keg. The meaning of the numeric component (e.g., "170" of "170*s*") is found in Table 1 (see FIGS. 18A through 18D).

Figure 47:
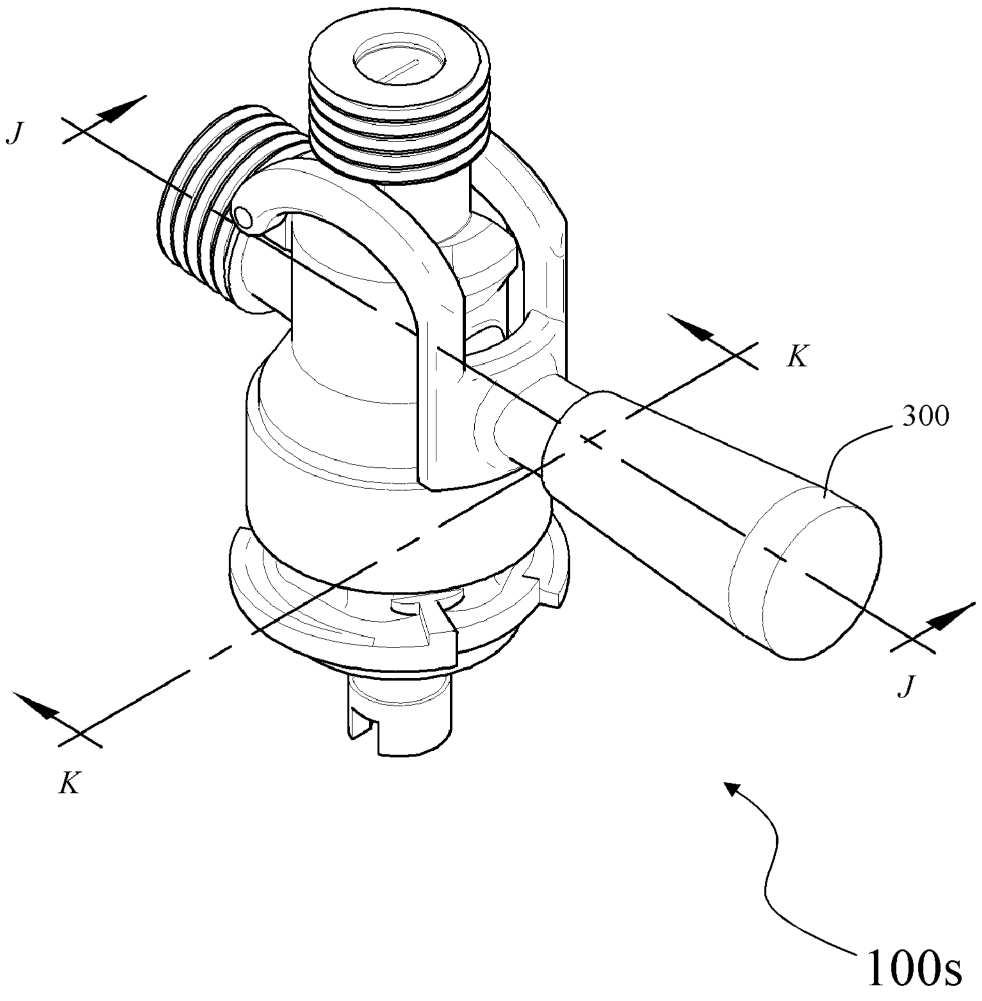

FIG. 47 shows a perspective view of a keg tapping kit 100*s* with the handle 300 in the down position.

Figure 48:
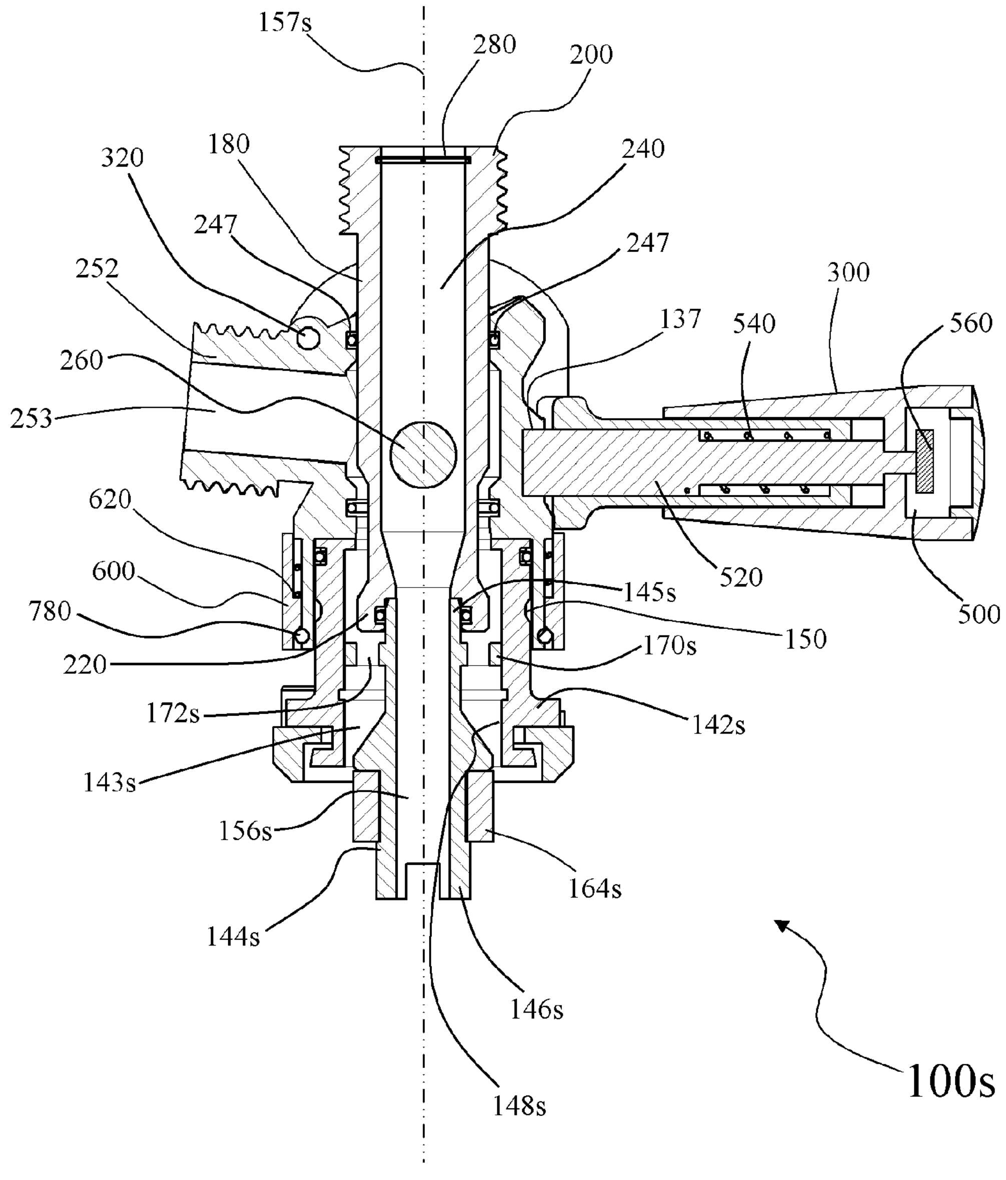

FIG. 48 shows a section view along lines J-J of the keg tapping kit 100*s* shown in FIG. 47 with the handle 300 in the down position as shown in FIG. 47.

Figure 49:
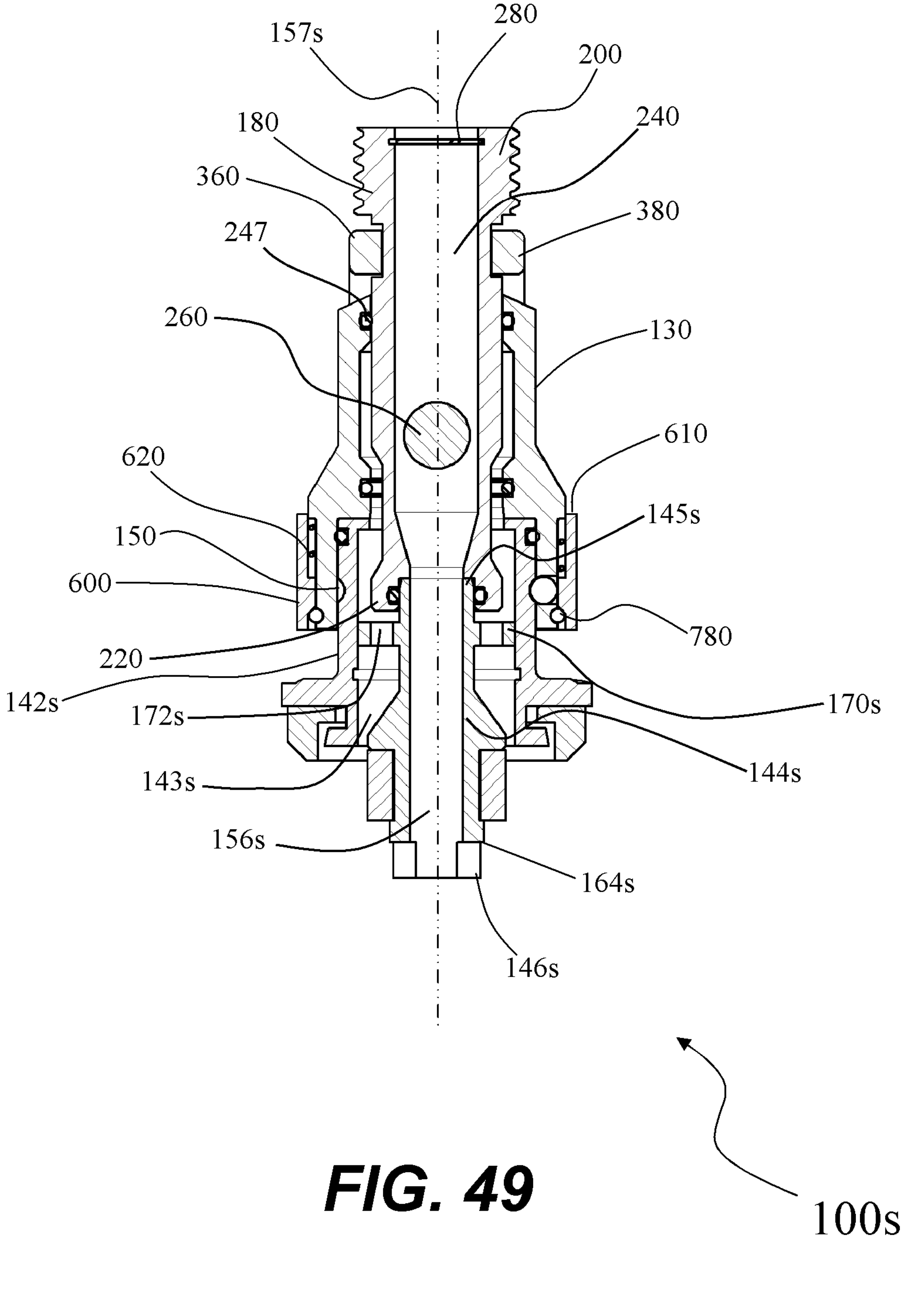

FIG. 49 shows a section view along lines K-K of the keg tapping kit 100*u* shown in FIG. 47 with the handle 300 in the down position as shown in FIG. 47.

Figure 50:
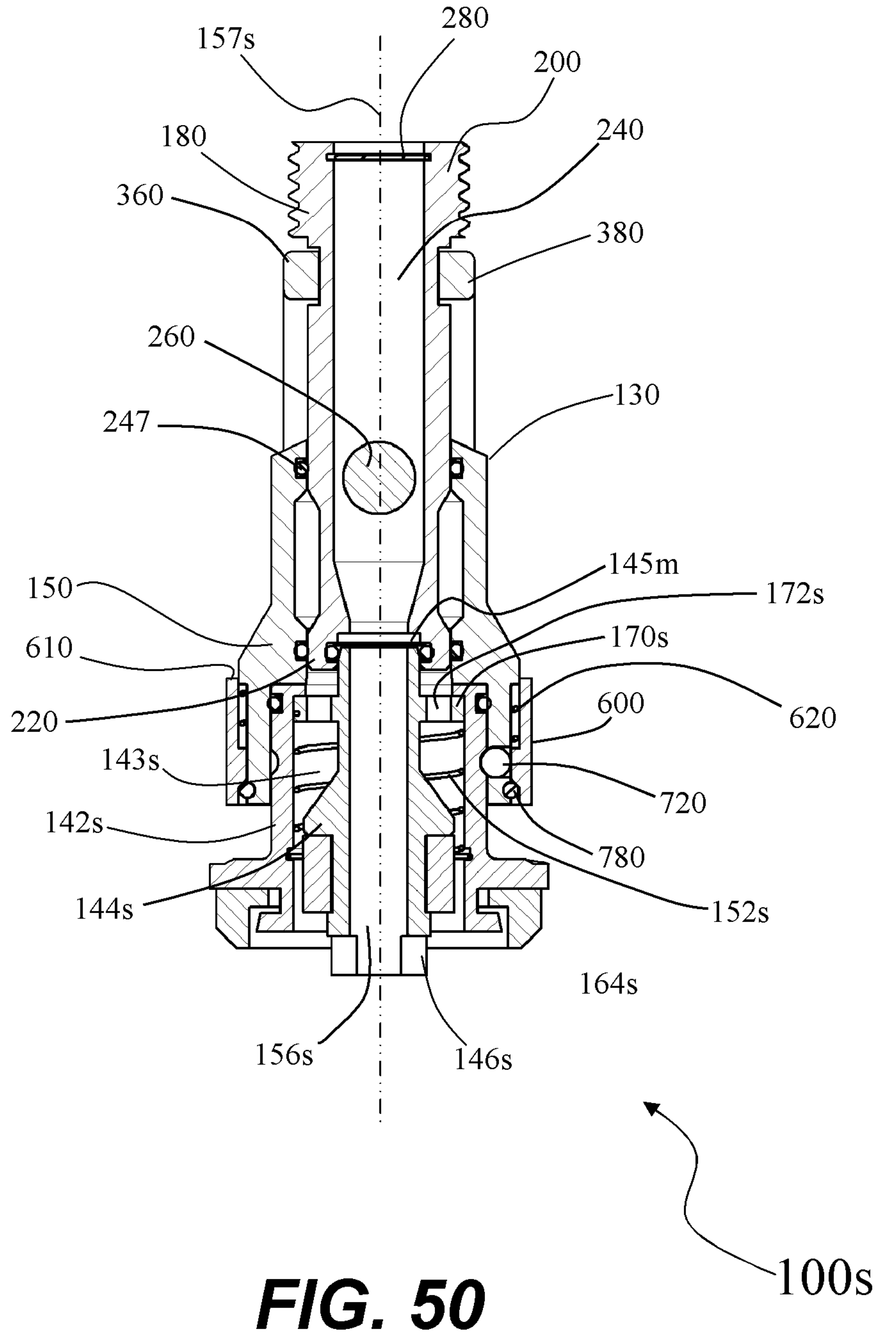

FIG. 50 shows a section view along lines K-K of the keg tapping kit 100*s* shown in FIG. 47 but with the handle 300 in an up position.

Figure 51:
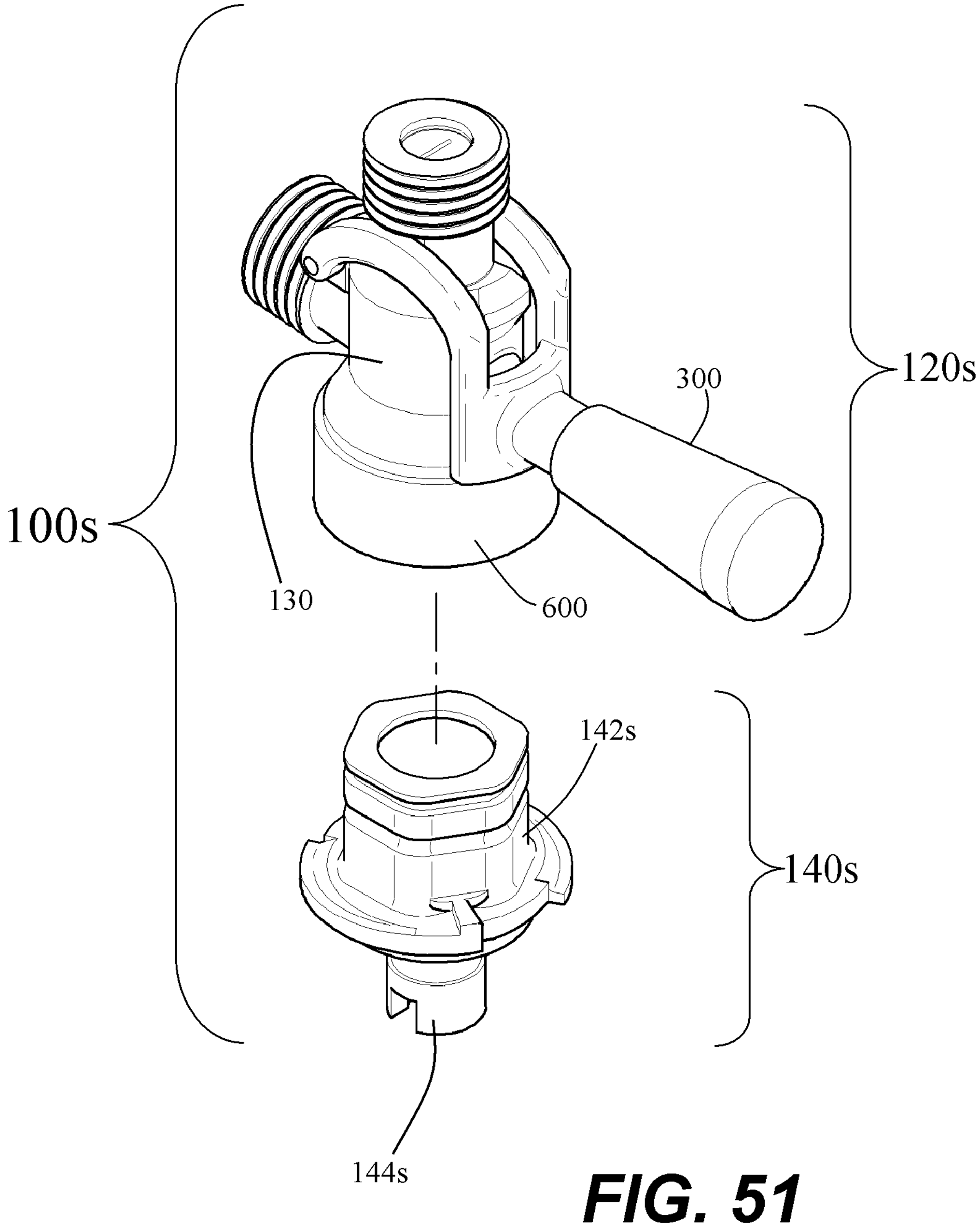

FIG. 51 shows the upper 120 and lower 140*s* couplers of keg tapping kit 100*s*.

Figure 52:
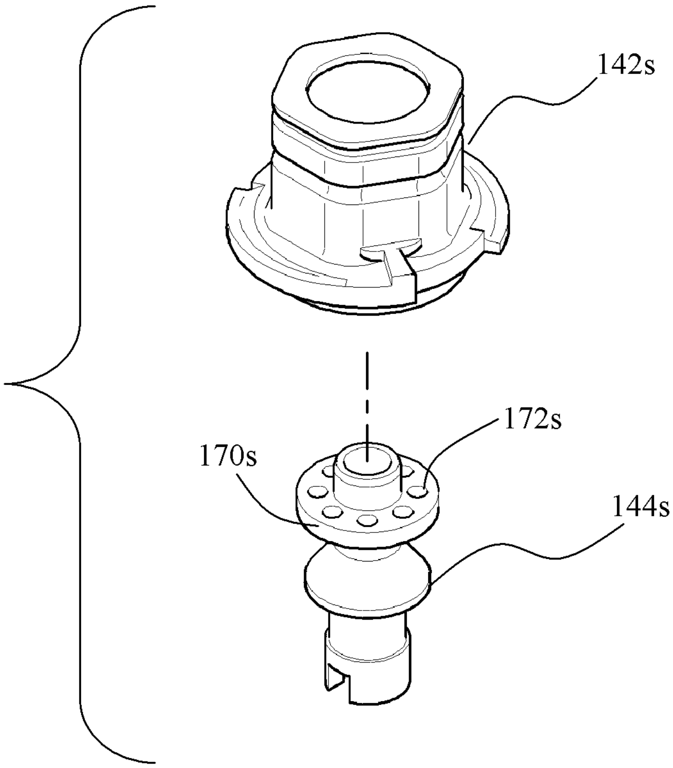

FIG. 52 shows a perspective view of a lower coupler housing 142*s* and lower coupler conduit 144*s*.

Figure 53:
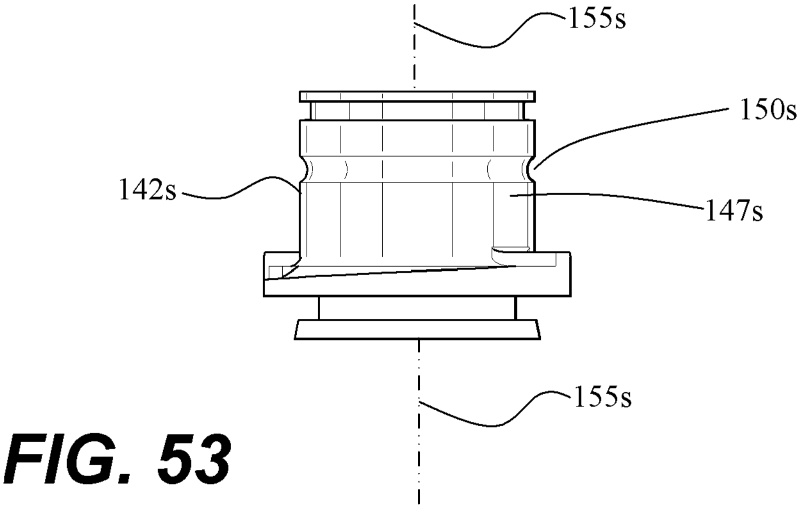
Figure 54:
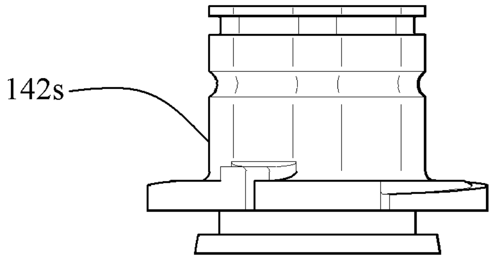

FIGS. 53 and 54 show side views of lower coupler housing 142*s*, respectively.

Figure 55A:
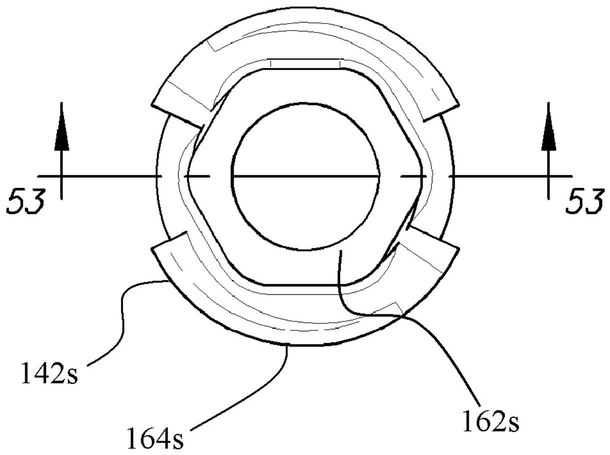
Figure 55B:
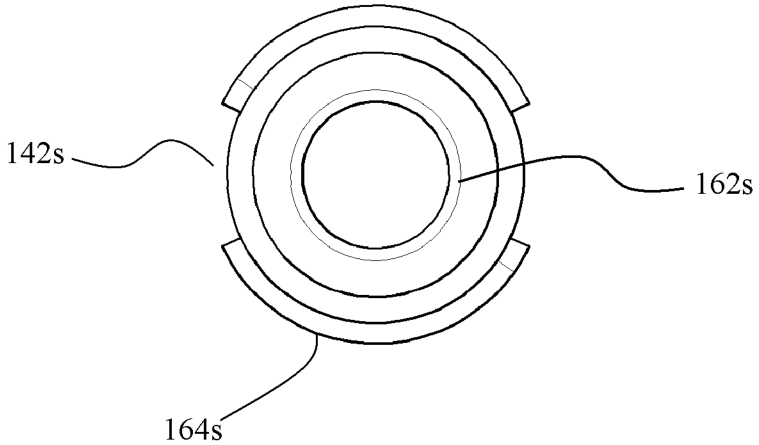

FIGS. 55A and 55B show top and bottom elevated views of the lower coupler housing 142*s*, respectively.

Figure 55C:
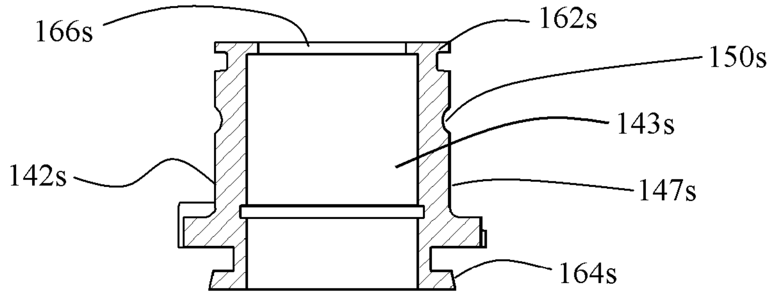

FIG. 55C shows a section view of housing 142*s* along lines 53-53 of FIG. 55A.

Figure 55D:
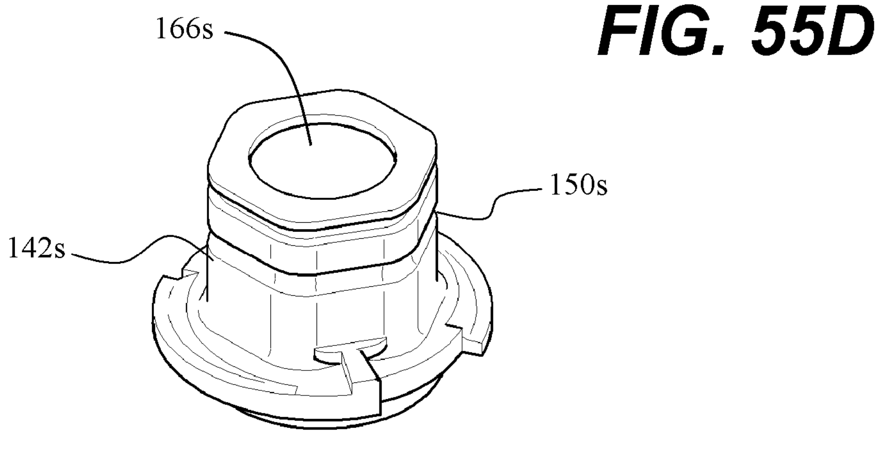

FIG. 55D shows a perspective view of housing 142*s*.

Figure 56A:
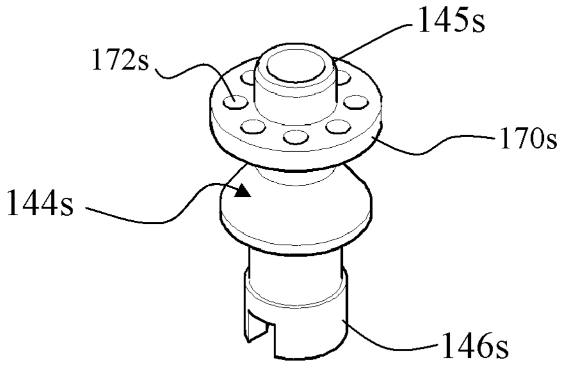
Figure 56B:
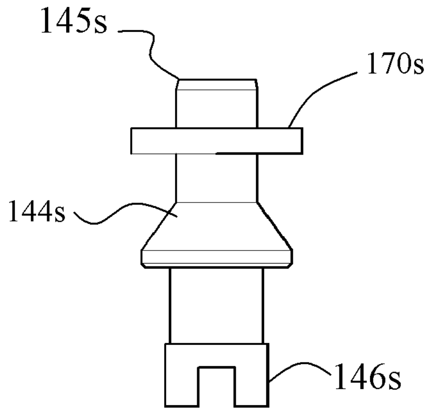
Figure 56C:
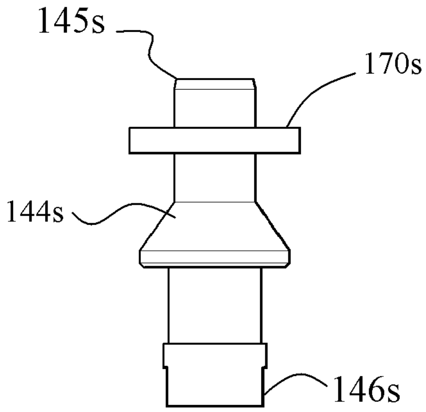

FIGS. 56A through 56C show various views of lower coupler conduit 144*s*.

With respect to FIGS. 57 through 66B, numeric labels ending in the letter "u" indicate parts of the lower coupler 140*u* for use in tapping a U system keg. The meaning of the numeric component (e.g., "170" of "170*u*") is found in Table 1 (see FIGS. 18A through 18D).

Figure 57:
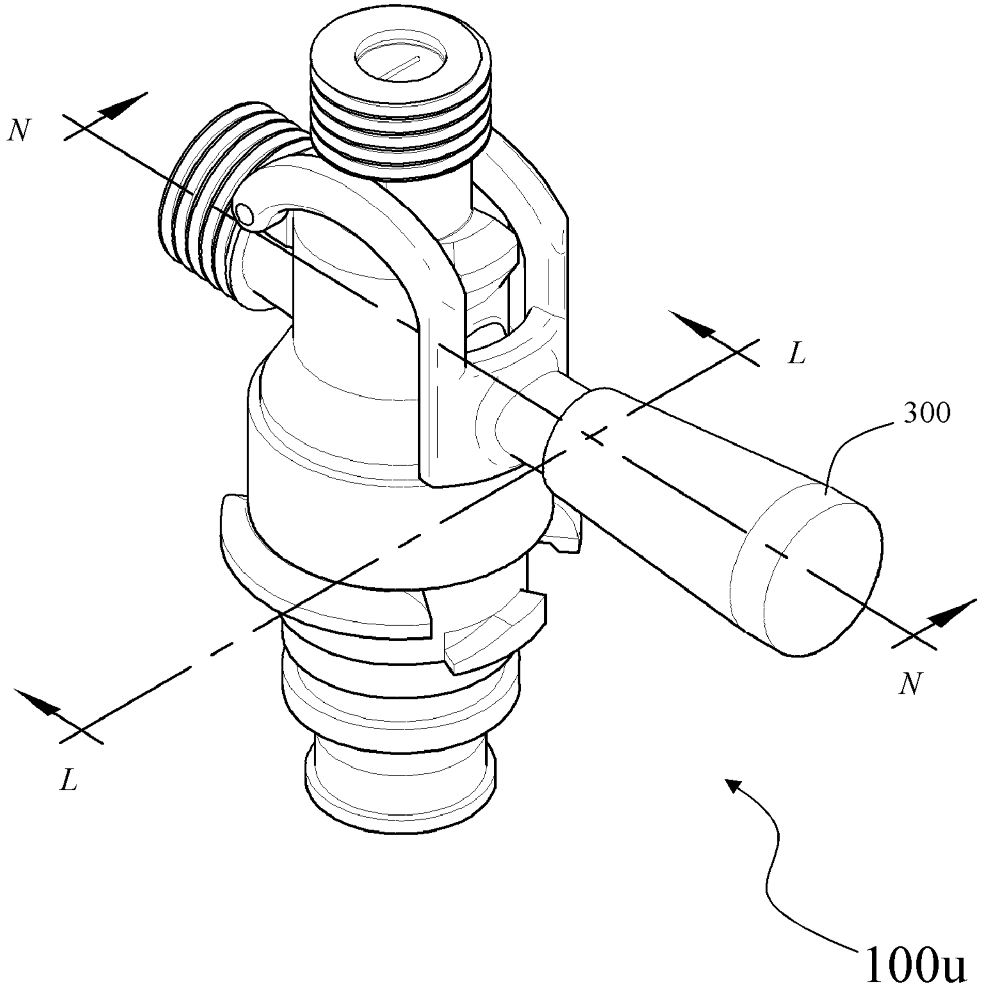

FIG. 57 shows a perspective view of a keg tapping kit 100*u* with the handle 300 in the down position.

Figure 58:
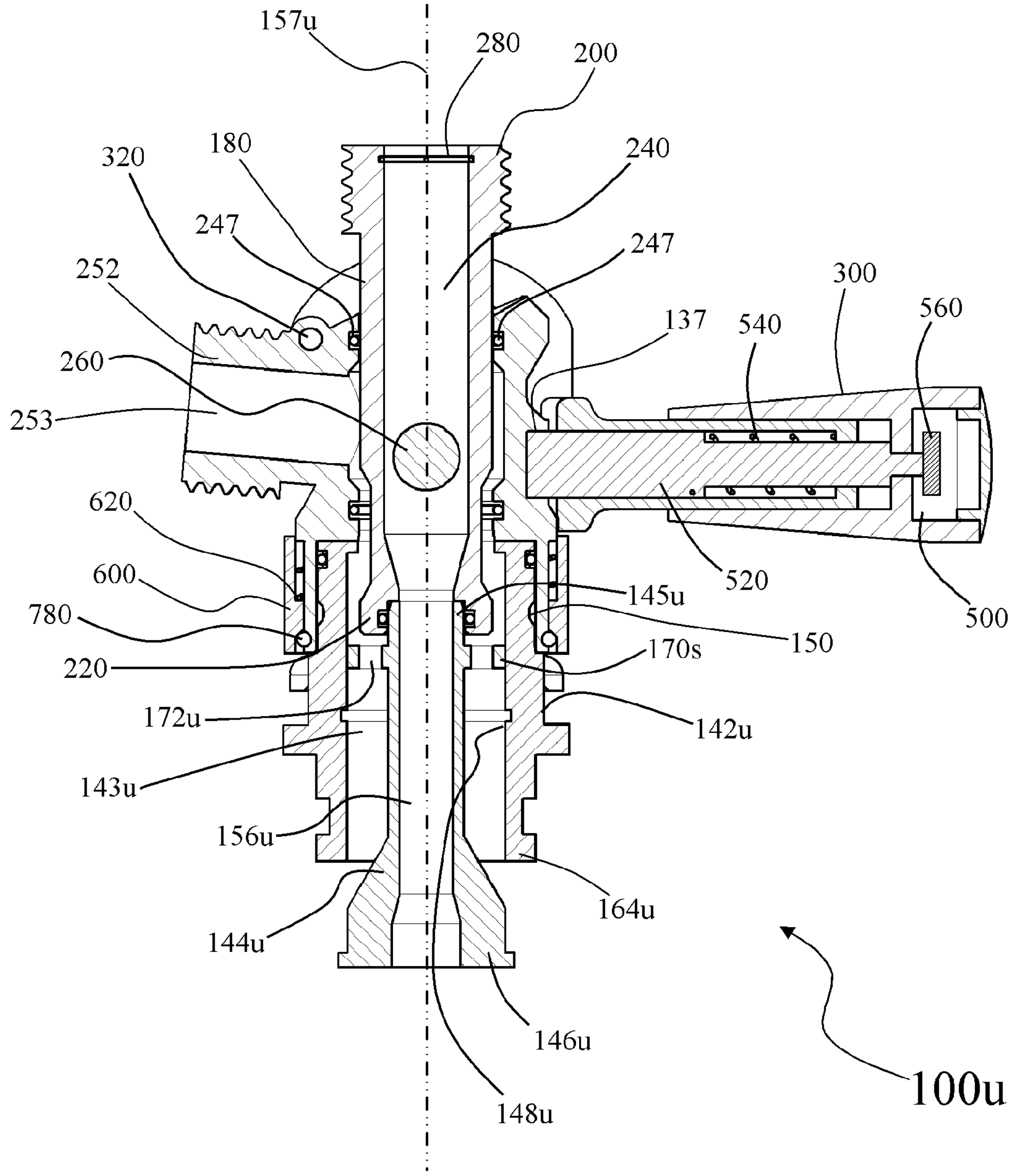

FIG. 58 shows a section view along lines N-N of the keg tapping kit 100*u* shown in FIG. 57 with the handle 300 in the down position as shown in FIG. 57.

Figure 59:
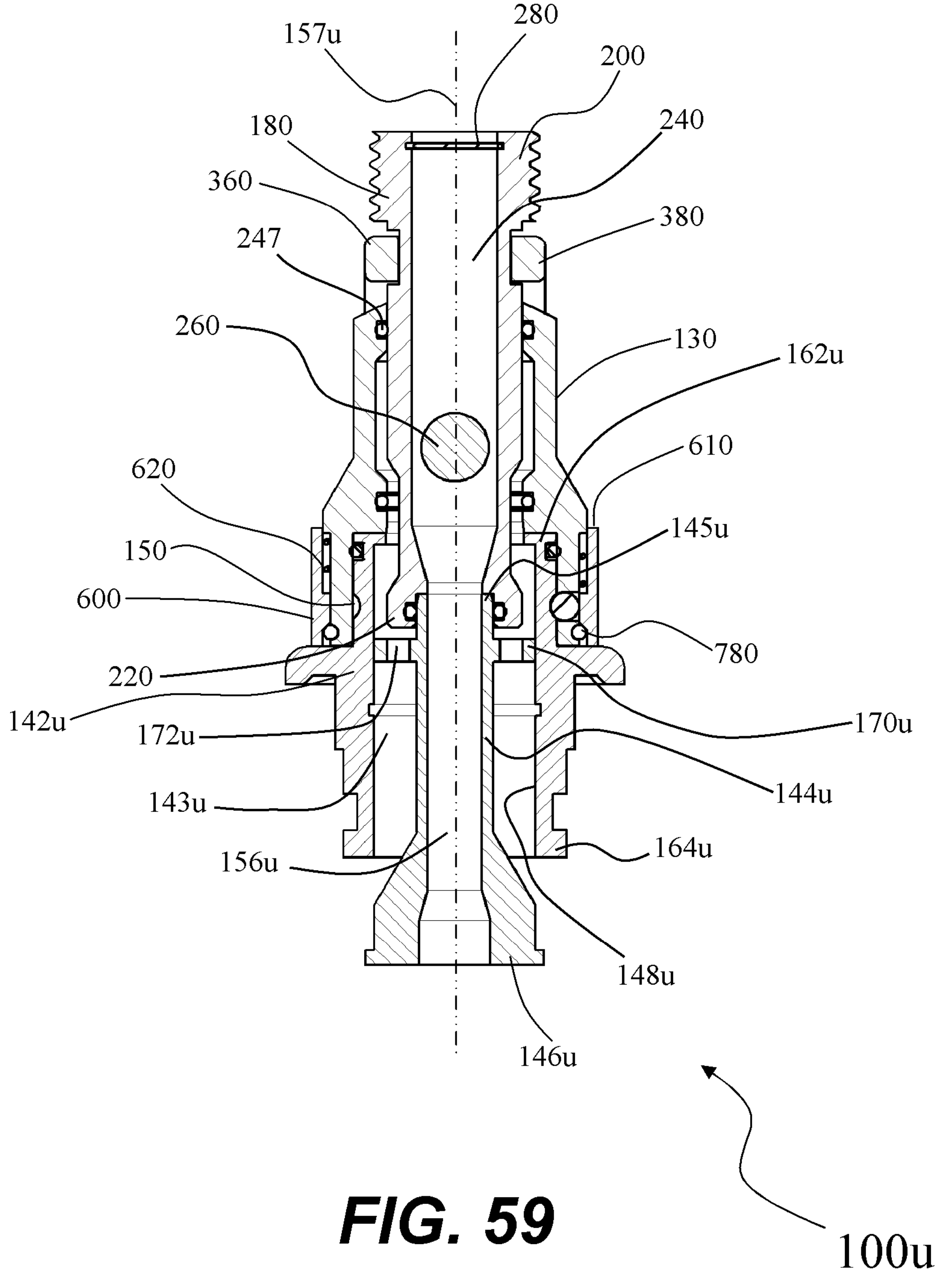

FIG. 59 shows a section view along lines L-L of the keg tapping kit 100*u* shown in FIG. 57 with the handle 300 in the down position as shown in FIG. 57.

Figure 60:
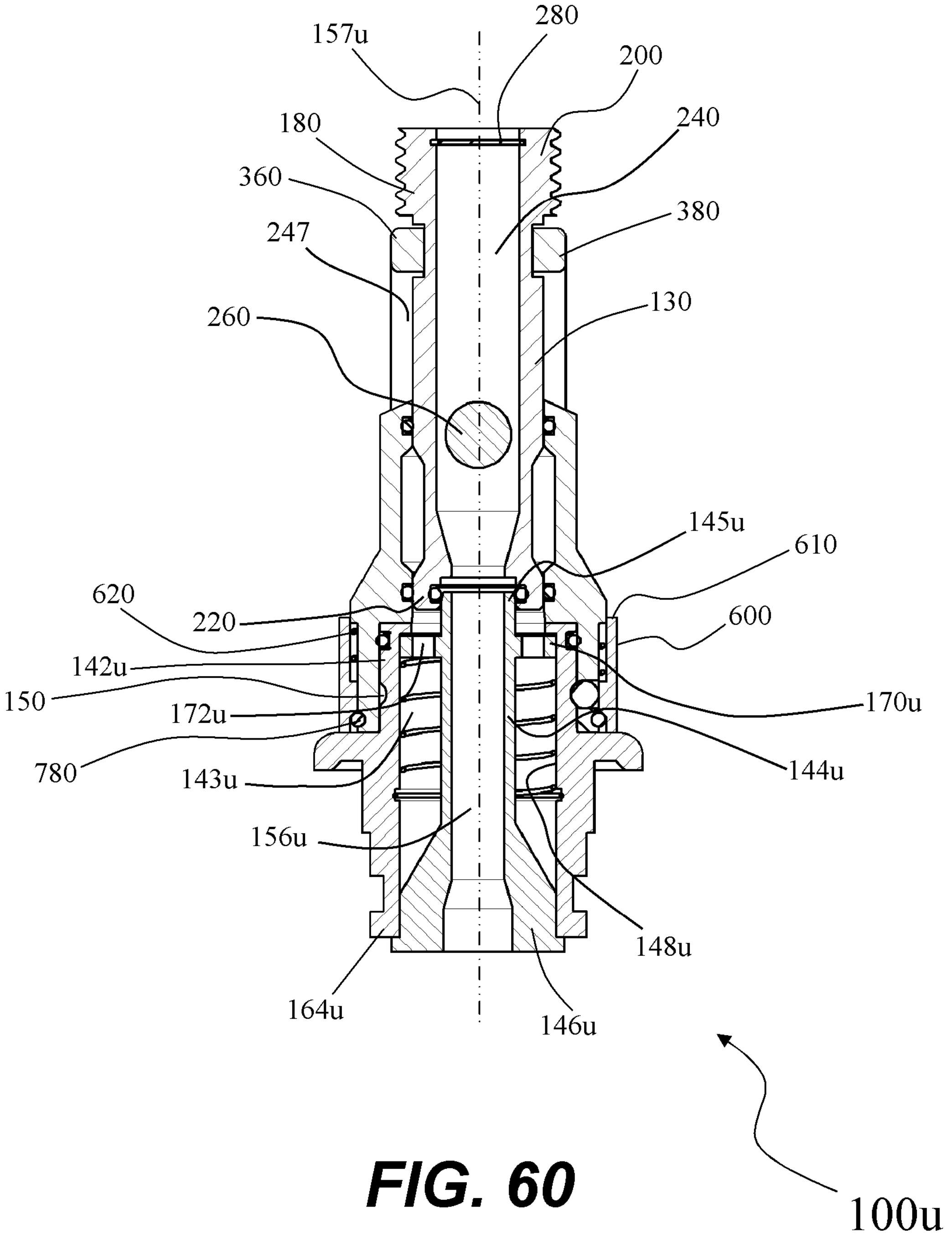

FIG. 60 shows a section view along lines L-L of the keg tapping kit 100*u* shown in FIG. 57 but with the handle 300 in an up position.

Figure 61:
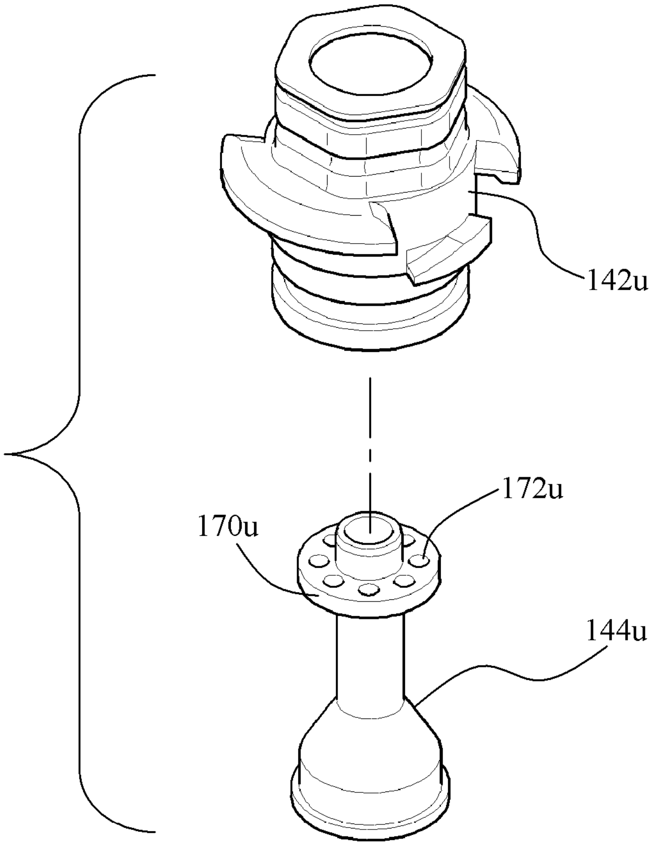

FIG. 61 shows a perspective view of a lower coupler housing 142*u* and lower coupler conduit 144*u*.

Figure 62:
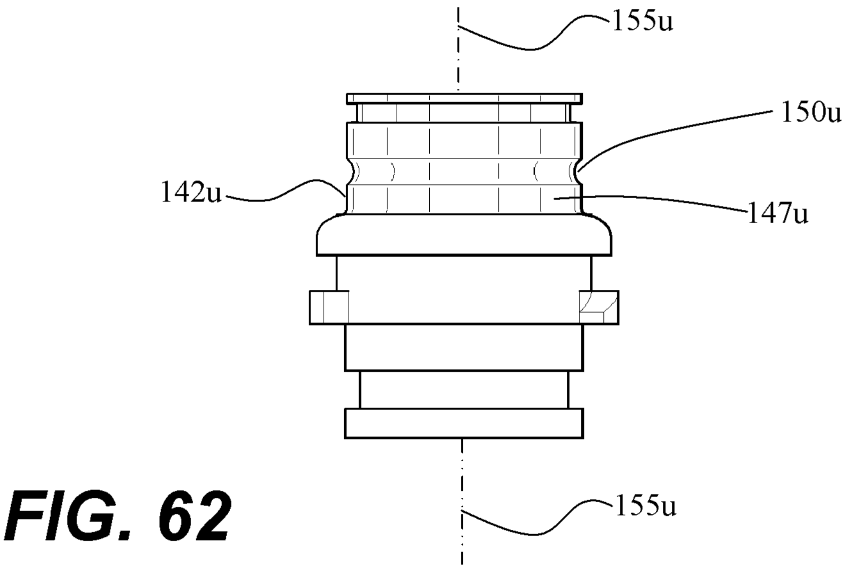
Figure 63:
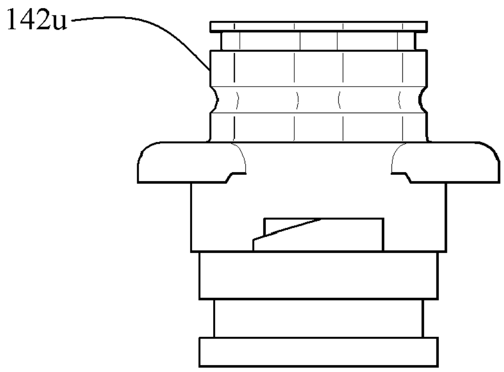

FIGS. 62 and 63 show side views of lower coupler housing 142*u*, respectively.

Figure 64A:
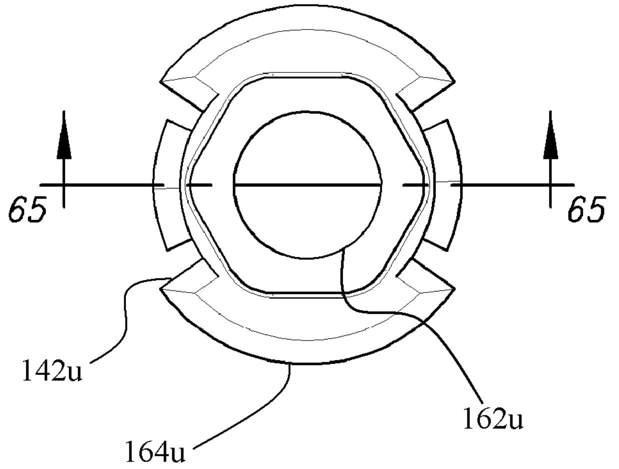
Figure 64B:
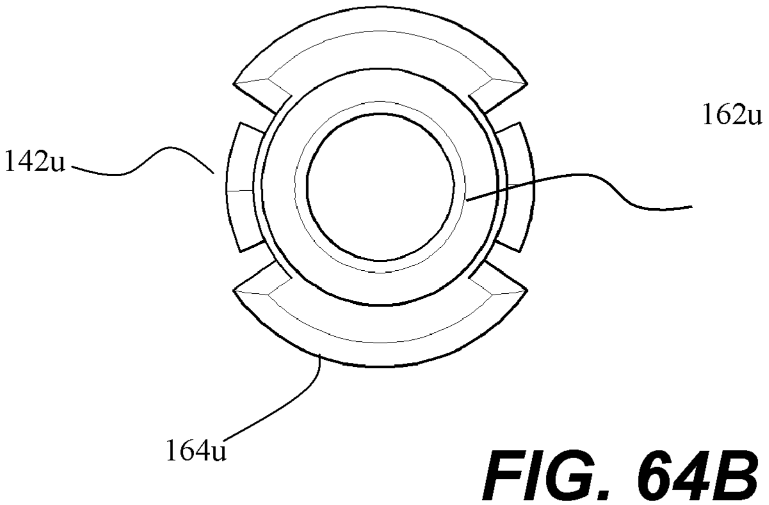

FIGS. 64A and 64B show top and bottom elevated views of the lower coupler housing 142*u*, respectively.

Figure 65C:
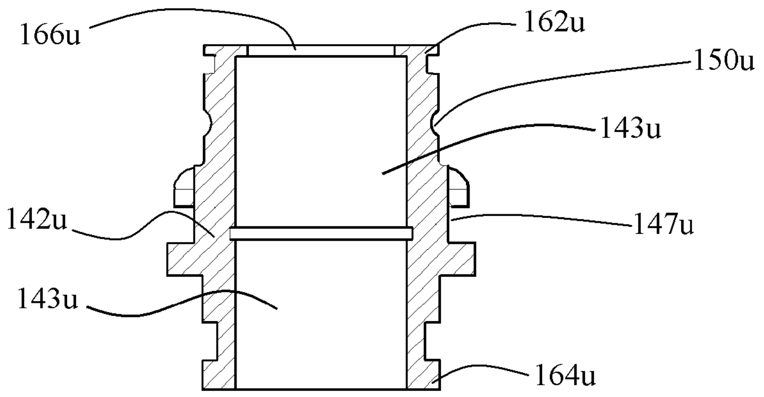

FIG. 65C shows a section view of housing 142*u* along lines 65-65 of FIG. 64A.

Figure 65D:
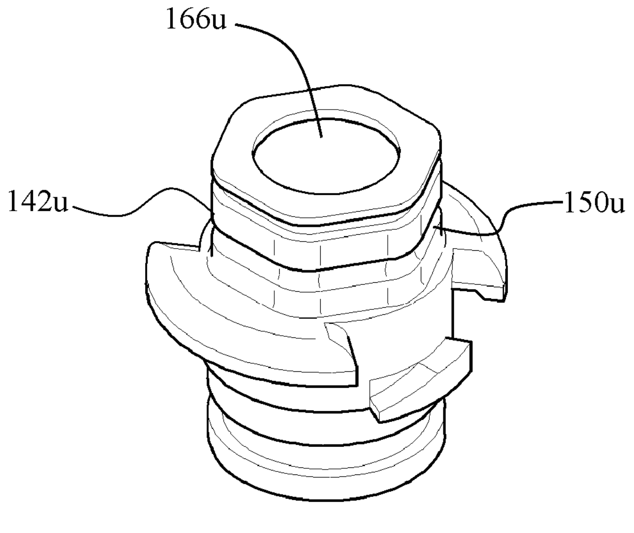

FIG. 65D shows a perspective view of housing 142*u*.

Figure 66A:
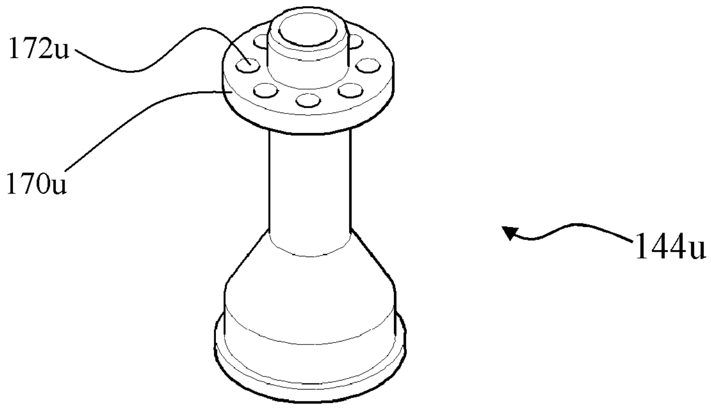
Figure 66B:
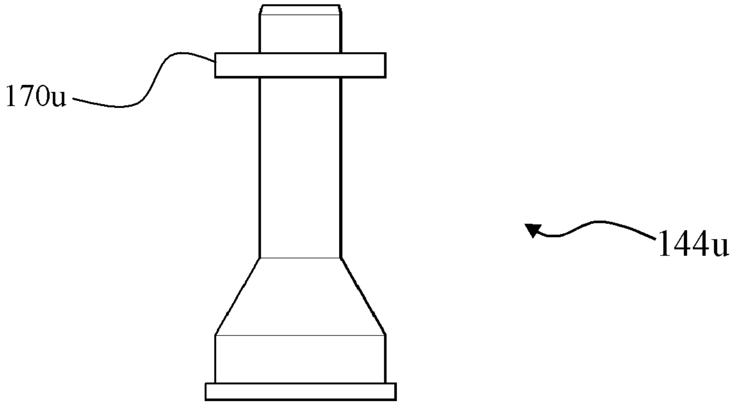

FIGS. 66A and 66B show a perspective and a side view of lower coupler conduit 144*u*, respectively.

Similar reference characters denote corresponding features consistently throughout the attached drawings.

DETAILED DESCRIPTION OF EXAMPLES OF THE INVENTION

This invention is directed to keg couplers. More specifically, the invention is a keg tapping system 100 for tapping one or more kegs 110. For purposes of description herein, the terms "upper," "lower," "right", "left", "rear", "front", "vertical", "horizontal", and derivatives thereof shall relate to the invention as oriented in FIG. 1A. However, the use of these terms, including such terms as "first" and "second", are merely to assist the reader and it should be understood that the invention may assume various orientations except where expressly specified to the contrary. In addition, FIGS. 18A through 18D show a Table (Table 1) which shows a list of labels and reference numerals and the elements to which they refer.

Referring to the Figures in general, the keg tapping system 100 is made up of two releasably attachable units: an upper coupler 120 and a lower coupler 140. The upper coupler 120 is releasably attached to a range of lower couplers 140 such that the keg tapping system 100 can be used to tap one or more types of keg such as the A System, D System, G System, M System, S System, and U System. However, it should be understood that the keg tapping system 100 may have just one type of lower coupler 140 and consequently may be used to only tap one type of keg such as the A system type keg. To assist the reader the lower coupler 140 is denoted as "140" with respect to the A System. Lower couplers 140 are denoted by 140*d*, 140*g*, 140*m*, 140*s* and 140*u* with respect to the D System, G System, M System, S System, and U System; likewise with respect to corresponding parts.

The lower coupler 140 includes a lower coupler housing 142 and a lower coupler conduit 144. The lower coupler housing 142 includes a hollow interior 143 in which is located the lower coupler conduit 144. The lower coupler housing 142 has exterior and interior surfaces 147 and 148 respectively, an annular groove 150 in the exterior surface 147, and a longitudinal axis 155 (shown, for example, in FIG. 14).

The lower coupler housing 142 defines top and bottom ends 162 and 164 respectively; and an opening 166 at the top 162 of lower coupler housing 142. The hollow interior 143 of housing 142 is a through bore extending between top and bottom ends 162 and 164 respectively of lower coupler housing 142. The upper part of the housing 142 can have any suitable non-polygonal shape such as a circular shape or can have a polygonal exterior such as, but not limited to, a hexagonal appearance to facilitate the attachment of tools to provide torque when attaching or detaching the lower coupler 140 part of the keg tapping kit 100 to or from a keg. Though not essential it is preferred that the upper part of the housing 142 has a rounded polygonal exterior as shown in FIG. 1B, this makes it easier to fix a lower coupler housing O-ring 165 (shown in FIG. 1A) proximate to the opening 166 (shown in FIG. 1B) of lower coupler housing 142.

Figure 10:
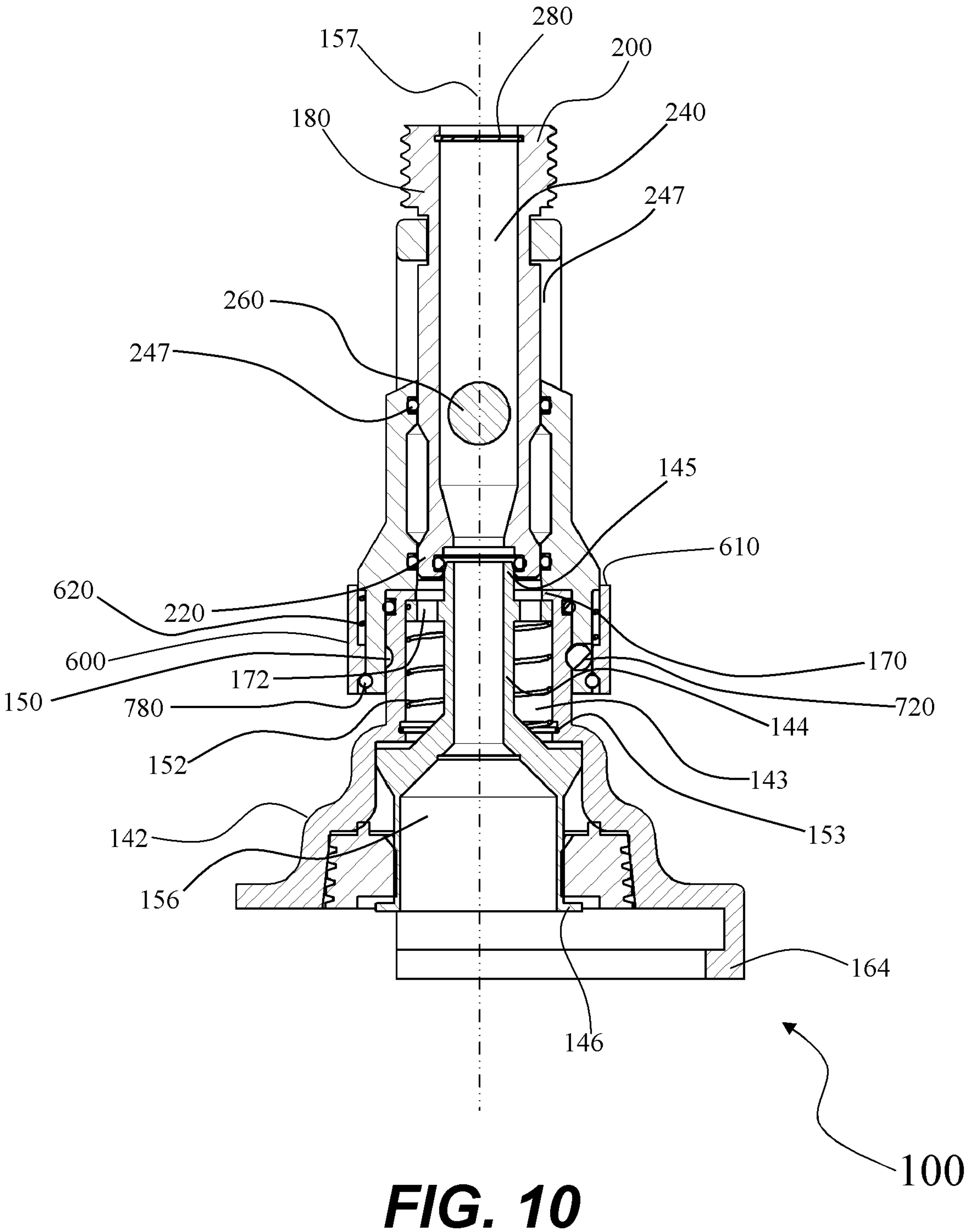
FIG. 10 shows a keg tapping kit 100 with a lower conduit spring 152.

A lower conduit spring 152 (shown in FIG. 10) applies an upward force to the lower coupler conduit 144 to hold it in the lower coupler housing 142. The spring 152 helps prevent the lower coupler conduit 144 from jamming on a keg 110. The spring 152 is shown in FIG. 10 sitting on an annular spring lip edge 153.

A through bore 156 of lower coupler conduit 144 extends between the top 145 and bottom 146 ends of lower coupler conduit 144. The diameter of the through bore 156 can vary as it extends through the lower coupler conduit 144 and may increase towards the bottom end 146. The lower coupler conduit 144 is movable in an up and down direction with respect to the longitudinal axis 155. The up/down movement of the lower coupler conduit 144 is independent of the lower coupler housing 142. The lower coupler conduit 144 defines top 145 and bottom 146 ends thereof.

The upper coupler 120 defines an upper coupler housing 130. The upper coupler housing 130 has a longitudinal axis 132 (shown in, for example, FIG. 11), top 138 and bottom 139 ends (shown, for example, in FIG. 3), exterior surface 135, interior surface 136, and an upper coupler through bore 160 which extends through the upper coupling housing 130 from the top and bottom ends 138 and 139 respectively. An upper conduit 180 is received in the through bore 160 and in slidable engagement therewith. The upper conduit 180 defines opposite top and bottom ends 200 and 220 respectively, and an exterior surface 230. The upper conduit 180 defines an upper conduit through bore 240 located between top and bottom ends 200 and 220. Axes 132 and 155 effectively merge upon releasably attaching the lower coupler 140 to the upper coupler 120 (and vice versa) to define a longitudinal axis 157 of the keg tapping kit 100 as a whole.

The top end 200 of upper conduit 180 defines a beer exit 241 which includes beer exit orifice 242. The beer exit 241 which may comprise an external threading or comprise a series of annular ridges or rings to provide an external grip surface at 250 to receive a beer line 251; it should be understood that the beer line 251 can be a beverage line, i.e., the beer line 251 can handle beers or any kind of liquid beverage including non-beer beverages. The bottom part of the external grip surface 250 functions as a downward facing annular upper shoulder at 265. A pair of upward facing lower shoulders 270*a* and 270*b* are located on the exterior surface 230; more specifically, the lower shoulders 270*a* and 270*b* are located a short distance below grip surface 250 and more specifically just below upper shoulder at 265. O-ring 247 acts as a compressed gas seal.

The upper coupler housing 130 is provided with a gas inlet port 252 having a central bore 253 which communicates with upper coupling bore 160. The gas inlet port 252 is preferably formed integral with the housing 130. During normal operation the gas inlet port 252 is connected to a gas line 254 for receiving compressed gas such as, but not limited to, compressed carbon dioxide, nitrogen or air from a compressed gas source such as tank 255 shown in FIG. 1C. Nitrogen is the preferred gas to prevent premature oxidation of the beer; carbon dioxide can be used in place nitrogen. Compressed gas delivered to the housing 130 is directed downwards around the lower coupler conduit 144. The lower coupler conduit 144 includes an annular flange 170 populated with through-apertures 172 for the passage of gas around the conduit 144 and thence into a keg. A gas pathway 175 is sketched out, for example, in FIG. 5.

A gas line valve 256 of conventional type may be fitted to the gas line 254 to control gas delivery through gas inlet port 252. A beer line valve 257 of conventional type may also be fitted to the beer line 251 to prevent back leakage of beer when the keg tapping kit 100 is disconnected from the lower coupler and/or a keg 110. However, if a check valve 260 is located in the upper coupler 120 this would make the use of beer line valve 257 redundant.

The parts of the upper and lower couplers 120 and 140 are preferably made of opaque plastic (e.g., ABS plastic) or metal such as aluminum or stainless steel. If metal or metal alloys are used they are preferably, from a redox or electrochemical perspective, similar metal or metal alloys to avoid electrochemical reaction which can occur between dissimilar metals which can otherwise deposit unwanted metal ions into solution in the beer and ultimately otherwise lead to human consumption of unwanted metal ions. For example, the lower 144 and upper 180 conduits can be made out of ABS plastic (acrylonitrile butadiene styrene copolymer). An O-ring 290 (labeled and shown in FIG. 5) is preferably placed between the lower 144 and upper 180 conduits. The O-ring 290 helps prevent fluid leakage. More specifically, the O-ring 290 is located at the bottom end 220 of upper conduit 180 such that when the lower coupler 140 is coupled to the upper coupler 120 the O-ring 290 provides a seal between the bottom end 220 of the upper conduit 180 and the top end 145 of lower conduit 144 to provide a continuous fluid path for beverage or beer through the lower 144 and upper 180 conduits.

An optional check valve 260 is located inside the upper conduit through bore 240. The diameter of the through bore 240 proximal to bottom end 220 is less than the diameter of the check valve 260 so that the check valve 260 is prevented from exiting out of bottom end 220 of the upper conduit 180. A locking pin 280 prevents the check valve from exiting the top end 200 of upper conduit 180. The check valve 260 ensures that fluid flow through the upper conduit 180 is from the bottom end 220 to the top 200 end, and helps prevent beer dripping from the bottom end 220 when the upper coupler 120 is connected to a beer line 251 but detached from the lower coupler 140.

The upper coupler 120 includes an operating handle 300 which pivots on one side of the upper coupler housing 130 about pivot point 320. The handle 300 includes a two pronged bracket 330 and a grip portion 340. One end of the two pronged bracket 330 is pivotally attached at 320 to the exterior 135 of upper coupler housing 130, and the other end is attached to the grip portion 340. The two pronged bracket 330 has a curved U-shape. The two prongs of the bracket 330 are arranged to allow the handle 300 to be rotated about a quarter turn without coming into contact with housing 130. More specifically, the two pronged bracket 330 is made up of first and second curved prongs 360 and 380. The first and second prongs 330 and 380 define a prong gap 400 therebetween. The prong gap 400 is sufficient to allow the two pronged bracket 330 (and hence handle 300) to be rotated about a quarter turn without coming into contact with the upper coupler housing 130. The upper coupler housing 130 includes an external blind hole 137 located on the housing 130, approximately opposite the pivot point 320. The two pronged bracket 330 includes a bottom edge 334 proximate to the grip portion 340.

Figure 5:
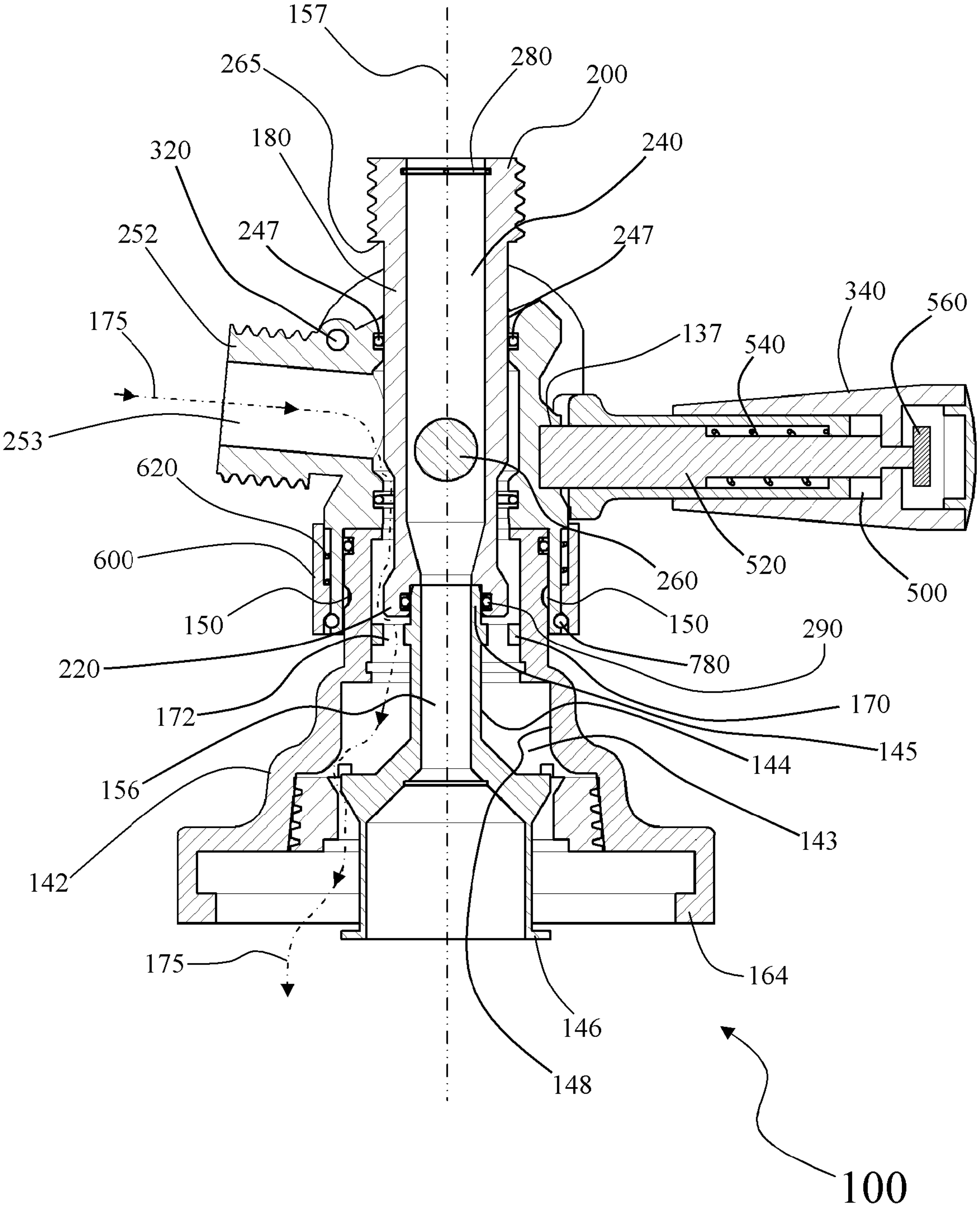
FIG. 5 shows a section view along lines X-X of FIG. 4.

The grip portion 340 has a hollow bore 500 therein to accommodate a generally tubular probe 520 and probe spring 540 (see, for example, FIG. 5). The spring 540 provides spring bias to the probe 520 such that when the handle 300 is moved to its downward closed position the spring 540 applies spring pressure to the probe 520 causing the probe to enter the blind hole 137 in the side of the upper coupler housing 130. Entry of the probe 520 into the blind hole 137 represents the closed downward position of the handle 300. The probe 520 is removed from the blind hole 137 by pulling on the grip portion 340 and thence the handle 300 can be moved upward. Up and down movements of the handle directly cause up and down movements of the upper conduit 180 independent of upper coupler housing 130.

A locking collar 600 is in up and down slidable engagement with the bottom end 139 of upper coupler housing 130. A locking collar spring 620 biases the locking collar 600 in a downward direction which is to say absent a net resultant force applied to the locking collar 600 in an upward direction the locking collar 600 remains in a default down position. An internal annular flange 640 extends around the bottom of the locking collar 600 to provide support to the locking collar spring 620.

At least one spherically shaped cavity 700 is located proximate to the bottom 139 of the upper coupler housing 130 (see, for example, FIGS. 3, and 12A through 12C). The at least one generally spherically shaped cavity 700 extends through the coupler housing 130 such that a locking member 720 located in each cavity 700 is able to protrude through either the interior surface 136 or the external surface 135 of housing 130. The locking member 720 can be a bearing made out of plastic or metal such as a metal alloy. The locking member 720 can move towards or away in a perpendicular direction towards or from the longitudinal axis 132 of the upper coupler housing 130. The locking member 720 is used to lock the lower coupler housing 142 to the upper coupler housing 130 of upper coupler 120. The location of the cavities 700 and locking members 720 can vary, but it is preferred that they comply generally with the formula 360/n where n is the number of spherically shaped cavities 700, e.g., with three cavities 700 they can be 360/3 degrees apart (120°), but it will be understood that their relative location can vary.

The locking collar 600 defines an internal surface 740 (shown in the exploded view of FIG. 9 and in the section view of FIG. 12C) which includes an internal cambered surface 760 (see, for example, FIGS. 12A through 12C) incorporating a vertically sloped surface with a cambered angle 770 of about 135° (one hundred and thirty five degrees). During normal operation of the keg tapping kit 100 the locking collar 600 is in a default down position and the locking member 720 is biased to protrude through the internal surface 136 towards the longitudinal axis 132 (shown in FIG. 11) of the upper housing 130. More specifically, when the locking collar 600 is in the down position the cambered surface 760 forces the locking member 720 to protrude through the internal surface 136 and engage the annular groove 150 (shown, for example, in FIG. 1B) in the exterior surface 147 of the lower coupler housing 142 thereby locking the lower coupler 140 to the upper coupler 120. When the locking collar 600 is pushed upwards (i.e., slid upwards by a human operator against the downward bias of locking collar spring 620) the locking member 720 is free to move in a perpendicular direction away from the longitudinal axis 132 and the lower coupler 140 can be decoupled from the upper coupler 120. In this manner the lower coupler 140 is releasably attachable to the upper coupler 120. When the handle 300 is in the closed position the bottom ledge 334 of bracket 330 of handle 300 abuts against the top rim 610 of the locking collar 600.

A retaining ring 780 limits the down movement of the locking collar 600. The retaining ring 780 is located a short distance below the cavity 700 and proximate to the bottom 139 of upper coupler housing 130. The retaining ring 780 is preferably recessed into an annular groove 800 in the exterior surface 135 of housing 130 as shown, for example, in FIGS. 12A through 12C.

The handle 300 is moveable between open (up) and closed (down) positions. The locking collar 600 is also moveable between an up and down (default) position. The lower coupler 140 is releasably attached to the upper conduit 120 by sliding the locking collar upwards to move the lower conduit locking member 720 perpendicularly outwards from the axis 132 of upper coupler housing 130. When the locking collar 600 is in the up position the lower coupler 140 with the lower conduit 144 located inside can be attached to the upper coupler 120 by aligning the annular groove 150 with the spherically shaped cavities 700 whereupon the locking collar 600 is released to adopt its down position under the bias of locking collar spring 620 the downward movement of the locking collar 600 causing its internal cambered surface 760 to cause the locking members 720, which can be a bearings, to protrude into annular groove 150 thereby locking the upper coupler 120 to the lower coupler 140 and vice versa (i.e., the lower coupler 140 is locked to the upper coupler 120).

The handle 300 is then lowered to its down closed position with probe 520 inserted into blind hole 137; this serves to lock the locking collar 600 in place and simultaneously lower the upper and lower conduits 144 and 180 such that the bottom 146 of the lower conduit 144 protrudes from the bottom end 164 of the lower coupler housing 142 at which point the keg tapping kit 100 can be used to tap a keg.

The lower coupler 140 and the lower coupler conduit 144 located therein comes in various types to allow a human worker to use the keg tapping kit 100 to tap a range of keg types without necessitating the disconnection of the beer line 251 or compressed gas line 254. For example, the keg tapping kit 100 permits a worker to tap the following kegs fitted with valves associated with the D System, S System, A System, G System, U System and M System. It should be understood that the keg tapping kit 100 of the present invention represents the first keg tapping kit that can tap any keg fitted with a D, S, A, G, U or M keg valve system and as such the present invention represents a significant development in the field of tapping kegs. The keg tapping kit 100 of the invention can be provided in kit form comprising an upper coupler 120 and lower couplers respectively for tapping the D, S, A, G, U or M keg valve system based kegs.

With reference to individual Figures with respect to which Table 1 (see FIGS. 18A through 18D) should be used to provide guidance on the meaning of part numbers.

Figure 1A:
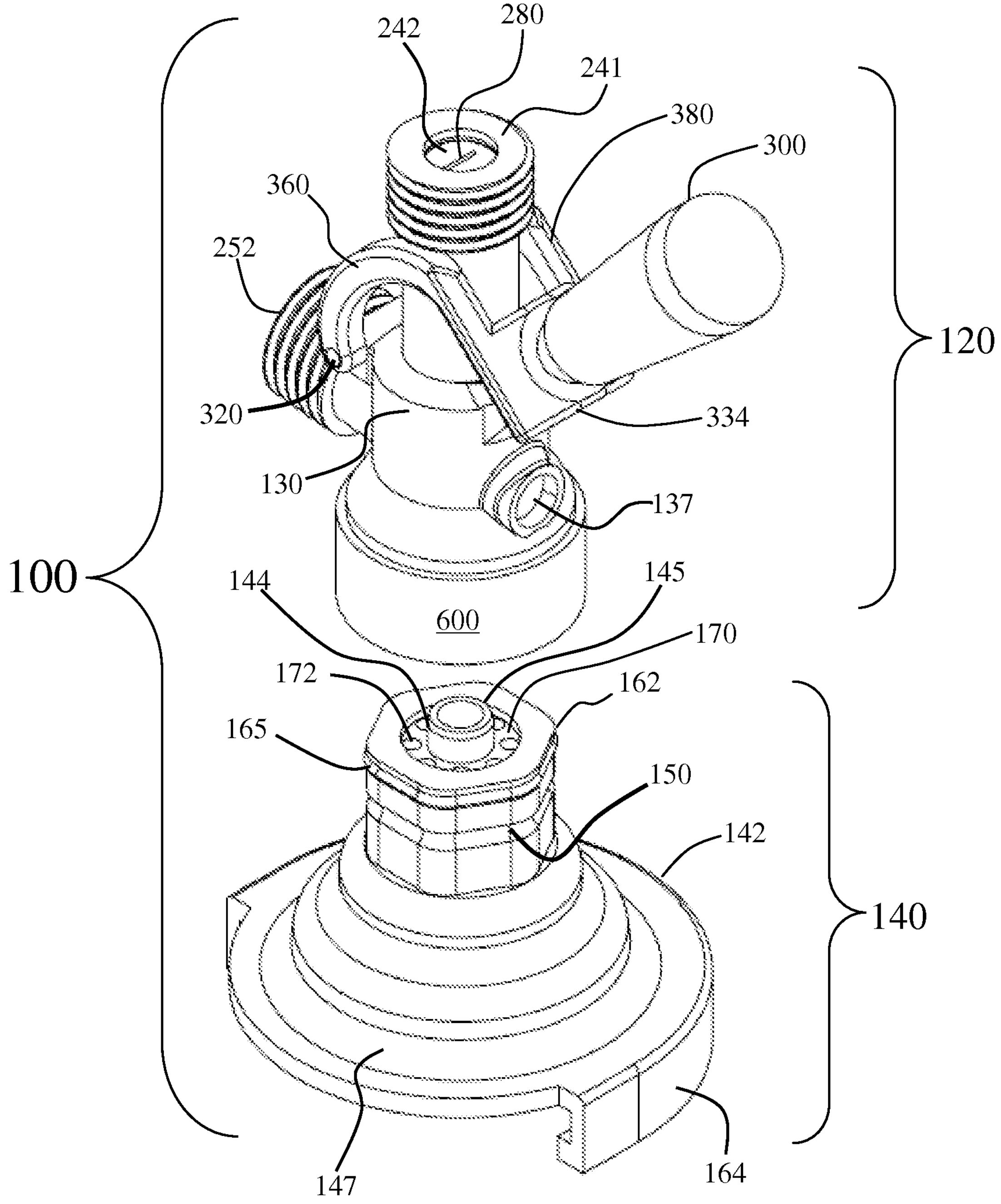
FIG. 1A shows a keg tapping kit 100 with a lower coupler conduit 144 visible inside the lower coupler housing 142 for tapping System A kegs.
Figure 1B:
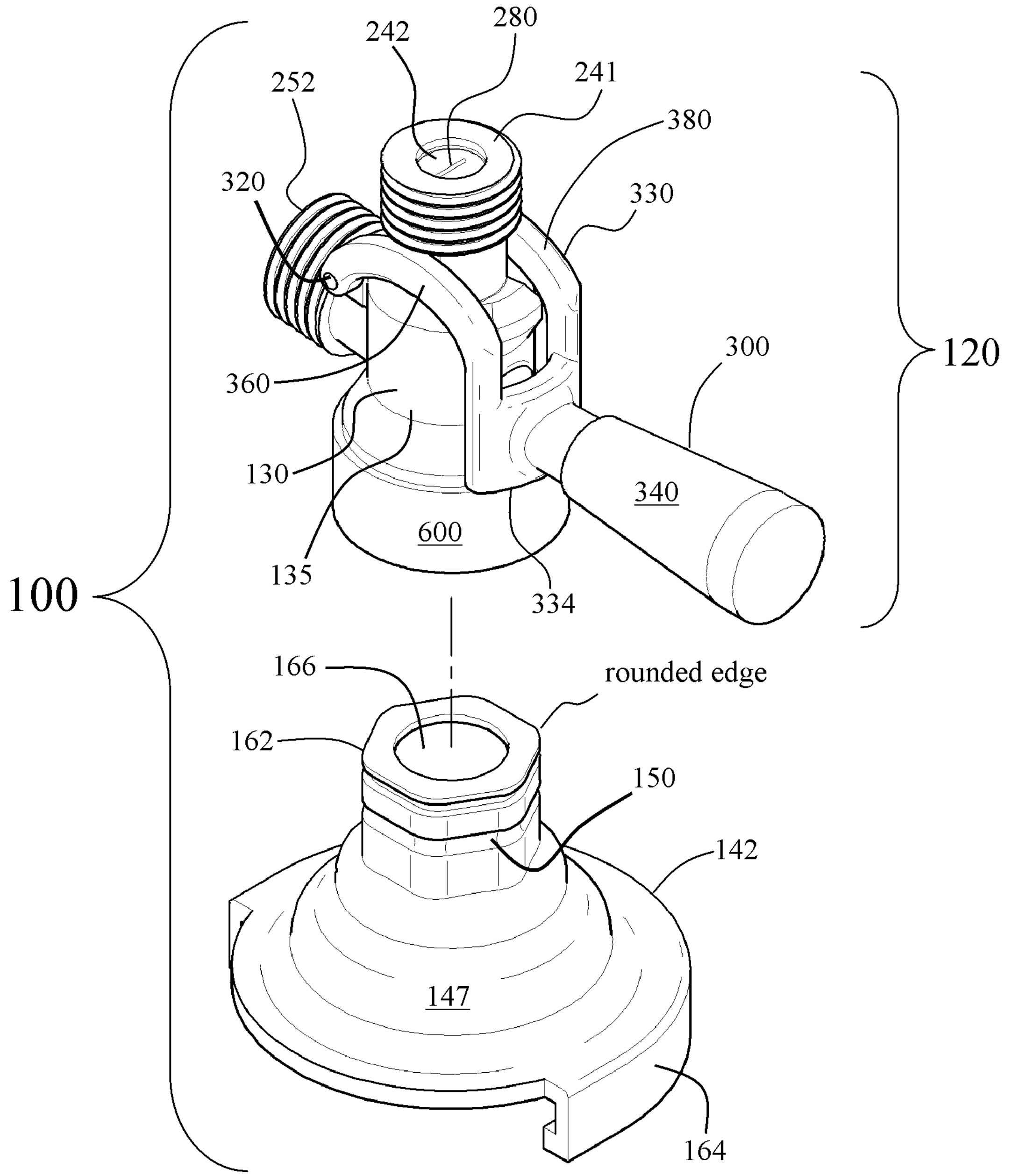
FIG. 1B shows the keg tapping kit of FIG. 1A but without the lower coupler conduit 144 to reveal opening 166 at the top 162 of lower coupler housing 142.

FIG. 1A shows a keg tapping kit 100 with a lower coupler conduit 144 visible inside the lower coupler housing 142 for tapping System A kegs.

FIG. 1B shows the keg tapping kit of FIG. 1A but without the lower coupler conduit 144 to reveal opening 166 at the top 162 of lower coupler housing 142.

Figure 1C:
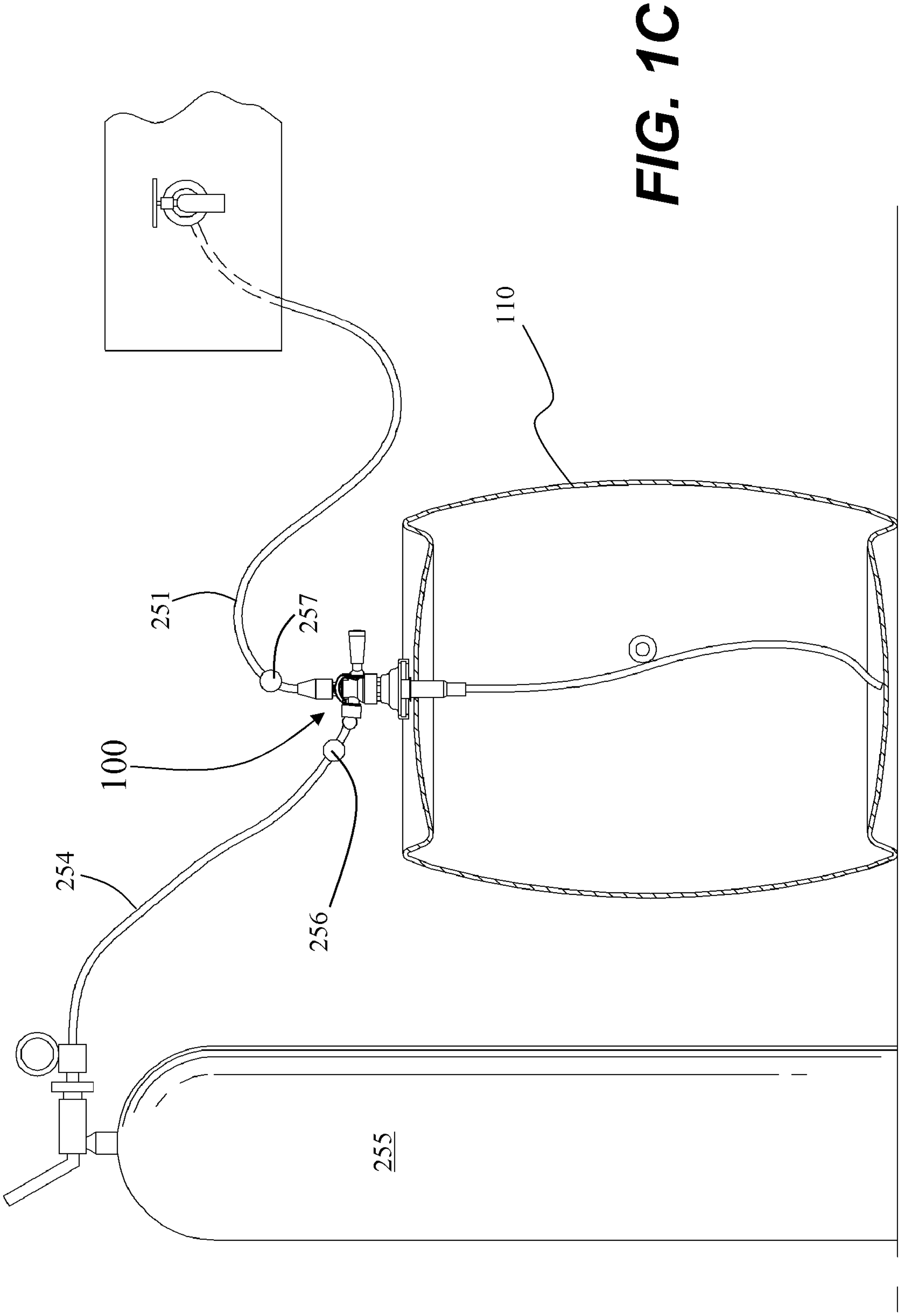
FIG. 1C shows an environmental view of the keg tapping kit 100 shown in FIG. 1B.

FIG. 1C shows an environmental view of the keg tapping kit 100 shown in FIG. 1B.

FIG. 2 shows a bottom view of an upper coupler 120.

FIG. 3 shows a perspective view of the upper coupler 120.

Figure 4:
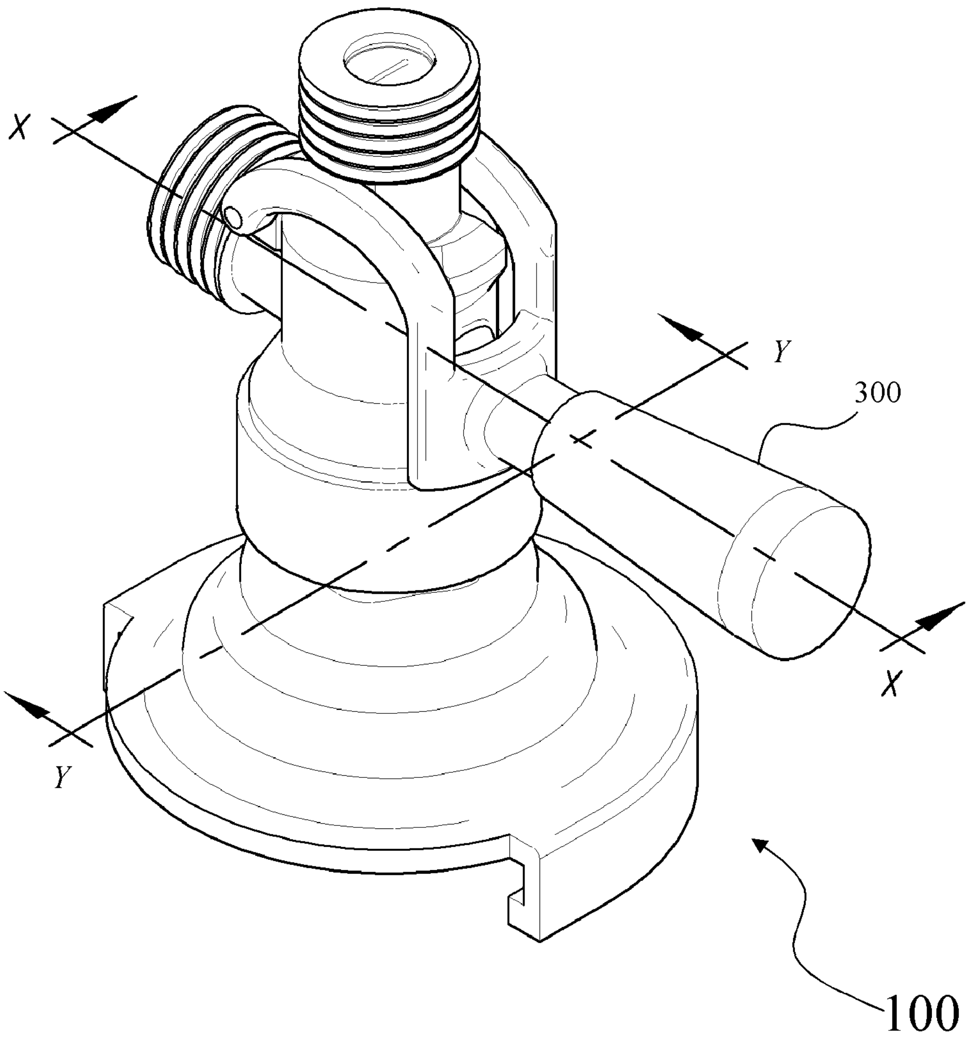
FIG. 4 shows a perspective view of a keg tapping kit 100 with the handle 300 in the down position.

FIG. 4 shows a perspective view of a keg tapping kit 100 with the handle 300 in the down position.

FIG. 5 shows a section view along lines X-X of FIG. 4.

Figure 6:
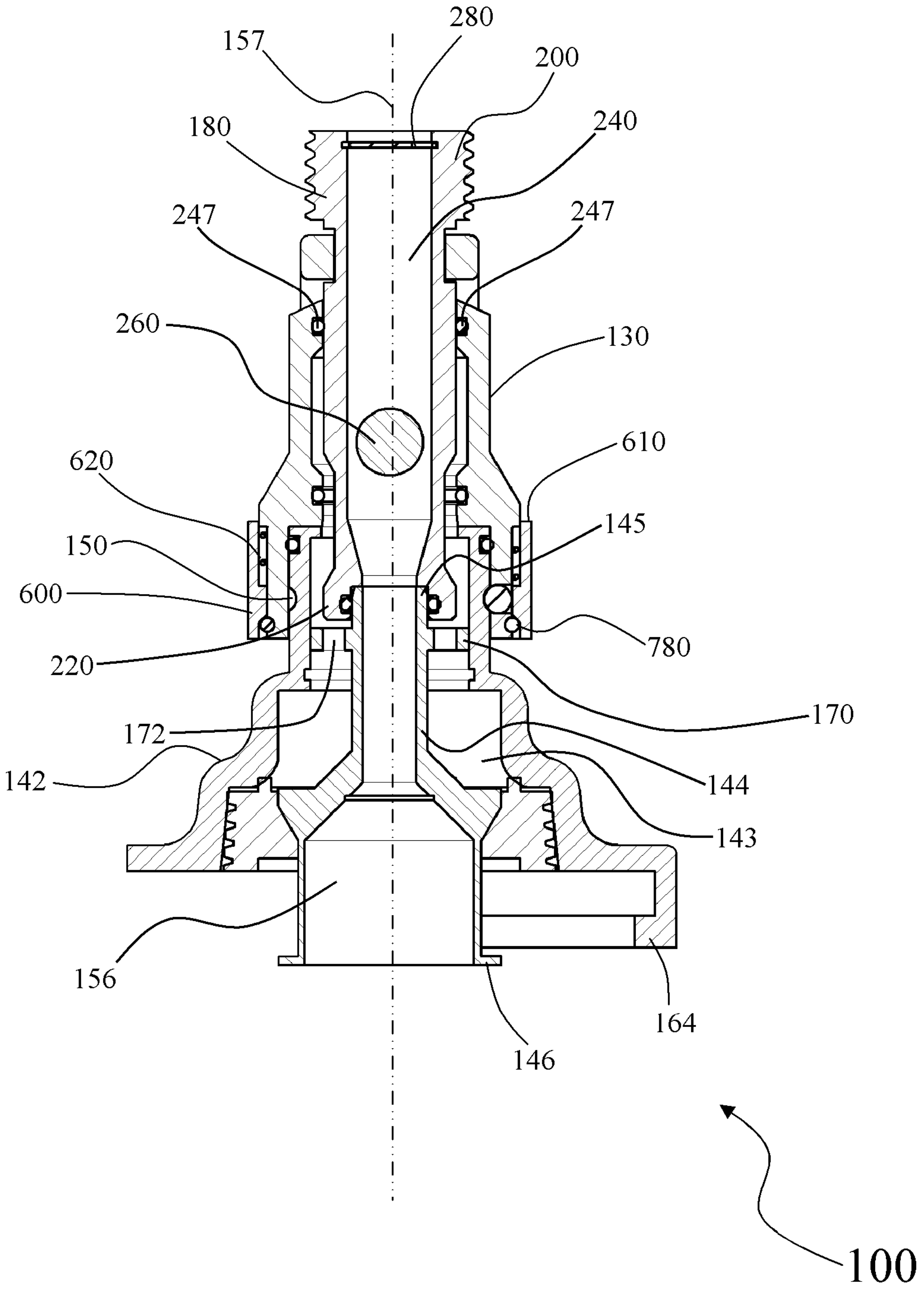
FIG. 6 shows a section view along lines Y-Y of the keg tapping kit 100 shown in FIG. 4 with the position of handle 300 in the down position as shown in FIG. 4.

FIG. 6 shows a section view along lines Y-Y of the keg tapping kit 100 shown in FIG. 4 with the position of handle 300 in the down position as shown in FIG. 4.

Figure 7:
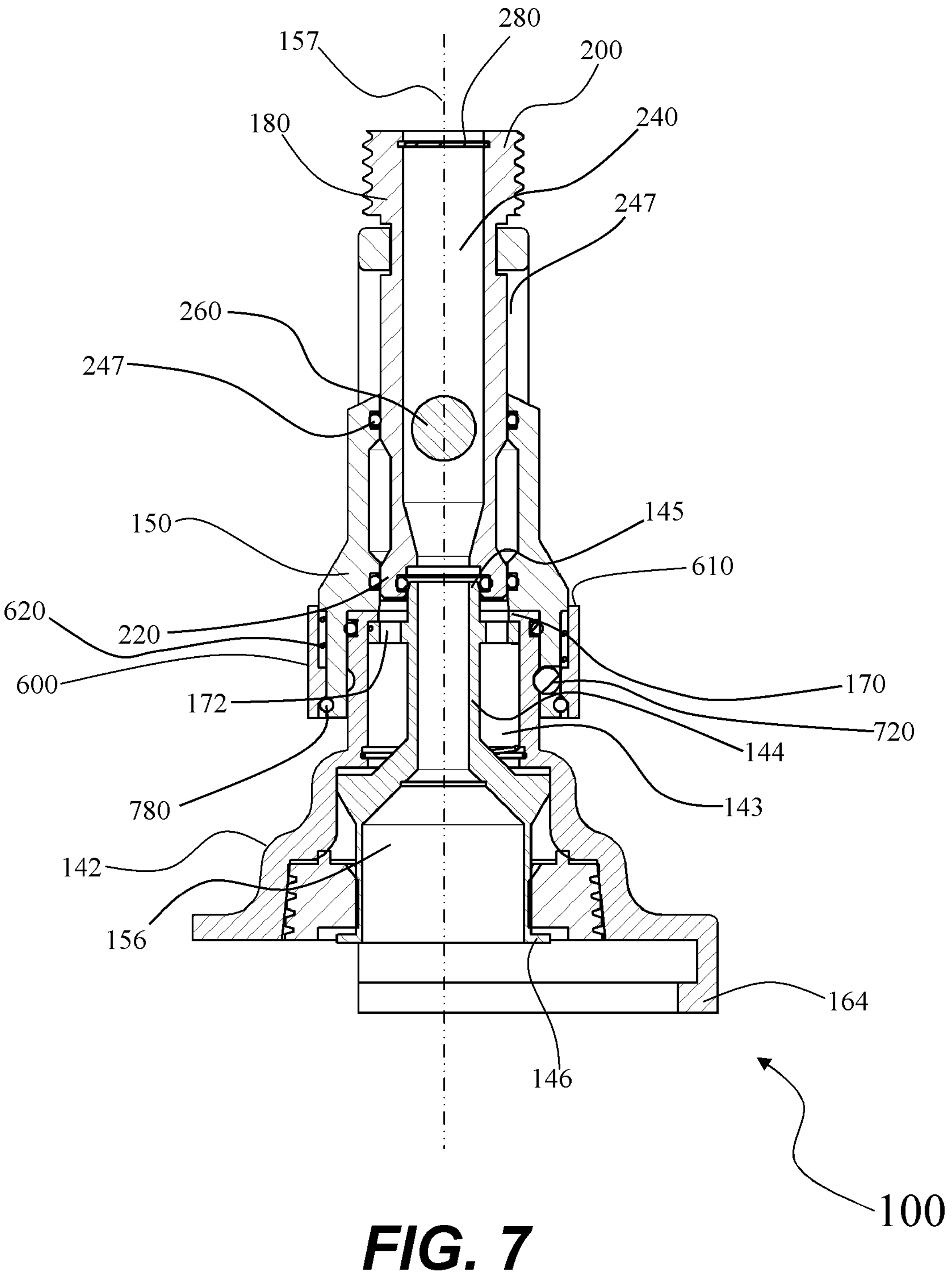
FIG. 7 shows a section view along lines Z-Z of the keg tapping kit 100 shown in FIG. 8 with the handle 300 in an up position.
Figure 8:
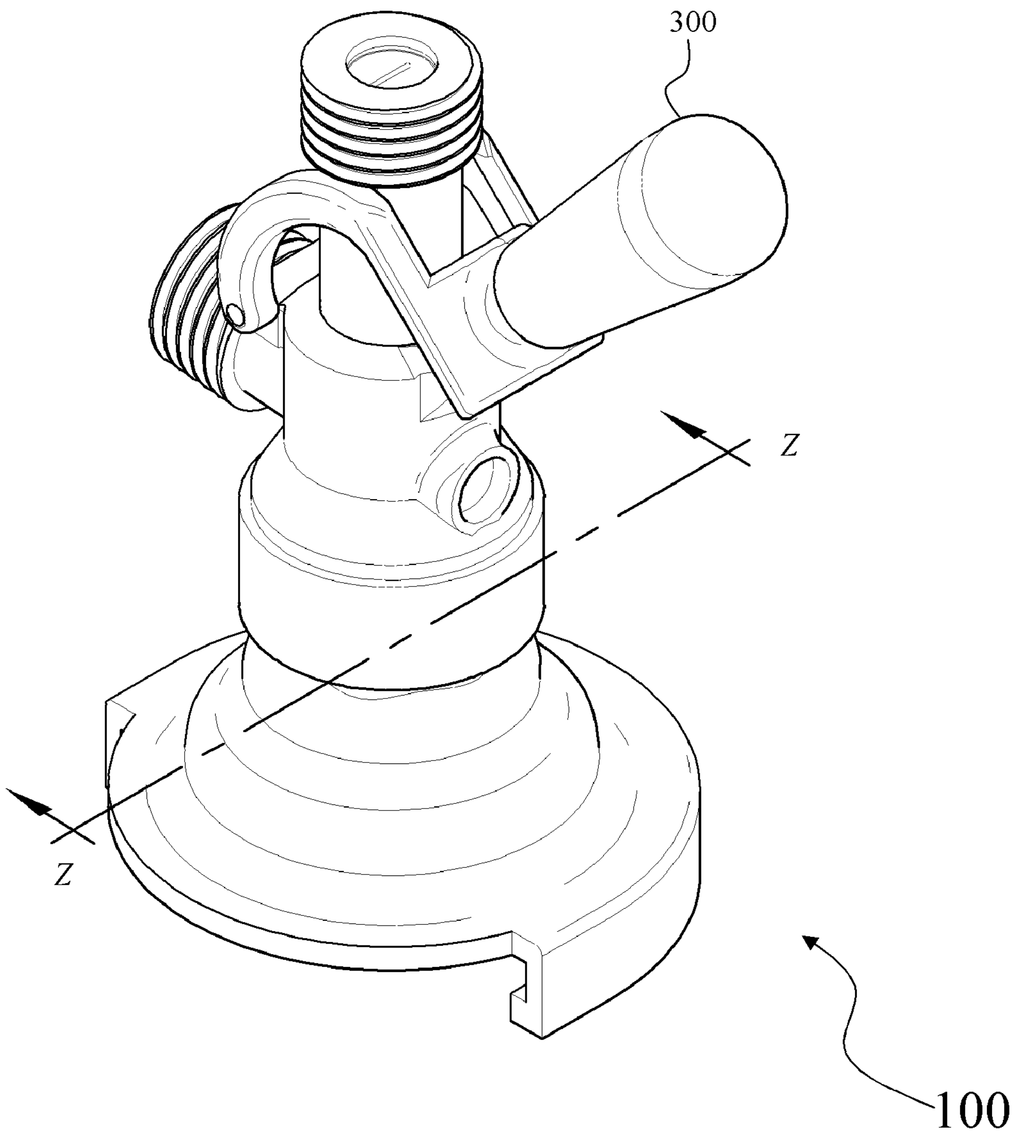
FIG. 8 shows a perspective view of a keg tapping kit 100 with the handle 300 in the up position.

FIG. 7 shows a section view along lines Z-Z of the keg tapping kit 100 shown in FIG. 8 with the handle 300 in an up position.

FIG. 8 shows a perspective view of a keg tapping kit 100 with the handle 300 in the up position.

Figure 9:
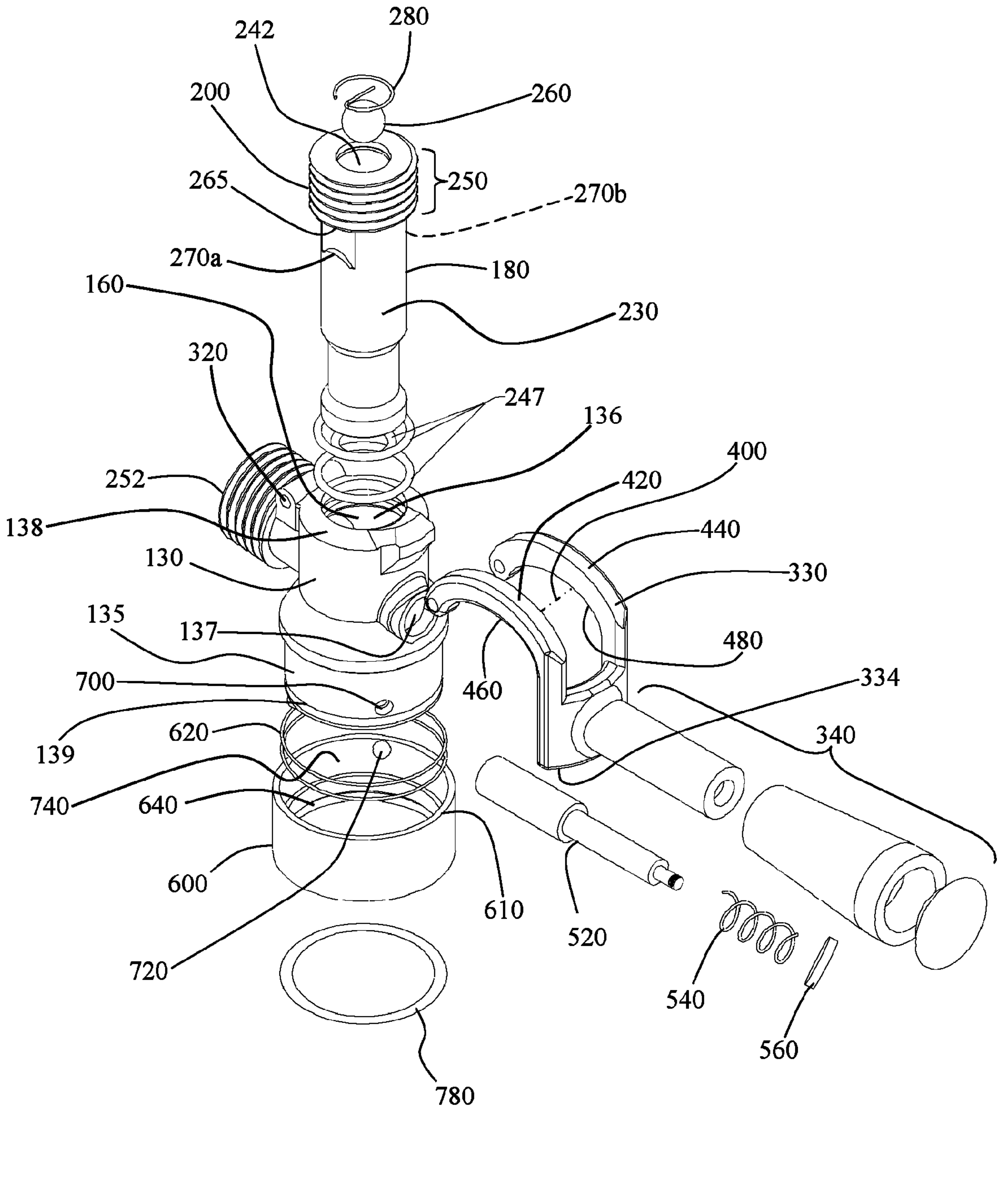
FIG. 9 shows an exploded view of the upper coupler 120.

FIG. 9 shows an exploded view of the upper coupler 120.

FIG. 10 shows a keg tapping kit 100 with a lower conduit spring 152.

Figure 11:
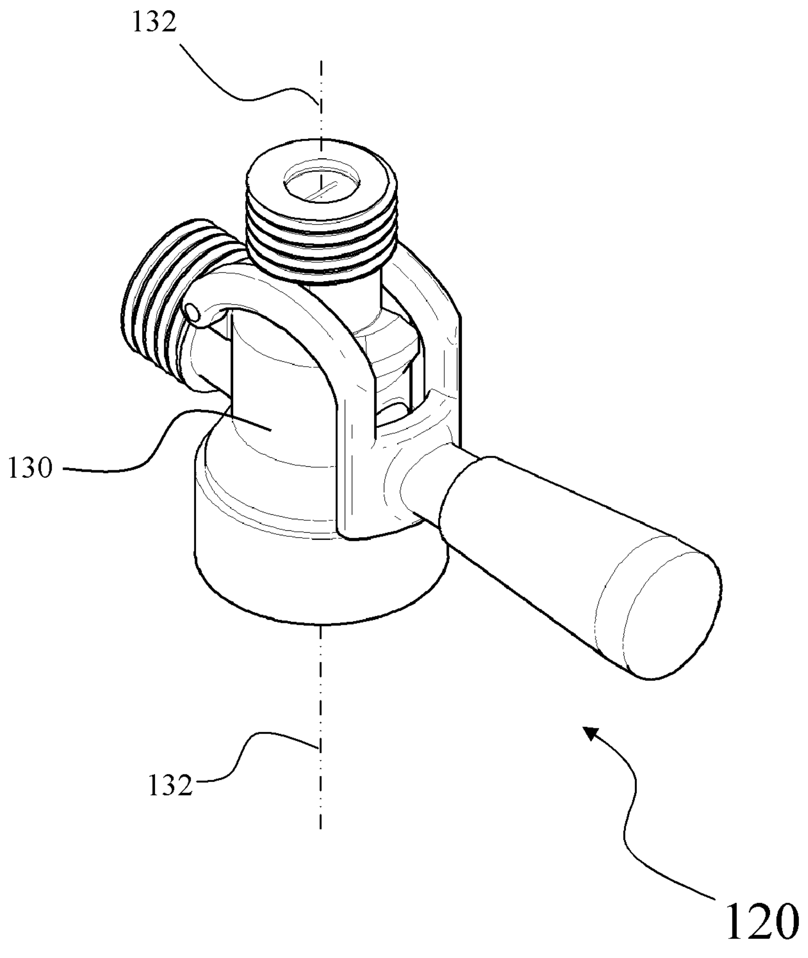
FIG. 11 shows a perspective view of upper coupler 120.

FIG. 11 shows a perspective view of upper coupler 120.

Figure 12A:
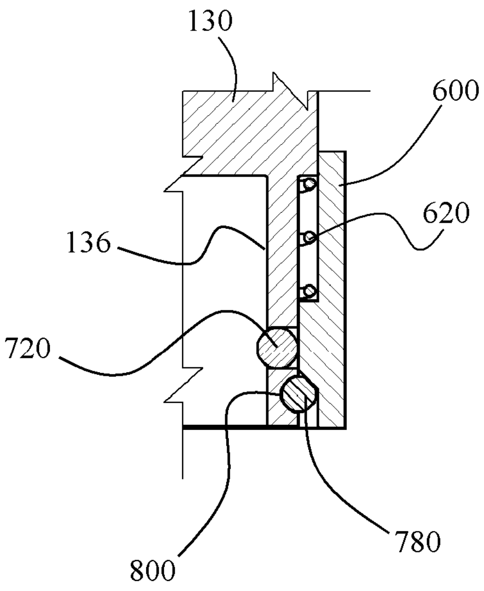
FIGS. 12A through 12C show the internal cambered surface of locking collar 600.
Figure 12B:
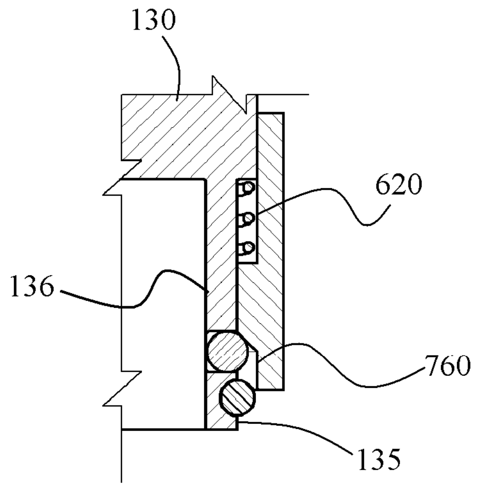
Figure 12C:
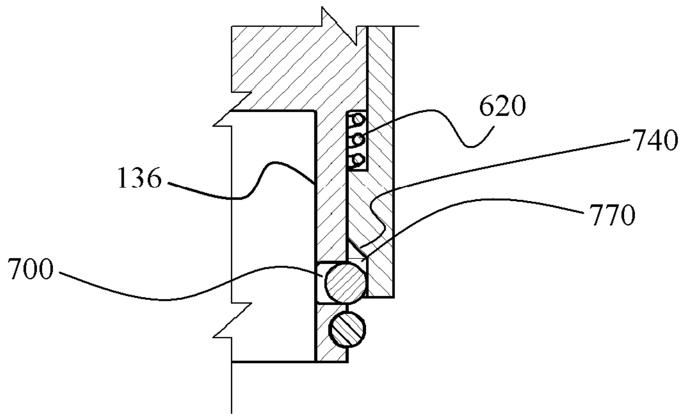

FIGS. 12A through 12C show the internal cambered surface of locking ring 600.

Figure 13:
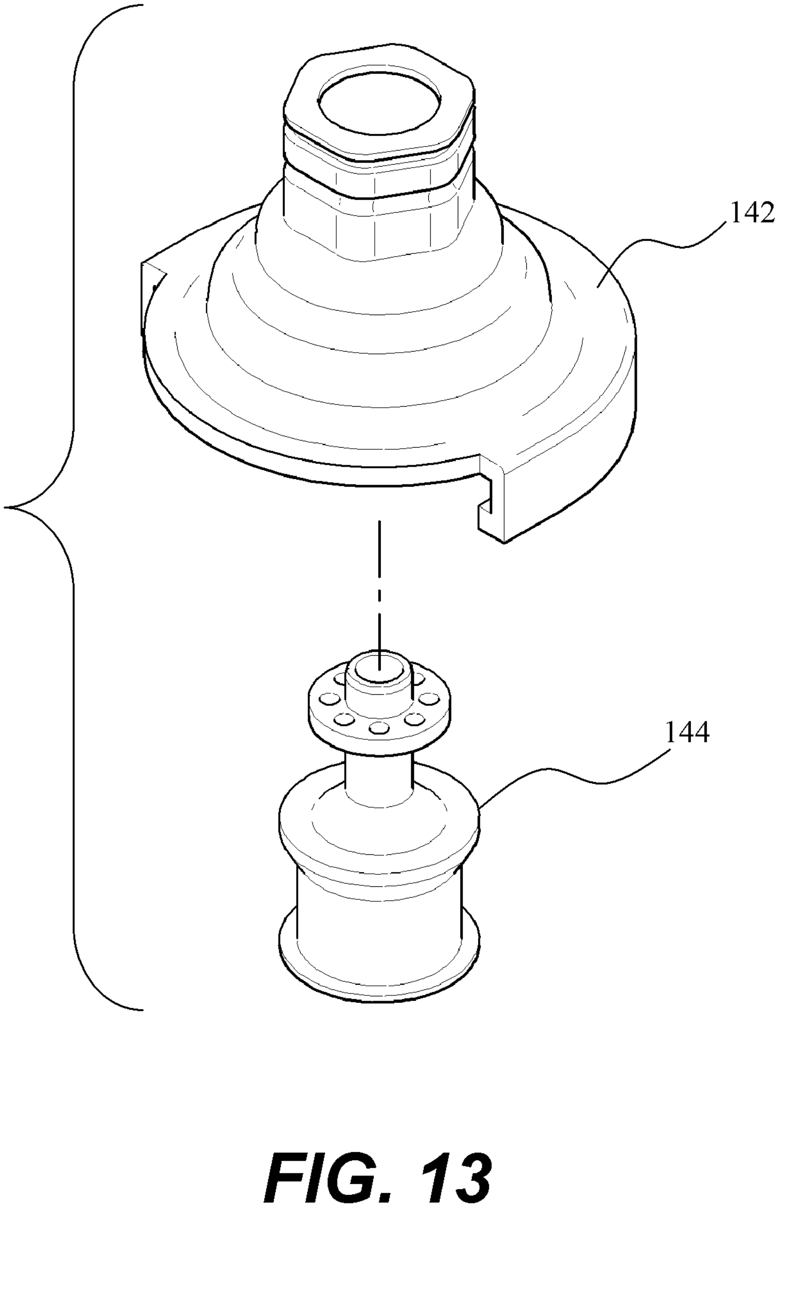
FIG. 13 shows a perspective view of a lower coupler housing 142 and lower coupler conduit 144.

FIG. 13 shows a perspective view of a lower coupler housing 142 and lower coupler conduit 144.

FIGS. 14 and 15 show side views of lower coupler housing 142.

FIGS. 15A and 15B show top and bottom elevated views of the lower coupler housing 142.

FIG. 15C shows a section view of housing 142 along lines 8-8 of FIG. 15A.

FIG. 15D shows a perspective view of housing 142.

Figure 16:
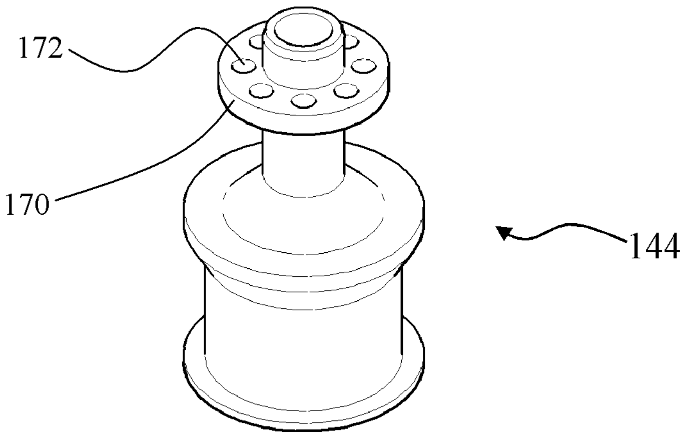
FIG. 16 shows a perspective side view of lower coupler conduit 144.

FIG. 16 shows a perspective side view of lower coupler conduit 144.

Figure 17:
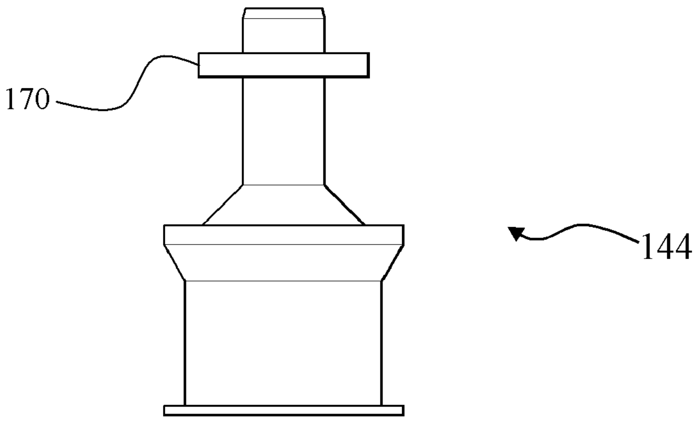
FIG. 17 shows a side view of lower coupler conduit 144.

FIG. 17 shows a side view of lower coupler conduit 144.

FIGS. 18A through 18D show a Table (Table 1) which shows a list of labels and reference numerals and the elements to which they refer. To assist the reader the lower coupler 140 is denoted as "140" with respect to the A System. Lower couplers 140 are denoted by 140*d*, 140*g*, 140*m*, 140*s* and 140*u* with respect to the D System, G System, M System, S System, and U System; likewise with respect to corresponding parts.

With respect to FIGS. 19 through 28, numeric labels ending in the letter "d" indicate parts of the lower coupler 140*d* for use in tapping a D system keg. The meaning of the numeric component (e.g., "170" of "170*d*") is found in Table 1 (see FIGS. 18A through 18D).

FIG. 19 shows the upper 120 and lower 140*d* couplers of keg tapping kit 100*d*.

FIG. 20 shows a perspective view of a keg tapping kit 100*d* with the handle 300 in the down position.

FIG. 21 shows a section view along lines A-A of FIG. 20.

FIG. 22 shows a section view along lines B-B of FIG. 20.

FIG. 23 shows a section view of tapping kit 100*d* with the handle 300 (not visible in FIG. 23) in an up position.

FIGS. 24 and 25 show side views of lower coupler housing 142*d*.

FIG. 26 shows a perspective view of a lower coupler housing 142 and lower coupler conduit 144.

FIGS. 27A and 27B show top and bottom elevated views of the lower coupler housing 142*d*.

FIG. 27C shows a section view of housing 142*d* along lines 19-19 of FIG. 27A.

FIG. 27D shows a perspective view of housing 142*d*

FIGS. 28A through 28C show various views of lower coupler conduit 144*d*.

With respect to FIGS. 29 through 36, numeric labels ending in the letter "g" indicate parts of the lower coupler 140*g* for use in tapping a G system keg. The meaning of the numeric component (e.g., "170" of "170*g*") is found in Table 1 (see FIGS. 18A through 18D).

FIG. 29 shows a keg tapping kit 100*g*.

FIG. 30 shows a section view along lines E-E of the keg tapping kit 100*g* shown in FIG. 29 with the position of handle 300 in the down position as shown in FIG. 29.

FIG. 31 shows a section view along lines F-F of the keg tapping kit 100*g* shown in FIG. 29 with the position of handle 300 as shown in FIG. 29.

FIG. 32 shows a section view along lines F-F of the keg tapping kit 100*g* shown in FIG. 29 but with the handle 300 in an up position.

FIG. 33 shows a perspective view of a lower coupler housing 142*g* and lower coupler conduit 144*g*.

FIGS. 34 and 35 show side views of lower coupler housing 142*g*.

FIGS. 36A and 36B show top and bottom elevated views of the lower coupler housing 142*g*.

FIG. 36C shows a section view of housing 142*g* along lines 31-31 of FIG. 36A.

FIG. 36D shows a perspective view of housing 142*g*

With respect to FIGS. 37 through 46, numeric labels ending in the letter "m" indicate parts of the lower coupler 140*m* for use in tapping an M system keg. The meaning of the numeric component (e.g., "170" of "170*g*") is found in Table 1 (see FIGS. 18A through 18D).

FIG. 37 shows a perspective view of a keg tapping kit 100*m* with the handle 300*m* in the down position.

FIG. 38 shows a section view along lines H-H of the keg tapping kit 100*m* shown in FIG. 37 with the handle 300 in the down position as shown in FIG. 30.

FIG. 39 shows a section view along lines I-I of the keg tapping kit 100*m* shown in FIG. 37 with the position of handle 300 in the down position as shown in FIG. 37.

FIG. 40 shows a section view along lines I-I of the keg tapping kit 100*m* shown in FIG. 37 but with the handle 300 in an up position.

FIG. 41 shows a perspective view of a lower coupler housing 142*m* and lower coupler conduit 144*m*.

FIGS. 42 and 43 show side views of lower coupler housing 142*m*.

FIGS. 44A and 44B show top and bottom elevated views of the lower coupler housing 142*m*.

FIG. 44C shows a section view of housing 142*m* along lines 42-42 of FIG. 44A.

FIG. 44D shows a perspective view of housing 142*m*.

FIG. 45 shows a perspective side view of lower coupler conduit 144*m*.

FIG. 46 shows a side view of lower coupler conduit 144*m*.

With respect to FIGS. 47 through 56C, numeric labels ending in the letter "s" indicate parts of the lower coupler 140*s* for use in tapping an S system keg. The meaning of the numeric component (e.g., "170" of "170*s*") is found in Table 1 (see FIGS. 18A through 18D).

FIG. 47 shows a perspective view of a keg tapping kit 100*s* with the handle 300 in the down position.

FIG. 48 shows a section view along lines J-J of the keg tapping kit 100*s* shown in FIG. 47 with the handle 300 in the down position as shown in FIG. 47.

FIG. 49 shows a section view along lines K-K of the keg tapping kit 100*u* shown in FIG. 47 with the handle 300 in the down position as shown in FIG. 47.

FIG. 50 shows a section view along lines K-K of the keg tapping kit 100*s* shown in FIG. 47 but with the handle 300 in an up position.

FIG. 51 shows the upper 120 and lower 140*s* couplers of keg tapping kit 100*s*.

FIG. 52 shows a perspective view of a lower coupler housing 142*s* and lower coupler conduit 144*s*.

FIGS. 53 and 54 show side views of lower coupler housing 142*s*, respectively.

FIGS. 55A and 55B show top and bottom elevated views of the lower coupler housing 142*s*, respectively.

FIG. 55C shows a section view of housing 142*s* along lines 53-53 of FIG. 55A.

FIG. 55D shows a perspective view of housing 142*s*.

FIGS. 56A through 56C show various views of lower coupler conduit 144*s*.

With respect to FIGS. 57 through 66B, numeric labels ending in the letter "u" indicate parts of the lower coupler 140*u* for use in tapping a U system keg. The meaning of the numeric component (e.g., "170" of "170*u*") is found in Table 1 (see FIGS. 18A through 18D).

FIG. 57 shows a perspective view of a keg tapping kit 100*u* with the handle 300 in the down position.

FIG. 58 shows a section view along lines N-N of the keg tapping kit 100*u* shown in FIG. 57 with the handle 300 in the down position as shown in FIG. 57.

FIG. 59 shows a section view along lines L-L of the keg tapping kit 100*u* shown in FIG. 57 with the handle 300 in the down position as shown in FIG. 57.

FIG. 60 shows a section view along lines L-L of the keg tapping kit 100*u* shown in FIG. 57 but with the handle 300 in an up position.

FIG. 61 shows a perspective view of a lower coupler housing 142*u* and lower coupler conduit 144*u*.

FIGS. 62 and 63 show side views of lower coupler housing 142*u*, respectively.

FIGS. 64A and 64B show top and bottom elevated views of the lower coupler housing 142*u*, respectively.

FIG. 65C shows a section view of housing 142*u* along lines 65-65 of FIG. 64A.

FIG. 65D shows a perspective view of housing 142*u*.

FIGS. 66A and 66B show a perspective and a side view of lower coupler conduit 144*u*, respectively.

It is to be understood that the present invention is not limited to the embodiments described above, but encompasses any and all embodiments deemed within the scope of the following claims.

What is claimed:

1. A keg tapping system, comprising:

an upper coupler and a lower coupler having, respectively, an upper coupler housing and lower coupler housing, wherein the upper and lower coupler housings respectively have slidable upper and lower coupler conduits therein, wherein the upper and lower coupler conduits each define top and bottom ends, the top end of the upper conduit defines a beer exit, wherein the housing of the upper coupler defines a gas inlet port, wherein the upper coupler housing defines an interior surface and an exterior surface and has an interior hexagonal cross section that defines a hexagonal channel along at least its bottom end, wherein at least one generally spherically shaped cavity extends through the upper coupler housing proximate to the bottom end of the upper coupler housing, wherein a bearing is located in each cavity and is able to protrude through either the interior surface or the external surface of the upper coupler housing, wherein the lower coupler housing defines a body portion and a hexagonal neck portion, wherein the lower coupler housing further defines exterior and interior surfaces, wherein the exterior surface of the neck portion of said lower coupler housing defines an annular groove conformed to receive said bearings, wherein the lower coupler further comprises a spring seated on an annular lip edge inside the lower coupler, wherein said spring applies an upward bias to the lower coupler conduit in order to hold it in the lower coupler housing, wherein the lower coupler conduit comprises an annular flange populated with through-apertures for the passage of gas around the conduit and thence into a keg;

a locking collar, wherein the locking collar is in up and down slidable engagement with the bottom end of the upper coupler housing, wherein the locking collar defines a locking collar internal surface which includes an internal cambered surface; and a handle moveable between up and down positions, the handle is in operational contact with the upper conduit and serves to lower said upper and lower conduits when moved downward, wherein said handle comprises a spring actuated probe configured to laterally enter a blind hole on a side of said upper housing opposite a pivot point of said handle when said handle is lowered into the down position, so as to lock said locking collar in place, wherein the bottom of the upper coupler conduit is in operational contact with the top of the lower coupler conduit such that moving the handle between up and down positions causes up and down movement of the upper coupler conduit and the lower coupler conduit, wherein the upper coupler housing is configured to engage with the lower coupler housing by inserting the hexagonal neck portion of the lower housing coupler into the hexagonal channel of the upper coupler housing, thereby allowing torsional force to be applied to the upper coupler housing, which is transferred to the lower coupler housing, so as to enable a connection of the lower coupler housing to an associated keg valve, wherein during normal operation of the keg tapping system the locking collar is in a default down position and the cambered surface forces each bearing to protrude through the interior surface of the upper coupler housing and engage the annular groove of the lower coupler housing thereby securing the lower coupler to the upper coupler, and when the locking collar is slid upwards each bearing is free to disengage the annular grove thereby allowing the upper and lower couplers to decouple from each other.

2. The keg tapping system according to claim 1, wherein the location of the at least one generally spherically shaped cavity are 360/n degrees apart, where n is the number of spherically shaped cavities.

3. The keg tapping system according to claim 1, wherein a check valve is located inside the upper coupler conduit.

4. The keg tapping system according to claim 1, wherein a locking collar spring biases the locking collar in a downward direction.

5. The keg tapping system according to claim 1, wherein the lower coupler is configured to connect to a keg valve system selected from the group consisting of an A System, D system, G System, M System, S System, or U System.

6. The keg tapping system of claim 1, comprising a plurality of interchangeable lower couplers, each configured to connect to a keg valve system selected from the group consisting of an A System, D system, G System, M System, S System, or U System.

7. A keg tapping system, comprising:

an upper coupler and a lower coupler having, respectively, upper and lower housings and slidable upper and lower coupler conduits therein, wherein the upper and lower coupler conduits each define top and bottom ends, the top end of the upper conduit defines a beer exit, wherein the upper coupler housing defines a gas inlet port and has an interior hexagonal cross section that defines a hexagonal channel along at least its bottom end, wherein the lower housing defines a body portion and a hexagonal neck portion, wherein the lower coupler housing further defines an exterior surface wherein the exterior surface of the neck portion of the lower coupler housing defines an annular groove, wherein the lower coupler further comprises a spring seated on an annular lip edge inside the lower coupler, wherein said spring applies an upward bias to the lower coupler conduit in order to hold it in the lower coupler housing, wherein the lower coupler conduit comprises an annular flange populated with through-apertures for the passage of gas around the conduit and thence into a keg;

a handle moveable between up and down positions, the handle is in operational contact with the upper conduit and serves to lower said upper and lower conduits when moved downward, wherein said handle comprises a spring actuated probe configured to laterally enter a blind hole on a side of said upper housing opposite a pivot point of said handle when said handle is lowered into the down position, so as to lock said locking collar in place, and a means for releasably attaching the lower coupler to the upper coupler, wherein the means for releasably attaching the lower coupler to the upper coupler employs a locking collar in an up and down slidable engagement with the bottom end of the upper coupler housing, the locking collar having an internal cambered surface and wherein the bottom end of the upper coupler employs at least one locking member responsive to the up or down position of the locking collar such that when the locking collar is in a down position the at least one locking member engages the annular groove, wherein the bottom of the upper coupler conduit is in operational contact with the top of the lower coupler conduit such that moving the handle between up and down positions causes up and down movement of the upper coupler conduit and the lower coupler conduit, wherein the upper coupler housing is configured to engage with the lower coupler housing by inserting the hexagonal neck portion of the lower housing coupler into the hexagonal channel of the upper coupler housing, thereby allowing torsional force to be applied to the upper coupler housing, which is transferred to the lower coupler housing, so as to enable a connection of the lower coupler housing to an associated keg valve.

8. A keg tapping device, comprising:

an upper coupler comprising an upper housing with internal and external surfaces, said upper housing comprising an upper slidable conduit therein, said upper slidable conduit having a top and bottom end, wherein the top end defines a beer exit, a gas inlet port, one or more cavities disposed radially around the bottom portion of the upper coupler housing, wherein the bottom portion of said upper coupler housing has an internal hexagonal cross section that defines a hexagonal channel;

a lower coupler comprising a lower housing with internal and external surfaces, said lower housing defining a hexagonal neck, said neck defining an annular groove proximate the midsection of said neck, a lower body, and an annular lip edge along the internal surface of said lower housing proximate the base of said neck, said annular lip edge configured to retain a spring thereon, wherein said neck is configured to slidably fit inside said bottom portion of the upper coupler housing, wherein said lower coupler housing comprises a lower slidable conduit therein, said lower slidable conduit having a top and bottom end, wherein the lower conduit comprises an annular flange populated with through-apertures for the passage of gas around the conduit and thence into a keg, and a spring seated on said annular lip edge, wherein said spring applies an upward bias to the lower conduit in order to hold it in the lower coupler housing, wherein the hexagonal neck of the lower coupler housing and the hexagonal channel of the upper coupler housing form an interface, such that the upper coupler can engage with the lower coupler by inserting the hexagonal neck of the lower coupler housing into the hexagonal channel of the upper coupler housing, thereby allowing torsional force to be applied to the upper coupler, which is transferred to the lower coupler, so as to enable a connection of the lower coupler to an associated keg valve;

a locking collar comprising one or more bearings disposed radially along its inner surface, wherein the locking collar is in up and down slidable engagement with the bottom end of the upper coupler housing, wherein said inner surface includes a cambered surface, wherein when said locking collar is in a default down position said one or more bearings are aligned with said one or more cavities in said upper coupler housing, causing the bearings to protrude through and out the other side of said cavities;

a handle moveable between up and down positions, wherein the handle is in operational contact with the upper conduit and the bottom of the upper conduit is in operational contact with the top of the lower conduit, such that moving the handle between up and down positions causes up and down movement of the upper conduit and the lower conduit, wherein said handle comprises a spring actuated probe configured to laterally enter a blind hole on a side of said upper housing opposite a pivot point of said handle when said handle is lowered into the down position, so as to lock said locking collar in place, wherein during normal operation of the keg tapping device the locking collar is in a default down position and the cambered surface forces each bearing to protrude through the interior surface of the upper coupler housing and engage the annular groove of the lower coupler housing thereby securing the lower coupler to the upper coupler, and when the locking collar is slid upwards each bearing is free to disengage the annular grove thereby allowing the upper and lower couplers to decouple from each other.

9. The keg tapping device of claim 8, wherein the lower coupler is configured to connect to a keg valve system selected from the group consisting of an A System, D system, G System, M System, S System, or U System.

10. The keg tapping device of claim 8, wherein said upper coupler may be decoupled from said lower coupler while the keg tapping device is connected to a keg valve by sliding said locking collar upward, provided said handle is in the up position.

11. The keg tapping device of claim 8, wherein said upper coupler cannot be decoupled from said lower coupler while the keg tapping device is connected to a keg valve when said handle is in the down position.

12. The keg tapping device of claim 10, wherein said decoupling of said upper coupler from said lower coupler renders the keg tapping device incapable of opening the keg valve until said upper coupler is recoupled to said lower coupler.

13. The keg tapping device of claim 8, wherein a keg may be tapped by connecting the lower coupler to the keg valve and moving the handle into the down position, thus causing the upper and lower conduits to lower in respect to the upper and lower housings and engage the keg valve, open the valve, and allow the passage of compressed gas into the keg thus forcing fluid out of the keg.

14. The keg tapping device of claim 13, wherein the keg tapping device may be disengaged from a keg by raising the handle to the up position, which raises the conduits and unlocks the locking collar.

15. The keg tapping device of claim 14, wherein the upper coupler may be decoupled from the lower coupler once the keg tapping device is disengaged from the keg. leaving the lower coupler attached to the keg, but inoperable.

16. The keg tapping device of claim 8, comprising a plurality of interchangeable lower couplers, each configured to connect to a keg valve system selected from the group consisting of an A System, D system, U System, M System, S System, or U System.

* * * * *